United States Patent [19]

Abbott

[11] Patent Number: 5,070,478

[45] Date of Patent: Dec. 3, 1991

[54] MODIFYING TEXT DATA TO CHANGE FEATURES IN A REGION OF TEXT

[75] Inventor: Curtis Abbott, Menlo Park, Calif.

[73] Assignee: Xerox Corporation, Stamford, Conn.

[21] Appl. No.: 274,261

[22] Filed: Nov. 21, 1988

[51] Int. Cl.[5] .................... G06F 15/401; G06F 15/38
[52] U.S. Cl. .................... 364/419; 364/943; 364/943.1; 364/943.2; 364/943.41; 364/943.42; 364/943.43; 364/DIG. 2
[58] Field of Search ............... 364/419, 200 MS File, 364/900 MS File

[56] References Cited

U.S. PATENT DOCUMENTS

| | | | |
|---|---|---|---|
| 4,773,009 | 9/1988 | Kucera et al. | 364/419 |
| 4,821,230 | 4/1989 | Kumano et al. | 364/900 |
| 4,864,502 | 9/1989 | Kucera et al. | 364/419 |
| 4,868,750 | 9/1989 | Kucera et al. | 364/419 |
| 4,887,920 | 12/1989 | McRae et al. | 400/63 |
| 4,958,285 | 9/1990 | Tominaga | 364/419 |
| 4,964,030 | 10/1990 | Suzuki et al. | 364/419 |

FOREIGN PATENT DOCUMENTS 0240909  10/1987  European Pat. Off. .

OTHER PUBLICATIONS

Leibowitz, M. B., "A Process for Automated Logic--Syntatic Analysis of Natural English Sentences", presented to Graduate Committee of Lehigh University, 1970, pp. 58-101.
"Getting It Right", Macworld, Aug. 1988, pp. 145, 147.
Rosenthal, S., "Yes PC Fans, They Still Make Typewriters", *San Francisco Examiner*, Mar. 27, 1988.
*Text Editing*, VP Series Reference Library, Version 1.0, Xerox Corporation, 1985, pp. 47-56.
*Inside Macintosh*, Apple Computer, Inc., 1985, pp. I-1373 through I-391.
*Text Editing and Processing*, Symbolics, Inc. #999020, Jul. 1986, pp. 24-31 and 63-111.

*Primary Examiner*—Thomas C. Lee
*Assistant Examiner*—Krisna Lim
*Attorney, Agent, or Firm*—James T. Beran

[57] ABSTRACT

A text editing system performs operations that result in text with correct punctuation at textual type boundaries. The system's processor executes a text editor, calling punctuator functions to provide appropriate fix-up data defining a sequence of operations to correct textual type punctuational structure. Fix-up data can be provided after a conventional manipulation operation, such as cut or paste in the cut-copy-paste paradigm, copy or move in the copy-move paradigm, or delete, in which case the defined sequence of operations corrects punctuational errors resulting from the manipulation operation. Fix-up data can also be provided to implement a higher level editing operation, such as changing the textual type of a textual type boundary. The punctuator provides appropriate fix-up data based on the operation currently being performed and on previously obtained data about the current selection. The fix-up data include a starting point, a number of codes to delete, a number to insert, a list of codes to insert, a position to change capitalization, and how to change it. If the current selection is a text unit, the textual types and lengths of the textual type boundaries at each of its ends are used to obtain appropriate fix-up data. To enable the punctuator to obtain data about the current selection in advance of an operation that requires fixed-up data, the text editor also calls the punctuator to handle requests to change the current selection. The punctuator does so and returns the end points of the new selection to the text editor.

47 Claims, 11 Drawing Sheets

MODIFYING TEXT DATA TO CHANGE FEATURES IN A REGION OF TEXT

BACKGROUND OF THE INVENTION

The present invention relates to data processing techniques for editing natural language text. More specifically, the invention relates to editing techniques that take punctuation into account.

A number of conventional techniques relating to punctuation of natural language text are discussed in copending, coassigned U.S. patent application Ser. No. 07/274,158 filed Nov. 21, 1988, entitled "Processing Natural Language Text Using Autonomous Punctuational Structure" ("the Trollope application"), and incorporated herein by reference.

*Text Editing*, VP Series Reference Library, Version 1.0, Xerox Corporation, 1985, pp. 47-56, describes features of the ViewPoint Document Document Editor available from Xerox Corporation. Pages 49-52 described the multiple clicking method of selection, in which the number of mouse button clicks indicates the desired unit of text, with one click selecting a character, two clicks selecting a word, three clicks selecting a sentence, and four clicks selecting a paragraph. The editor uses special rules to interpret text as words or sentences. As described at page 49, a selection of a character, word, sentence, or paragraph by the multiple clicking method clicking method can be extended by a select adjust method to includes additional characters, words, sentences, or paragraphs, respectively. Move, copy, and delete operations can be applied to the selection. In the case of move or copy operations, a selection by the multiple clicking method will be positioned between other text units of the same level, so that a word will be positioned between words, a sentence between sentences, and a paragraph between paragraphs. A selection by the multiple clicking method also includes the preceding or following space or spaces; therefore, a word can be moved or deleted from a sentence, for example, leaving the remaining words and punctuation marks in the sentence correctly spaced; similarly, a sentence can be moved or deleted from a paragraph, leaving the remaining sentences in the paragraph correctly spaced.

Various other commercial products have features similar to those of ViewPoint, including selection commands from the keyboard or with a mouse or similar pointer control device. Conventionally, a single click with a pointer control device button selects a region that starts at the character boundary nearest the position of the pointer at the time of the click. In one approach, the region selected by a single click contains no characters, but may be extended one character at a time by moving the pointer over the characters to be added. In another approach, the region selected by a single click contains one character, and may be extended arbitrarily by a single click of a different button with the pointer at the desired ending point of the selection.

It is also conventional to provide selection by double-clicking, or clicking twice in succession with the pointer at the same position. Double-clicking usually selects the word most closely surrounding the pointer position, and subsequent adjustments of the selection are usually made a word at a time. For example, the MacIntosh personal computer from Apple Corporation provides a user interface in which multiple clicking selects a word. Word, a commercial text editor from Microsoft Corporation, provides extension of such a selection to additional full words. Microsoft Word and other text editors, including WordPerfect from WordPerfect Corporation and Emacs available with source code from Free Software Foundation, Cambridge, Mass., allow selection of a sentence and extension of such a selection to additional full sentences. Microsoft Word and Fullwrite Professional from Ashton-Tate Corporation further allow selection by paragraph. Fullwrite Professional also allows the user to provide a quotation mark without indicating whether it is at the open or close of a quote, the software correctly providing an open or close quotation mark based on previous marks.

*Text Editing and Processing*, Symbolics, Inc., #999020, July 1986, pp. 24-31 and 63-111, describes text editing features of a version of Emacs called "Zmacs." Pages 67-70 describe mouse operations, including clicking on a word to copy the whole word; on a parenthesis to copy it, its matching parenthesis, and the text between them; on a quotation mark to copy it, its matching quotation mark, and the text between them; or after or before a line to copy the whole line. Appropriate spaces are placed before inserted objects, so that spaces are automatically inserted around an inserted word or sentence. Pages 71-75 describe motion commands, including motion by word, meaning a string of alphanumeric characters; by sentence, ending with a question mark, period, or exclamation point that is followed by a newline or by a space and a newline or another space, with any number of closing characters between the sentence ending punctuation and the white space that follows; and by line, delimited by a newline. Page 79 describes motion by paragraph, delimited by a newline followed by blanks, a blank line, or a page character alone on a line; page 80 describes motion by page, delimited by a page character. Chapter 5, pages 83-97, describes deleting and transposing text, with pages 97-89 describing how contents of a history are retrieved. Chapter 6, pages 99-111, describes working with regions, and discusses point and mark.

Kucera et al., U.S. Pat. No. 4,773,009, describe a text analyzer that analyzes strings of digitally coded text to determine paragraph and sentence boundaries. As shown and described in relation to FIGS. 3-4, each string is broken down into component words. Possible abbreviations are identified and checked against a table of common abbreviations to identify abbreviations that cannot end a sentence. End punctuation and the following string are analyzed to identify the terminal word of a sentence. When sentence boundaries have been determined, a grammar checker, punctuation analyzer, readability analyzer, or other higher-level text processing can be applied.

SUMMARY OF THE INVENTION

The present invention provides text processing techniques that use information about punctuational structure of a text to provide improved text processing. For example, an editor according to the invention can provide fix-up data defining a sequence of operations that automatically corrects the textual type punctuational structure after a user manipulates the text. Furthermore, the editor can provide fix-up data defining a sequence of operations that implements a higher level operation that improves text processing efficiency.

The Trollope application incorporated herein by reference describes a well-known problem in conventional text editors. After an operation that manipulates a text, the user must typically go over the text to correct numerous punctuational features, including punctuation marks, capitalization, and spacing. For example, moving a word to or from the beginning or end of a sentence can leave the sentence incorrectly punctuated, with incorrect capitalization and spacing. The Trollope application avoids this problem by providing a data structure that includes text data corresponding to the text, with structure data indicating an autonomous punctuational structure of the text. This punctuational structure is autonomous in the sense that it defines the distribution of one or more punctuational features in the text and the dependencies between them without reference to the lexical content of the text. With such a data structure, it is easier to ensure that operations on a text lead from one correct textual type punctuational structure to another. Each operation is performed in a way that maintains the data structure so that the system can supply correct punctuation for the text, such as by algorithmically deriving a character sequence for display from the data structure.

One aspect of the present invention is based on the recognition of problems with the techniques proposed in the Trollope application. The creation, use, and maintenance of a text data structure with structure data indicating an autonomous punctuational structure consumes substantial time and memory, so that the Trollope application techniques are computationally inefficient. Also, the Trollope application techniques, as implemented, limit the available operations to those that correspond to the data structure, so that the user is precluded from simply selecting and manipulating text characters directly as can be done with conventional commercially popular text editors for natural language text. Furthermore, the Trollope application techniques have been implemented with an underlying structure-based editor, SEdit, that is specifically designed to handle data structures resembling those required for the Trollope application techniques. SEdit is fundamentally different than the commercially popular text editors in this respect; the commercially popular text editors cannot be easily extended to include the Trollope application techniques because they do not handle this kind of data structure. Therefore, a user of one of the commercially popular text editors cannot benefit from the Trollope application techniques, but rather must continue to correct numerous punctuational features after manipulating text.

This aspect of the invention is based on the recognition that text can be analyzed into text units, each of which has a specific textual type, such that all punctuational features occur at boundaries between such text units. This aspect is based on the further discovery that errors in punctuation can be analyzed into two fundamental kinds of errors—errors in positioning textual type boundaries and erroneous combinations of punctuational features at textual type boundaries. The second kind of errors, referred to as errors in textual type punctuational structure, can be corrected by performing, after a manipulation operation, a sequence of operations that result in a text with correct textual type punctuational structure, meaning that the punctuational features at each textual type boundary are appropriate to that boundary. In other words, the correcting sequence of operations modifies text data corresponding to a text so that the modified text data corresponds to a modified text that has a correct textual type punctuational structure.

This aspect of the invention is further based on the recognition that a sequence of operations that leads to a correct textual type punctuational structure can be performed with a conventional commercially popular text editor. The text editor can serve as host for a punctuator that includes functions that can be called by the host editor to determine appropriate sequences of operations, which the host editor then performs. The host editor and the punctuator together provide approximately the effect of the Trollope application techniques without the disadvantages set forth above.

Another aspect of the invention is based on the recognition of problems in determining an appropriate sequence of operations leading to correct textual type punctuational structure. A conventional text editor does not provide data explicitly identifying such a sequence of operations. On the other hand, the sequence of operations should be determined without substantially modifying the host editor.

This aspect of the invention is based on the further recognition that the sequence of operations can be determined in parallel with the normal operations of the host editor. This recognition is in turn based on an analysis of the operation of conventional text editors and the discovery that most editors can readily provide data at certain stages of their normal operations on the basis of which an appropriate sequence of operations to correct textual type punctuational structure can be obtained.

A conventional display-based text editor typically includes a keyboard to receive a sequence of codes corresponding to text written by a user and a display to present a text corresponding to previously received text codes to a user for reading. The text editor automatically handles such matters as line breaking, interline and interparagraph spacing, margins, and paragraph indentation, so that the text presented on the display closely approximates the appearance the same text would have a printed page. The user is then able to use the keyboard, and typically a pointer control device such as a mouse, to request revisions to the text.

In a conventional text editor, the user can typically make revisions by requesting operations that fall into two important classes. One class, selection operations, includes those operations by which the user can single out some part of the text, called the "current selection" or simply the "selection, " to become the argument of a subsequent operation. Another class, manipulation operations, includes those operations by which the user can modify the text. The manipulation operations available in a given text editor are typically based on one of two paradigms—cut-copy-paste or move-copy.

In manipulation according to the cut-copy-paste paradigm, there are three basic operations: a copy operation places a copy of the text codes corresponding to the current selection in a temporary data structure, typically called the "cut buffer"; a cut operation performs a copy operation followed by a deletion of the current selection from the text; and a paste operation replaces the current selection with the contents of the cut buffer. In manipulation according to the move-copy paradigm, there are two selections, referred to herein as the "primary selection" and the "secondary selection," and two basic operations: a copy operation positions a copy of the primary selection at the location of the secondary selection; and a move operation performs a copy operation followed by a deletion of the primary selection from its original position. Both paradigms also include an independent delete operation which deletes the current selection or the primary selection without reference to a cut buffer or a secondary selection.

This aspect of the present invention assumes that the host editor uses a conventional text data structure that includes a sequence of codes, including codes for characters, punctuation marks, capitalization, and spaces. This aspect provides techniques by which a host editor that uses such a data structure or a variant of it can be extended with relatively minor modifications. Those techniques include providing punctuator functions each of which is a set of instructions that obtains data from the host editor and uses that data to determine a sequence of operations that would lead to a modified text with a correct textual type punctuational structure. The host editor includes functions each of which is a set of instructions that calls a punctuator function to obtain a sequence of operations and then performs the sequence of operations using conventional host editor operations.

This aspect is further based on the discovery of techniques for obtaining the information necessary for a punctuator function to determine an appropriate sequence of operations. This information can be obtained from the host editor when it completes one of its basic manipulation operations, whether a move or copy operation in the move-copy paradigm or a cut, copy, or paste operation in the cut-copy-paste paradigm, and when it completes an operation making a change to the selection, whether the primary or secondary selection in the move-copy paradigm or the contents of the cut buffer in the cut-copy-paste paradigm. Whenever the host editor receives a request to modify the selection, for example, a host editor function can call a punctuator function, which then provides requests to the host editor in response to which the host editor provides relevant information. The information obtained at this time may include, for example, text codes in the region of each end of the current selection, which the punctuator function can use to find the ends of a new selection. Also, whenever the host editor completes one of its basic manipulation operations, it can call a punctuator function, which can, if the text data has been modified, determine an appropriate sequence of operations based on which of the basic manipulation operations was performed and on the textual type boundaries of the selection on which it was performed.

This aspect is further based on the recognition of a fundamental problem in determining an appropriate sequence of operations. The selection and manipulation operations of the host editor conventionally do not depend on whether the text data corresponds to a text that has a correct textual type punctuational structure. The text codes that indicate punctuational features such as punctuation marks, spaces, and capitalization are conventionally treated like other codes in the sequence of text data, making the host editor blind to the textual type punctuational structure of the text that is indicated by those codes. The host editor does not provide data directly identifying the appropriate sequence of operations.

This problem is especially important in correcting textual type punctuational structure because a given sequence of text codes indicating punctuational features may be correct in some situations and incorrect in others, so that it is not possible to determine whether it must be corrected without additional information. Furthermore, an incorrect sequence of text codes may arise in more than one way, so that a decision about how it should be corrected will require additional information. Therefore, it is necessary to obtain additional information from the host editor in order to be able to determine an appropriate sequence of operations in each of these situations.

The invention solves this problem through punctuator functions that identify certain features of the textual type punctuational structure of a selection using a grammar of textual types; data relating to these features is subsequently used to determine an appropriate sequence of operations to correct textual type punctuational structure. The use of a grammar of textual types in relation to punctuational structure is discussed in greater detail in the Trollope application incorporated herein be reference. In the present invention, the punctuator functions can infer the textual type punctuational structure of the text in the region of each end of a selection based on a grammar of textual types applied to the text codes from those regions. For example, a punctuator function can tokenize the text codes, and then identify textual type boundaries by matching the token stream against a predefined set of token patterns derived from the grammar of textual types.

By identifying textual type boundaries, the punctuator can determine where a new selection's end points should be and obtain other data relating to the new selection to permit a subsequent function to determine an appropriate sequence of operations to correct textual type punctuational structure; it can then store that data, and provide data to the host editor defining the end points of the new selection within the text data structure. The host editor then conforms its selection to those end points and continues its conventional operations. Meanwhile, the punctuator keeps its own data relating to the current selection, including its end points, but also including additional data about textual type boundaries at its ends.

Once an appropriate sequence of operations to provide a correct textual type punctuational structure has been identified, another basic problem arises: It is necessary to provide data defining that operation, called fix-up data, to the host editor in a way that does not necessitate major modifications of the host editor.

The invention solves this problem based on the discovery that a relatively small set of fix-up data can be used to define a sequence of operations that can be performed with conventional host editor functions. The host editor can provide a data structure into which the punctuator loads the fix-up data. The host editor can then perform the sequence of operations based on the fix-up data in the data structure. The fix-up data can, for example, include data defining a starting point within the text data, a number of text codes within the text data to delete, a number of text codes to insert, a list of text codes to be inserted, a position within the text data to change capitalization, and how to change capitalization at the position. The punctuator is able to provide this data based on the data based on the data previously obtained in relation to the selection and also based on which of the manipulation operations was performed by the host editor. Even though the number of possible sequences of operations is large, one or more sets of fix-up data can be used to define any such sequence.

One strength of this technique is that it provides selection operations that act on textual types of the sort described in the Trollope application, identifying selection end points based on textual type boundaries. Another strength is that it provides, for manipulation operations from either the move-copy paradigm or the cut-copy-paste paradigm, automatic correction of punctuational features in the text affected by the operation.

Another aspect of the invention is based on the recognition of another problem in conventional text editing. Conventionally, text editing operations are limited to low level operations such as move, copy, and delete, or cut, copy, and paste which, as noted above, typically require the user to perform a number of corrective operations to complete an editing operation.

This aspect is based on the further recognition that this problem can be solved in part by providing higher level text manipulation operations that modify text codes at selected textual type boundaries within text data. These operations do not require corrective operations and they can use information about a selection obtained with the techniques described above. One such higher level operation is to change textual type of a part of a text. The part can be a unit of text, in which case the punctuational features, including punctuation marks, spaces, and capitalization, at the boundaries of the text unit are changed to those appropriate to the new textual type. The part could also be an insertion point in a textual type boundary, in which case the punctuational features in the textual type boundary are changed to those appropriate to a boundary of that textual type.

This aspect is based on the further recognition that such higher level operations can be provided through a mechanism like that for the operations that correct textual type punctuational structure. When the host editor receives a request for a higher level operation, it calls a punctuator function to obtain fix-up data defining a sequence of operations equivalent to the requested operation. When the punctuator function returns the fix-up data, the host editor performs the sequence of operations to complete the requested operation.

The following description, the drawings and the claims further set forth these and other objects, features and advantages of the invention.

DETAILED DESCRIPTION

1. Glossary

Figure 1:
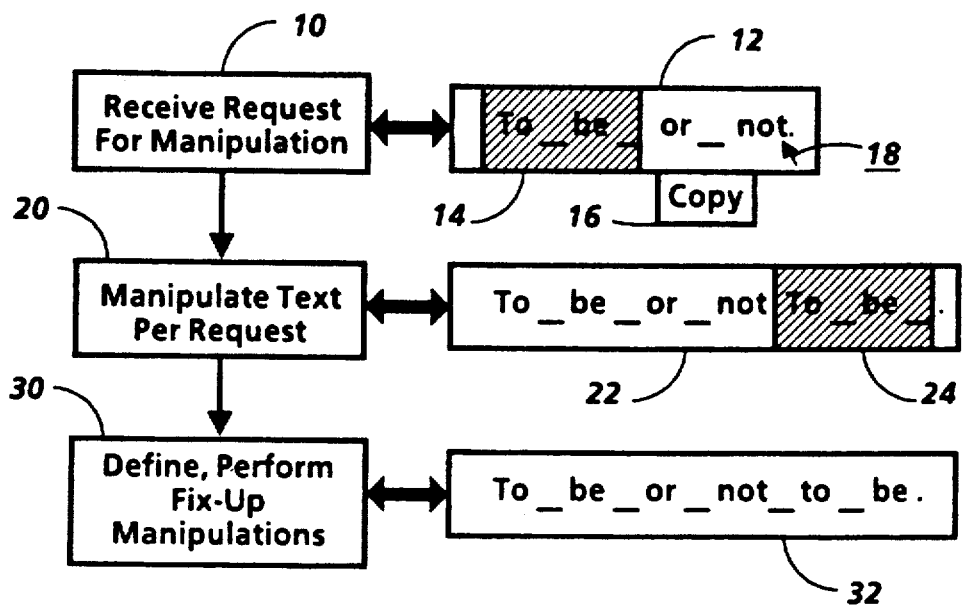
FIG. 1 is a flow chart with parallel text frames showing general steps in a manipulation operation according to the invention.

As used herein, the following terms have the meanings indicated: "Text" means an arrangement of written words, ordinarily a sequence. "Written words" means words recorded in the form of discrete elements such as characters, codes or the like. Words recorded in a continuous form such as recorded continuous speech are therefore not written words. A text may thus includes zero or more words, each with at least one discrete element.

"Natural language text" means a text of one of the natural languages, such as English.

A "unit of text" or a "text unit" is a unit into which text can be divided.

A "textual type" is a category of units of text that has syntatic or semantic significance, but not lexical significance, as explained more fully in the Trollope application, incorporated herein by reference. A single token or instance of a textual type is referred to herein as a "textual type unit," to distinguish from more complex units of text that include, for example, a series of textual type units.

A "textual type rule" is a rule whose applicability depends on textual type. In other words, if a text is divided into textual type units, a textual type rule will apply to those units that are instances of certain textual types but not to units of other types.

A "grammar of textual types" is a set of textual types rules in which each rule indicates, for a respective textual type, textual types of textual type units into which a textual type unit of the respective textual type can be divided. In addition, a "grammar of textual types" defines all and only the acceptable divisions of textual type units.

A "punctuational feature" of a text is a feature that relates to one or more textual type units and that depends on the syntatic or semantic significance of the related textual type units. For example, a punctuational feature may indicate a grouping a textual type units, a nesting of one textual type unit within another, a separation between textual type units, a delimiting of a textual type unit, or a highlighting or other emphasis of a textual type unit. Features ordinarily used as punctuational features in English include nonalphanumeric typographical features such as spaces and punctuation marks, including commas, periods, semicolons, colons, dashes, quotation marks, parentheses, brackets, underlining, and so forth; features of alphanumeric elements such as case or font; and features of format such as carriage returns, tabs, centering, and indentation.

A "punctuational structure" of a text is a structure that includes punctuational features of the text. Text, as conventionally presented for viewing and editing, is based on a data structure that includes data indicating punctuational structure, such as character codes indicating punctuation marks, spaces, or capitalization. The text data structure may correspond to text that has an incorrect punctuational structure, in which case the text is incorrectly punctuated. As noted above, errors in punctuation can be analyzed into errors in positioning textual type boundaries and errors in the combination of punctuational features that occurs at a textual type boundary. For example, sentence (1) below illustrates a boundary positioning error, because it is inappropriate to end a phrase after the work "dog" in this particular sentence; sentence (2) illustrates a punctuational feature error, because it is inappropriate to include a comma and a space before the period at the end of a sentence, even if a phrase also ends at that boundary; and sentence (3) illustrates both types of errors in a single sentence, because it is inappropriate to end a clause after the word "dog" and because it is inappropriate to include a command and a space before the semicolon at the end of a clause, even if a phrase also ends at that boundary.

(2) The dog, bit the man.
(2) The dog bit the man,.
(3) The dog,; bit the man.

An error of the second kind, illustrated in sentences (2) and (3), is referred to herein as an error in "textual type punctuational structure " because it can be identified by applying textual type rules to a text. A text with no such errors is described as having a "correct textual type punctuational structure." The present invention can correct textual type punctuation errors. As illustrated by sentence (1), however, a text may have a correct textual type punctuational structure and still be incorrectly punctuated.

In a data structure, "text data" means data corresponding to a natural language text. Text data are often encoded using standard printing or display codes that include character codes such as alphanumeric and punctuation mark codes, capitalization codes, carriage-control codes, and so forth, collectively referred to herein as "text codes." Text data can, however, be encoded in a wide variety of other ways. For example, text data can be encoded as a bitmap.

In a data structure that includes text data made up of text codes, the term "punctuational codes" means text codes used by a system to indicate punctuational features of the natural language text represented by the text data. Punctuational codes typically include text codes indicating punctuation marks, spaces, and capitalization.

A "word unit" is a sequence of text codes that has lexical significance and that, for purposes of a given system, is not divisible into smaller sequences based on punctuational codes. A word unit is thus an atomic lexical unit, and a text code within a word unit is referred to herein as a "character code" even though it may also be a punctuational code. A punctuational code within a word unit may or may not indicate a punctuational feature. A punctuational code indicating a capitalized letter at the beginning of a sentence indicates a punctuational feature, for example, while a punctuational code indicating a capitalized letter at the beginning of a proper noun does not.

A "textual type boundary" is a sequence of one or more punctuational codes that is between word units and delimits a specific textual type in text data that corresponds to text with a correct punctuational structure. A textual type boundary is sometimes referred to herein by textual type, such as "word boundary," "phrase boundary," "sentence boundary," and so forth.

A "natural boundary" occurs at each end of each word unit in text data. A natural boundary may include a textual type boundary or it may include no punctuational codes. A natural boundary with no punctuational codes may nonetheless delimit a specific textual type, and a such natural boundaries are sometimes referred to herein as empty natural boundaries of a specified type. For example, empty natural boundaries of type paragraph typically occur at the beginning and end of a document.

A "manipulation operation" on text data corresponding to a text is an operation that modifies the text data so that it corresponds to a modified text. A manipulation operation is typically specified in terms of an argument, which is a part of the text, and an operation on that argument, such as move, copy, cut, paste, or delete. A "selection operation" is an operation relating to the part of the text that can subsequently serve as an argument for a manipulation operation.

"Fix-up data" is data defining a sequence of one or more manipulation operations that would modify text data corresponding to a text so that the modified text data corresponds to a modified text having a correct textual type punctuational structure. The manipulation operations defined by fix-up data can be performed on text data corresponding to text that has an incorrect textual type punctuational structure or on text data corresponding to text that has a correct textual type punctuational structure—in either case, the result will have a correct textual type punctuational structure.

2. General Features

Figure 2:
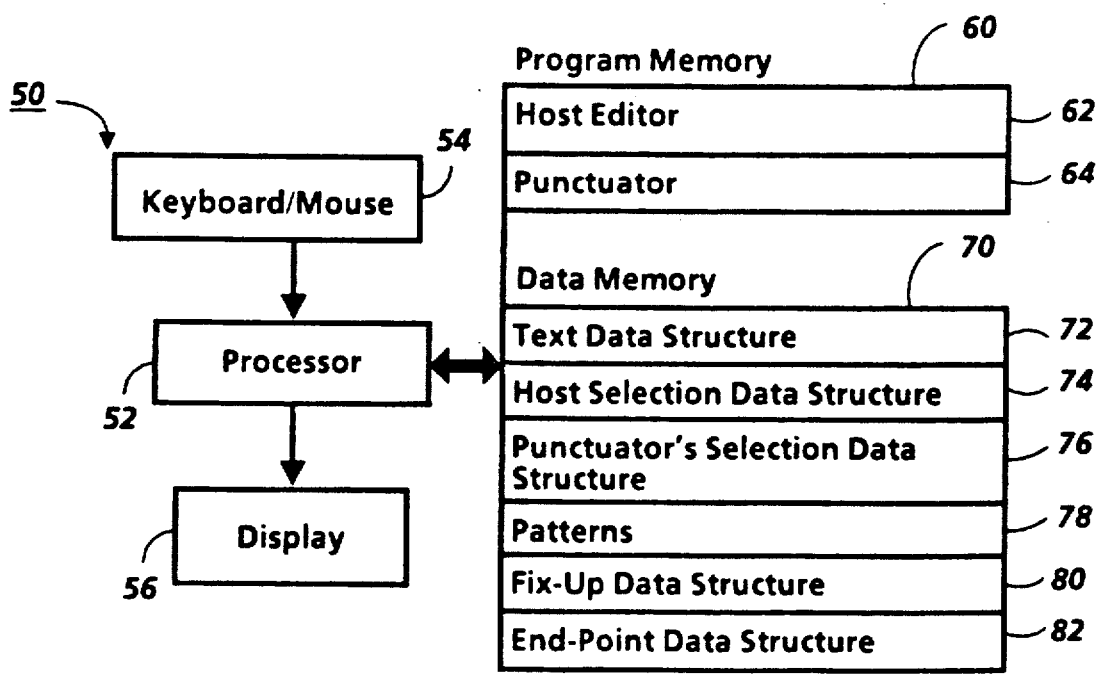
FIG. 2 is a schematic block diagram showing components of a system that includes a host editor and a punctuator according to the invention.
Figure 3:
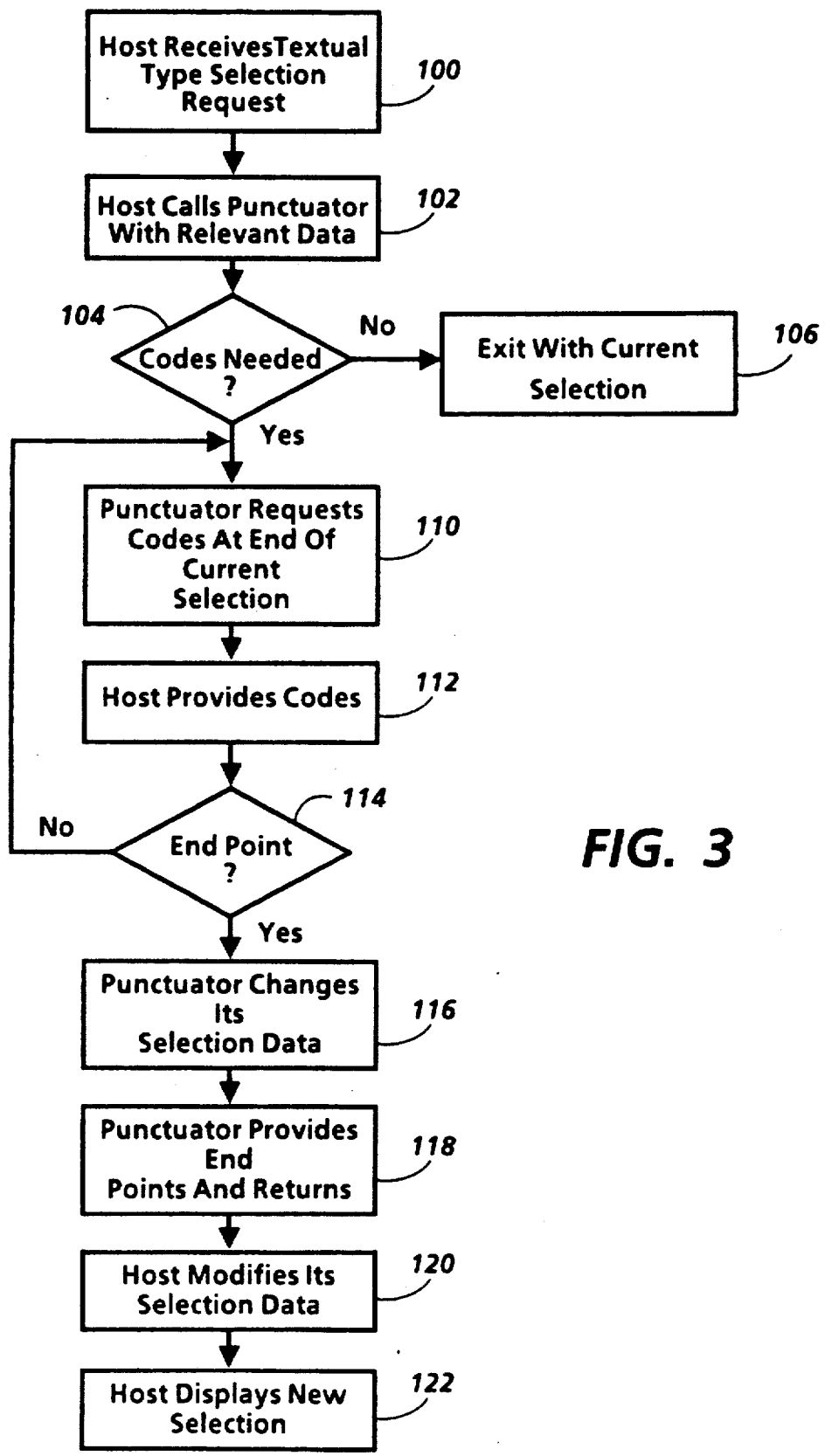
FIG. 3 is a flow chart showing general steps in a selection operation performed by a system like that in FIG. 2.
Figure 4:
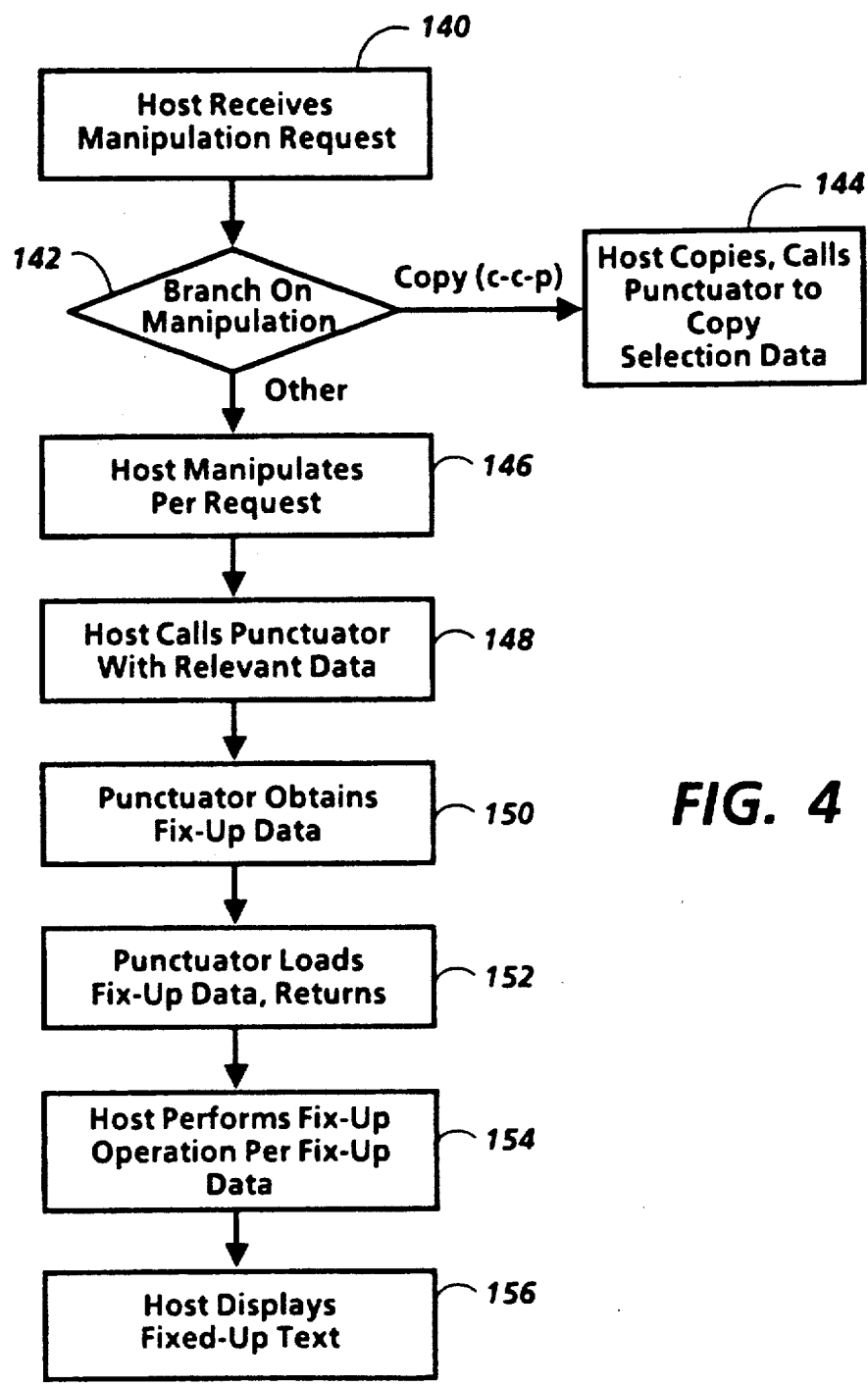
FIG. 4 is a flow chart showing general steps in a manipulation operation or other operation involving fix-up data, performed by a system like that in FIG. 2.

FIGS. 1-4 illustrate several general features of the invention. FIG. 1 is a flow chart showing general steps in manipulating text and providing fix-up data. FIG. 2 shows the components of a system that includes a host editor and a punctuator for implementing the steps in FIG. 1. FIG. 3 shows general steps in a selection operation using the system of FIG. 2. FIG. 4 shows general steps in a manipulation operation or other operation that includes providing fix-up data, again using the system of FIG. 2.

The steps in FIG. begin when a data processor receives a request for a manipulation operation, in box 10. As shown in text frame 12, this request includes a primary selection, indicated by shaded area 14; the depression of copy button 16; and a second selection of a position, indicated by pointer 18. Therefore, text frame 12 illustrates the move-copy paradigm of text manipulation, although the invention is equally applicable to the cut-copy-paste paradigm, as discussed above.

After receiving the request in box 10, the data processor manipulates the text data corresponding to the text in text frame 12, in box 20, to obtain manipulated text data corresponding to the text shown in text frame 22. The words "To be" and the spaces after each of the words, which were the primary selection in shaded area 14, have been copied to the position indicated by pointer 18, and now appear in shaded are 24. The manipulation operation resulted in three errors in capitalization and spacing, so that the manipulated text data in text frame 22 has an incorrect textual type punctuational structure.

Finally, in box 30, the data processor provides fix-up data defining a sequence of one or more operations to further manipulate the text data so that the corresponding text has a correct textual type punctuational structure. This sequence is then performed, resulting in modified text data corresponding to the modified text shown in text frame 32.

FIG. 1 illustrates how the invention can make text manipulation much more efficient. The user has been saved the effort of requesting the necessary operations to correct each of the errors in capitalization and spacing.

FIG. 1 also illustrates to an extent how fix-up data can be obtained. One aspect of the invention, as described above, is based on the recognition that an appropriate operation can almost always be inferred from the affected natural boundaries, if any, and from applicable textual types. For example, the beginning of shaded area 24 in text frame 22 has an empty natural boundary at the end of a word unit to the left and an empty natural boundary at the beginning of a word unit to the right, leading to the result that a space should be inserted and the capitalized letter that follows should be changed to lower case. Similarly, the end of shaded area 24 has a natural boundary of type word on the left and a natural boundary of type sentence on the left, leading to the result that the space and period should be replaced by a period. Once fix-up data defining these operations are provided, the text data can be changed accordingly to provide a text with a correct textual type punctuational structure, as shown in text frame 32.

FIG. 2 shows how the steps shown in FIG. 1 can be implemented with a conventional commercially popular text editor. System 50 in FIG. 2 includes processor 52, which receive input signals from keyboard/mouse 54 or any other suitable input device and which provides output for presentation by display 56. Processor 52 executes instructions from program memory 60, which includes host editor 62 and punctuation 64. Host editor 62 and punctuator 64 each include a set of routines, but can each be treated as a single entity because of the distinct roles they play. In executing host editor 62 and punctuator 64, processor 52 also accesses various data structures in data memory 70, some of which are shown in FIG. 2.

In executing host editor 62, processor 52 accesses text data structure 72 which, as described above, contains a sequence of text codes. Processor 52 can also access host selection data structure 74, which can, for example, be a cut buffer or other temporary memory for storing one or more selections and other data relating to selections. For purposes of the present invention, the detailed properties of text data structure 72 and host selection data structure 74 and the details of how host editor 62 manages them or not important, provided that host editor 62 is able to provide relevant data to permit punctuator 64 to perform its role. For example, as described below, it may be sufficient if host editor 62 is able to provide codes from text data structure 72 and buffer positions within host selection data structure 74.

Data memory 70 also includes punctuator's selection data structure 76, in which punctuator 64 stores data relating to selections. As noted above, this data can, for example, include information about a textual type boundary in the region surrounding an end of a selection. Patterns 78 are a set of patterns that punctuator 64 uses to identify a textual type boundary. Punctuator 64 provides fix-up data by loading fix-up data structure 80, from which host editor 62 retrieves that data. Upon locating end points of a selection, punctuator 64 provides data defining the end points by loading end-point data structure 82, from which host editor 62 similarly retrieves that data. Additional data structures can be provided as appropriate for additional communication between host editor 62 and punctuator 64.

FIG. 3 shows general steps that can be performed by system 50 in handling a user request for a selection operation. The request could, for example, be a mouse event such as a button click. In response to the user request, processor 52 executes an appropriate routine from host editor 62 to receive the user request, in box 100. As shown in box 100, FIG. 3 illustrates the response to a request relating to the current selection's textual type; selection requests that do not relate to textual type may not follow the steps shown in FIG. 3, if host editor 62 can handle them without calling punctuator 64.

Host editor 62 calls punctuator 64 in box 102, providing data relevant to the request received in box 100. This data could, for example, include a current pointer position and an indication of which mouse button was clicked with the pointer at that position. It could also include a handle for end-point data structure 82. Host editor 62 need not perform any steps relating to its own selection data structure 74 before calling punctuator 64, because it can rely on punctuator 64 to provide an appropriately modified selection.

Upon being called with a selection request by host editor 62, punctuator 64 branches in box 194 based on whether it needs data about additional text codes from text data structure 72 in order to determine new selection end point positions. If not, the current selection is unchanged by the request, so that punctuator 64 exits in box 106 after performing any other appropriate steps.

If it needs data about additional text codes, punctuator 64 requests data in box 110, indicating at which end of the current selection it needs additional codes. In response, host editor 62 provides the additional codes in box 112. Then punctuator 64 determines in box 114 whether the additional codes include a new end point position, which could be done using patterns 78. If not, it returns to request additional codes in box 110. Of, if it has found one end point and needs codes to find the other, it can similarly return to box 110.

When punctuator 64 has received codes that include the new end point positions of the selection, it changes the data in its selection data structure 76 accordingly, in box 116. Then, in box 118, it loads data into end-point data structure 82 to provide the identified end points to host editor 62. When punctuator 64 returns control to host editor 62, the host modifies its selection data structure 74 according to the end points in end-point data structure 82, in box 120. Then, in box 122, host editor 62 displays the new selection appropriately, such as in reverse video.

FIG. 4 shows general steps that can be performed by system 50 in handling a user request for a manipulation operation or another operation that uses the fix-up data technique. In box 140, host editor 62 receives the request, which may specify an argument and an operation on the argument, as described above. The response of host editor 62 to the request will depend on what operation is requested, as indicated by the branch in box 142. If the request is for a copy operation in the cut-copy-paste paradigm (c-c-p), host editor 62 can perform its own copy operation and can call punctuator 64 to copy the data in its selection data structure 76 into a cut buffer data structure (not shown), in box 144. This relatively simple procedure suffices because the copy operation does not require the fix-up data technique.

If the request is for an operation that uses the fix-up data technique, such as delete, cut or paste in the cut-cop paradigm, copy or move in the copy-move paradigm, or another operation such as changing textual type, described below, a more complicated procedure is followed. In box 146, host editor 62 manipulates text data structure 72 according to its conventional operation, if appropriate. Then, in box 148, host editor 62 calls punctuator 64, providing relevant data such as data indicating the operation requested in box 140 and a handle for fix-up data structure 80. In box 150, punctuator 64 obtains fix-up data defining a sequence of operations leading to a correct textual type punctuational structure. It then loads the fix-up data into fix-up data structure 80, in box 152, before returning to host editor 62. Host editor 62 performs the sequence of operations according to the data in fix-up data structure 80, in box 154, and then displays the fixed-up text, in box 156.

FIG. 4 illustrates not only how an editor's conventional manipulation operations can each be extended to provide fix-up data, but also how a conventional editor can be extended to include higher level operations such as changing the textual type of part of a text. To add a higher level operation, host editor 62 is modified so that it can identify a request for the higher level operation and so that when it receives a request for the higher level operation in box 140, it makes a corresponding call to punctuator 64, in box 148. Punctuator 64 then obtains fix-up data defining a sequence of operations that is effective to perform the higher level operation, in box 150, and the steps continue as in FIG. 4.

We turn now to consider an implementation of the features set forth above.

3. An implementation

Appendices A, B, C, and D together provide an implementation of the invention in the C programming language that can be run on a Macintosh workstation, for example. Appendices A, B, and C together are a set of routines called "TIAB", an acronym for "Trollope in a box". Appendix A includes TIAB routines that respond to calls from a host editor. Appendix B includes underlying TIAB routines that are called by routines in Appendix A. Appendix C is code defining a number of variables, data structures, and macros for TIAB. Appendix D is code that provides table lookup to determine whether a text code is in a particular set of codes.

To understand the implementation in Appendices A–D more fully, we will examine the interface between the host editor and TIAB, including the calls that the host editor provides to TIAB, the calls that TIAB provides to the host editor, and the data structures used by the host editor and TIAB to pass data to each other. Then we will examine the internal operations of TIAB, including TIAB calls to TIAB functions that identify textual type boundaries and that provide fix-up data.

A. Host-TIAB interface

The interface between the host editor and TIAB can be conveniently divided into two parts. One part, called the host editor interface, is the interface by which the host editor, in response to a request from the user, calls TIAB with relevant data and by which TIAB returns data to the host editor in response to the call. Another part, called the TIAB interface, is the interface by which TIAB calls the host editor to obtain data it needs to identify a textual type boundary and by which the host editor provides the requested data.

(1) Host Editor Calls to TIAB

As implemented in Appendix A, TIAB includes a number of functions that can be called by a host editor. These functions could be called in any appropriate sequence to provide editing operations based on punctuational structure. The host editor will typically call a TIAB function in order to obtain data relating to a selection operation or to obtain fix-up data defining a sequence of operations that should follow a manipulation operation or that implement a higher level operation.

(A) Selection Operation Calls

Figure 5:
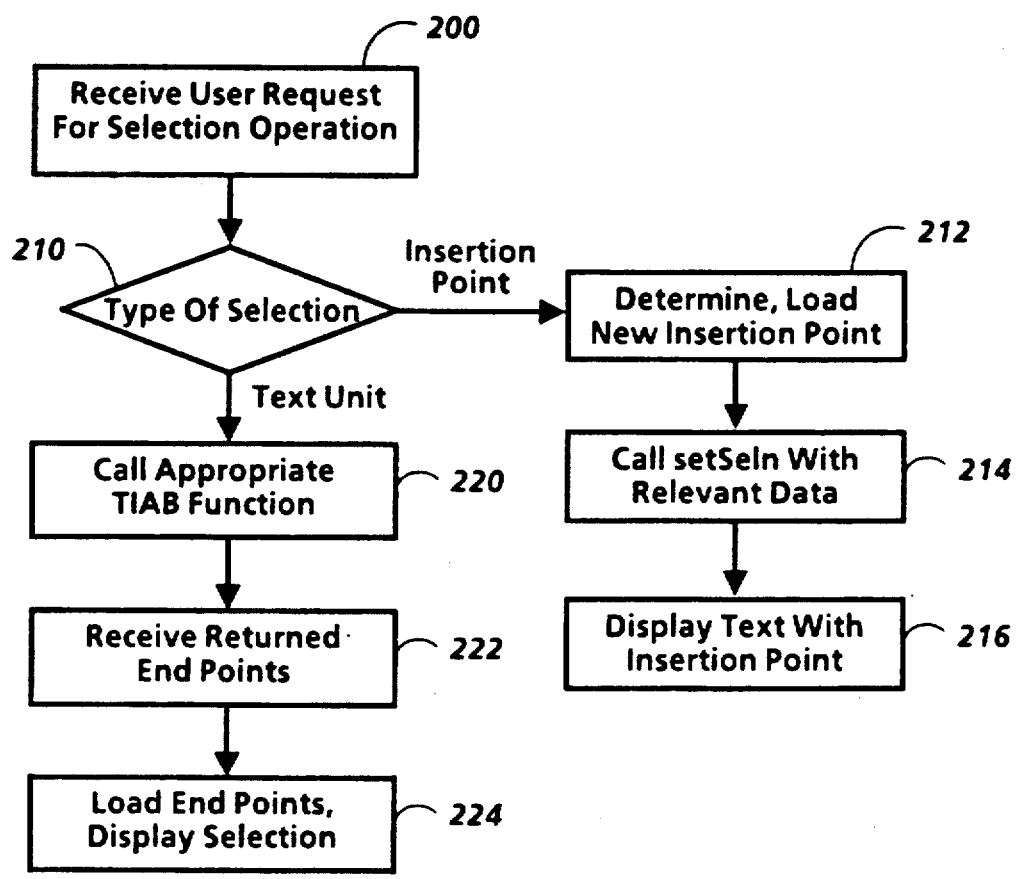
FIG. 5 is a flow chart showing host editor steps in modifying a selection.

A number of TIAB functions can be called in relation to selection operations. FIG. 5 shows general steps that occur when the user requests a selection operation, steps that are consistent with the operations of the host as described above in relation to FIG. 3. FIG. 5 does not, however, show all of the steps performed by the host editor in determining that the user has requested a selection operation, because each host editor has its own techniques for receiving a user request and determining the requested operation. A conventional editor could be readily modified to interpret a subset of its user requests for selection operations of the types available from TIAB.

The sequence in FIG. 5 begins by receiving the request from the user, in box 200. Implicit in this step are the operations by which the host editor determines whether the requested operation is a selection operation, which may include determining which of the available selection operations is requested. The host editor then branches, explicitly or implicitly, between two type s of selection operations, as shown in box 210. One type of selection operation involves modifying as selection that is a text unit, while the other involves changing a selection that is an insertion point. If the operation changes an insertion point without changing a text unit selection, it need not involve punctuational structure, so that the assistance of TIAB in determining the end points of the new selection is not necessary. If the operation changes a text unit selection, however, TIAB is called to determine appropriate end points for the selection, based on textual type boundaries.

For an operation that changes an insertion point, the host editor performs steps in box 212 to determine the new insertion point and to load a description of it into the host editor's selection data structure, typically without calling TIAB. Then, the host editor calls the TIAB function setSeln in Appendix A, providing relevant data, such as data based on the description of the new insertion point. The function setSeln loads this data into TIAB's selection data structure, a data structure of type TiabSeln, defined in Appendix C. When setSeln returns, the host editor displays the text with the new insertion point, in box 216.

For an operation that changes a text unit selection, the host editor calls an appropriate TIAB function to determine the end points of the new selection, in box 220. Therefore, the selection operations that relate to text units need not be based on or constrained by the conventional selection operations of the host editor, but rather can be defined in a way which facilitates their performance by TIAB. In the implementation of Appendix A, several distinct types of selection operations relating to text units can be performed by TIAB functions, including extendSelnKeys, extend SelnDrag, decrType, and incrType.

TIAB function extendSelnKeys changes the current selection to include or exclude one instance of the current selection's textual type on the left or right of the current selection, leaving the current textual type unchanged. Therefore, extendSelnKeys is called with data indicating whether the change should be made on the left or right of the current selection and in which direction. It could be called in response to a specially defined user request.

TIAB function extendSelnDrag extend the current selection to include the instance of the current selection's textual type that contains a current character position in the text, such as the one derived from the current mouse position, as well as all instances of that textual type that are between the current selection and that instance. The function extendSelnDrag can be called when the user invokes a conventional mouse-based adjust function, for example by dragging the pointer from the current selection to neighboring text units while holding a mouse button down or by clicking a designated mouse button to adjust the selection. A call to extendSelnDrag that results from dragging the pointer includes, in addition to the current mouse position, data indicating an anchor point in the text, in which case the selection is extended either forward or backward from the anchor point to the current mouse position.

TIAB function incrType changes the textual type of the current selection to the next higher textual type and may, if appropriate, extend one or both ends of the current selection to include any additional text codes necessary to reach the closest surrounding textual type boundaries of the new textual type. It is appropriate to call incrType in response to multiple mouse clicks with the pointer in the same position. TIAB function decrType, on the other hand, changes the textual type of the current selection to the next lower textual type and may, if appropriate, drop text codes from the right end of the current selection to reach a textual type boundary of the new textual type.

In making a call to any of these functions, the host editor includes a pointer to a data structure for returning a description of the new selection, such as a data structure of type TextRegion as defined in Appendix C. The description includes the end points of the new selection, for example, an offset and a length. Each TIAB function then returns a description of the new selection in that data structure, in box 222. The host editor then loads this data into its selection data structure and displays the new selection, in box 224.

The host interface can thus call TIAB functions to obtain end points of a new text unit selection. We turn now to calls made by the host interface in response to which TIAB provides fix-up data.

(B) Calls for Fix-up Data

The host editor can also call a TIAB function as part of the response to a request for an operation that requires fix-up data, such as one of the manipulation operations. As discussed above in relation to FIG. 4, the copy operation in the cut-copy-paste paradigm is different than other manipulation operations, because it does not require that TIAB provide fix-up data, so that the only necessary TIAB function is to copy TIAB's selection data to its cut buffer data, through a call to copySeln. For other manipulation operations, however, the host editor calls a TIAB function to provide fix-up data, after which the host editor can perform the sequence of operations defined by the fix-up data. In addition, the host editor can be extended with additional operations, for each of which it similarly calls a TIAB function to provide fix-up data defining a sequence of operations effective to perform the additional operation.

The portion of the host interface that calls TIAB functions to provide fix-up data can be structured so that the host editor first performs its own appropriate operation, such as a manipulation operation. Then the host editor clears TIAB's token and character caches through a call to the function tiabFlushCashe in Appendix A, which is necessary whenever the host changes its text buffer because TIAB's caches are no longer valid. At this point, the host editor calls the appropriate TIAB function to provide fix-up data defining a sequence of operations for a position in the text data or sequences of operations for both ends of a text unit.

The implementation of Appendix A provides several functions that provide fix-up data, including cutSeln for a cut operation in the cut-copy-paste paradigm; pasteSeln for a paste operation; deleteSeln for a delete operation; changeCategory to change the textual type of a selection; toggleCapitalization to change capitalization; and addBrackets and removeBrackets to add and remove brackets, respectively, When one of these TIAB functions returns with fix-up data, the host editor performs the sequence of operations defined by the fix-up data and may then conclude with appropriate calls to such TIAB functions as tiabFlushCache, innitFixup, setIpt, and getSeln.

Figure 6:
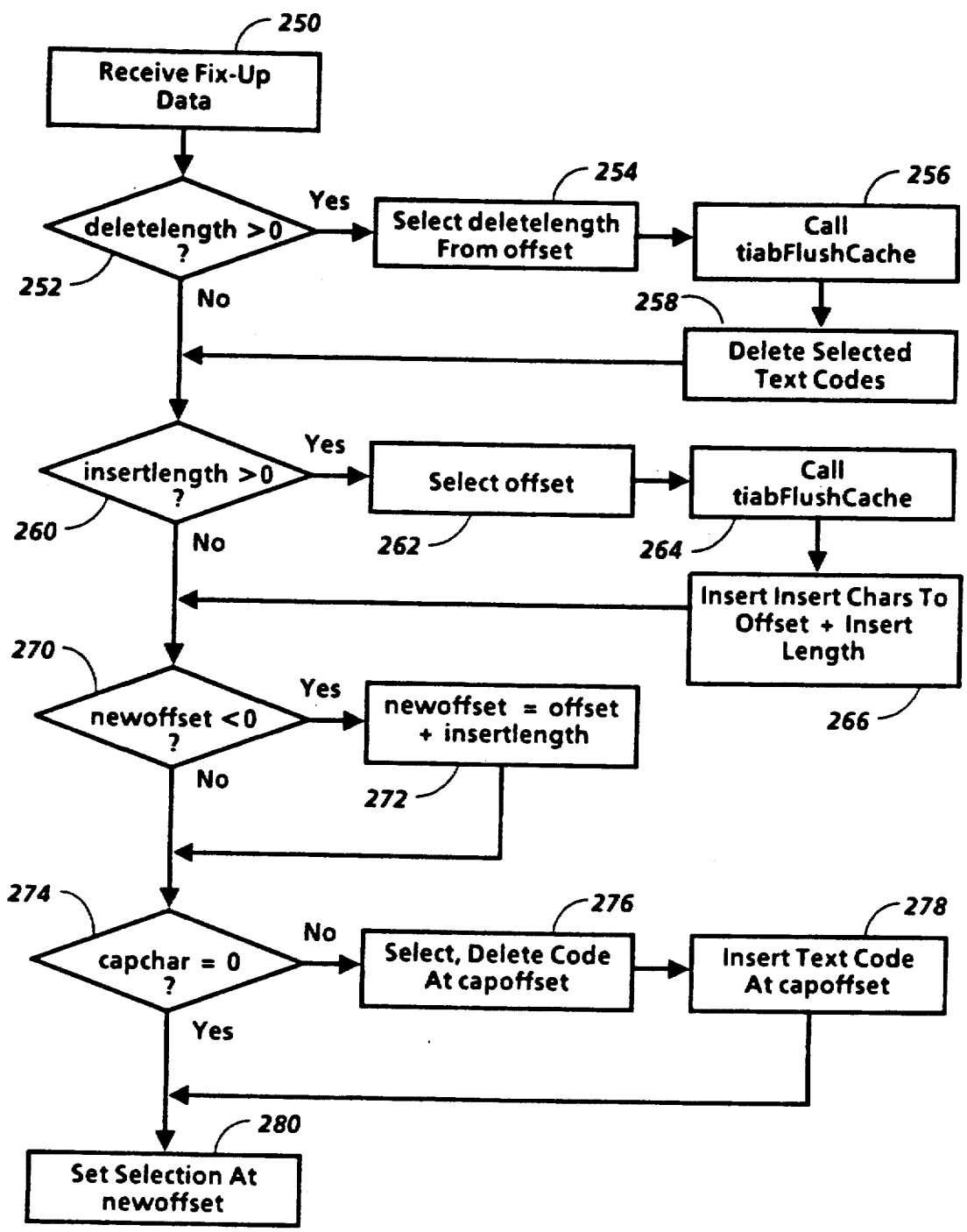
FIG. 6 is a flow chart showing host editor steps in performing a sequence of operations defined by fix-up data.

FIG. 6 shows general steps that can be followed by a conventional host editor upon receiving fix-up data returned by a TIAB function. These steps could alternatively be implemented as part of TIAB, but they depend on the underlying functions available in the host editor so that including them in TIAB specializes TIAB to the host editor. The data structure RegionFixup, defined in Appendix C, is used to provide data structure steps in FIG. 6. In addition, RegionFixup, as defined in Appendix C, includes some data to permit a host editor to undo a sequence of operations defined by fix-up data. In general, RegionFixup could include other data to enable the host editor to perform other appropriate functions, but the data included in RegionFixup as defined suffices to define a basic sequence of operations instances of which can be combined to produce any necessary modification of a text. The basic sequence is illustrated in FIG. 6.

The sequence in FIG. 6 begins by receiving the fix-up data in RegionFixup, in box 250. The TIAB function that provides the fix-up data could return a handle, such as a pointer, for an instance of RegionFixup containing the fix-up data. The host editor routine that called the TIAB function could then include that handle in a call to another host editor function to perform the steps in FIG. 6.

The test in box 252 determines whether the field deletelength contains a value greater than zero, indicating that one or more characters should be deleted. If so, the step in box 254 selects a sequence of codes from the text data of length deletelength, beginning at offset. The step in box 256 calls tiabFlushCache. The step in box 258 then deletes the selection made in box 254.

The test in box 260 next determines whether the field insertlength contains a value greater than zero, indicating that one or more characters should be inserted. If so, the step in box 262 selects the position offset to establish the insertion point. The step in box 265 calls tiabFlushCache. The step in box 266 then inserts the codes in the field insertchars from the selection made in box 262 to the position offset + insertlength.

The test in box 270 determines whether the field newoffset contains a value less than zero, indicating that the insertion point should go at the end of the inserted codes, in any. If so, the step ion box 272 loads the position offset + insertlength in the field newoffset. Alternatively, TIAB could provide the correct value of newoffset.

The test in box 274 determines whether the field capchar contains a value equal to zero, indicating that capitalization need not be changed. If capchar is less than zero, a character should be changed to lower case, but if greater than zero, to upper case. The step in box 276 selects and deletes the text code at the position indicated by capoffset. Then, the step in box 278 inserts at capoffset a text code of the appropriate case. An alternative approach to capitalization would be to perform a deletion and insertion as described above.

Finally, the host editor sets its selection to the position indicated by newoffset. At this point, the host editor may perform further operations before concluding the requested operation, as noted above. These further operations may include calling setSeln so that TIAB keeps track of the host's current selection.

Although the fix-up data defines a sequence of operations that result in a correct textual type punctuational structure, the user may find the result undesirable. Therefore, the host editor could also permit the user to select an operation undoing a sequence of operations that has been done in the manner shown in FIG. 6. Undoing the sequence of operations would include changing the capitalization back, deleting the inserted characters, and inserting the deleted character, at which point the text data will be restored to its state before the fix-up data was obtained. To permit this, RegionFixup includes fields for storing the necessary data, redochars and nRedochars, as shown in Appendix C.

This also permits a two-stage approach to certain requests for manipulation operations. For example, in the cut-copy-paste paradigm, a deletion can be made by deleting and typing over or by deleting and moving the insertion point to another position. The fix-up data in these two options may be different because the modifications made are different. Therefore, the host editor can initially handle a deletion request as if it were one of these two options and, if it turns out to be the other, undo the sequence of operations it has performed and then obtain fix-up data for an appropriate sequence of operations for the other option.

The host interface to TIAB can be extended to provide additional selection operations or additional operations that provide fix-up data. In each case, a TIAB function is added to handle the additional operation.

We turn now to examine the TIAB interface to the host, through which the TIAB functions obtain the data necessary to identify a textual type boundary or to identify an appropriate sequence of operations to provide a correct textual type punctuational structure. Compared to the host interface, the TIAB interface is relatively simple.

(2) TIAB Calls to Host

The primary purpose for which TIAB calls the host editor is to obtain data about the host's text data structure. Therefore, the TIAB interface to the host includes a few host functions that TIAB can call for that purpose. Although the implementation of these functions depends on the manner in which the host editor is implemented, each is a relatively simple function if the host editor uses a conventional text data structure containing a sequence of text codes.

The function getchars1 in Appendix B is the TIAB function that calls a host editor function tiabGetPointer to obtain a pointer to a position in the text data structure and a length of a string text codes that begins at that position. The host editor function tiabGetPointer can in turn be implemented by appropriate calls to its underlying functions. For instance, if the host editor on a Macintosh workstation is using the routines in the ROM conventionally known as Text Edit, it could obtain the pointer by calling *((TEH).hText), and could obtain the length by calling (TEH).teLength. Then, tiabGetPointer returns the getchars1 a value indicating the actual offset.

In general, TIAB requires the host editor to do the memory management on text blocks. The general approach to obtaining text codes for TIAB is as follows: tiabGetPointer provides a means by which the host editor may indicate a range of text codes within its internal data structure that may be read (but not changed) by TIAB. If the host editor represents its internal data in such a way that this is inconvenient or impossible, then the host must provide a different set of functions that manage memory blocks and fill them with characters that are copied by the host editor from its internal data structure. This includes the following functions; tiabGetTextBlock, which returns a pointer to a text block using the host editor's preferred memory management scheme, and also returns the number of text codes actually copied; tiabFreeTextBlock, in response to which the host editor frees a text block allocated with tiabGetTextBlock; tiabFreeAllBlocks, in response to which the host processor frees all text blocks allocated with tiabGetTextBlock; tiabLastCharPosn, which returns the index of the last text code in the host editor's text buffer, indicating the number of text codes in the buffer; and tiabCopyChars, which copies a specified number of text codes beginning at a specified offset into a specified text block, and which also returns the number of text codes copied. In freeing text blocks, TIAB can use tiabFreeAllBlocks or can loop through its array calling tiabFreeTextBlock on each iteration.

Although the TIAB interface to the hose is relatively simple, some TIAB functions that make use of the data obtained from the host perform complex computations. We turn now to examine the inner workings of TIAB.

B. TIAB Calls to TIAB

The high level TIAB functions that are called by a host editor fall into two groups, as described above in relation to the host interface to TIAB, one for providing end points of a new selection and another for providing fix-up data. Yet the TIAB interface to the host editor has one primary low-level function, getchars1, which calls the host to obtain codes from the host's text data structure. In between the high level functions and getchars1 are several intermediate levels of TIAB functions.

The first level above getchars1 includes the functions getcharsForward, getcharsBackward, and charAt, which can be called respectively to access codes extending forward from a give position in the host editor's text data structure, to obtain codes extending backward from a given position, or to obtain the code at a given position, This level also includes several functions that can search for a given code or for a code in a given set, including charSearchFwd, charSearchBkwd, charSet- SearchFwd, and charSetSearchBkwd. These functions are found in Appendix B.

TIAB does not make use of the meanings or other differences between words in text except those differences that relate specifically to punctuational structure. Therefore, TIAB ignores most of the differences between words by tokenizing the text codes that make up the text so that each word is represented by a token of one of a small number of types, including word, capitalized word, abbreviation, capitalized abbreviation, and, when fine-grained words are being distinguished, word internal, meaning an punctuational code that is part of a word and that would otherwise be represented by a punctuational token but is treated differently when it occurs as part of a word. TIAB treats other codes that relate to punctuational structure as tokens of other types, such as punctuational tokens of types comma, quotation mark, colon, space, period, multiple dashes ellipses, and so on.

Some of the TIAB functions at the next level, tokenScanFwd and tokenScanBkwd in Appendix B, scan through the text code sequence, finding each token boundary and returning the appropriate token code. Other functions can be called to find a token boundary, including tokenBndryRight, tokenBndryLeft, tokenBndryLeft1, and tokenBndryAt in Appendix B, and some of these functions use tokenScanFwd and tokenScanBkwd. These tokenizing functions rely on a number of subsidiary functions to manage a token cache that they share, so that tokenizing is performed dynamically and stored in the token cache to the extent possible.

The high level TIAB functions that identify new selection end points, including extendSelnKeys, extendSelnDrag, incrType, and decrType, rely on two intermediate functions that find textual type boundaries, boundaryBefore and boundaryAfter, to identify the end points of a selection. These boundary-finding functions are also in Appendix A.

The high level TIAB functions that provide fix-up data include addBrackets, removeBrackets, changeCategories, cutSeln, deleteSeln, pasteSeln, and toggleCapitalization. Of these functions changeCategories, cutSeln, deleteSeln, and pasteSeln, rely on an intermediate function, getFixupInfo, which is specialized to the task of obtaining information about a natural boundary for use in providing fix-up data. Other TIAB functions relating to natural boundaries include scanNatBndryFwd, scanNatBndryBkwd, nbStartPosn, nbEndPosn, propagateNatBndry, natBndryHere, and checkNBQuotesBrkts, all in Appendix A.

We turn now to examine the operations of some of these functions in greater detail. After considering representative functions that illustrates the roles played by functions at the lower levels, we will consider the main features of the intermediate and higher level functions.

(1) Code Access and Search

Figure 7:
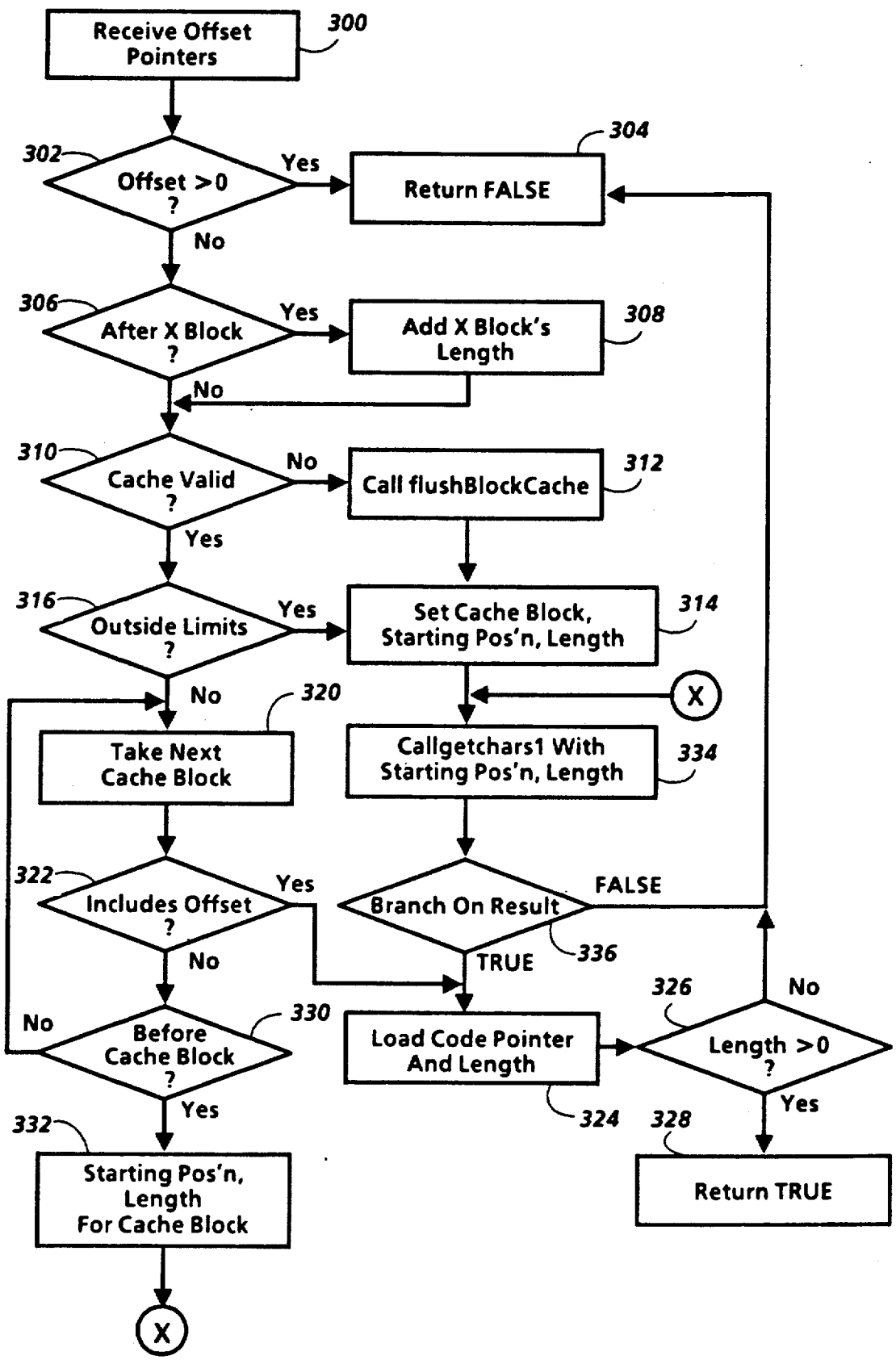
FIG. 7 is a flow chart showing steps in retrieving text codes from a host editor's text data structure.
Figure 8:
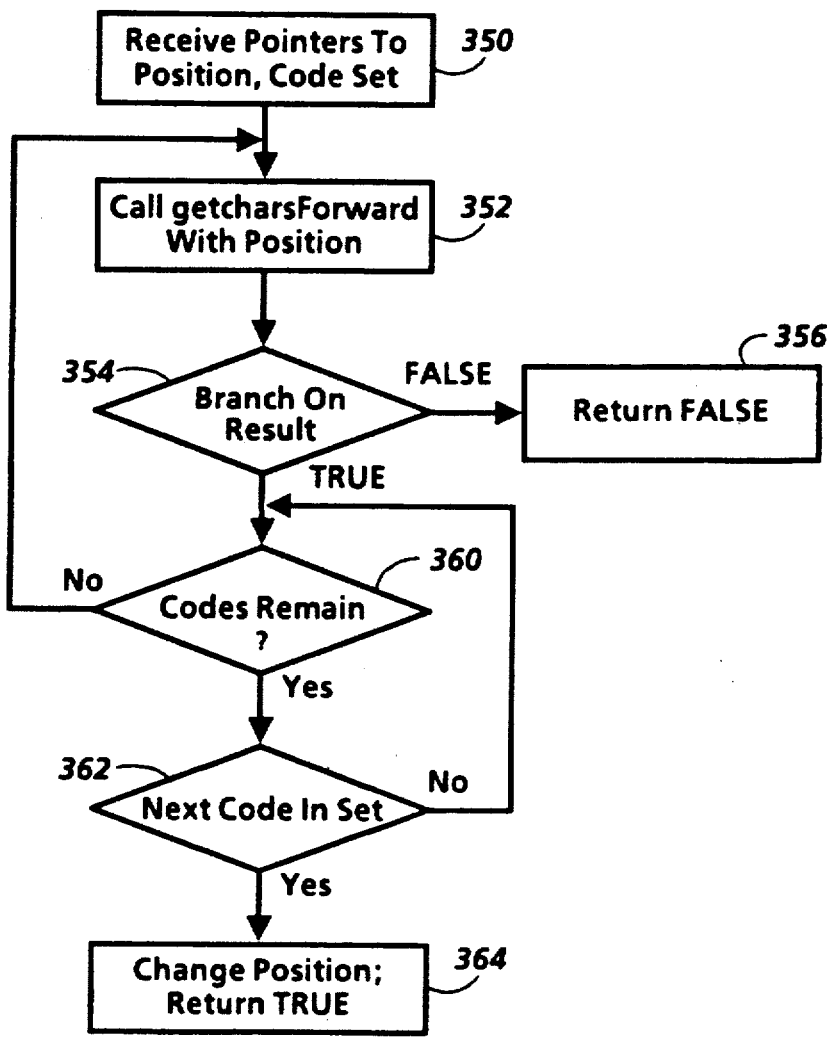
FIG. 8 is a flow chart showing steps in searching the host editor's text data structure for a text code.

FIG. 7 shows steps within getcharsForward, which retrieve text codes forward from a specified position in the host editor's text data structure. FIG. 8 shows steps within charSetSearchFwd, which searches the text data structure for a text code in a specified set of codes.

The function getcharsForward is called in box 300 with a position in the host's text data structure, called the offset, and with pointers to two locations, into one of which it loads a pointer to a starting code and into the other of which it loads a length indicating the number of valid codes beginning with the starting code. The test in box 302 determines whether the offset received in box 300 in less than zero, indicating a position before the beginning of the host editor's text buffer or other text data structure. If so, getcharsForward returns FALSE in box 304, indicating failure to retrieve any codes.

If the offset is greater than zero, the test in box 306 determines whether the offset is greater than or equal to the offset of a block of codes called the excluded block. The excluded block is a text region that getchars1 ignores; the excluded block thus makes it possible in a paste operation to operate on the text codes as they would have been after a delete operation and before an insert operation, without performing a delete operation, then calling TIAB, then performing a paste operation, and then calling TIAB again. If the offset is as great or greater than the excluded block offset, the excluded block's length is added to the offset, in box 308.

The steps beginning in box 310 relate to a cache that includes an array of entries, each corresponding to a block of text codes. Each block's cache entry includes data defining the block, as shown in Appendix C, including the block's offset, length, and a pointer to the first code in the block. Within the cache, the entries are sorted by offset. The steps necessary to setting up the cache include checking whether the cache includes valid data, in box 310; if not, a call to flushBlockCache clears it, in box 312, after which the cache block to be loaded with retrieved text codes is selected and the offset and length of the text codes to be retrieved are set, in box 314. If the cache has valid data but the offset is above or below the cache limits, as determined in box 316, the cache block to be loaded, the offset, and the length for retrieval are similarly set in box 314 to retrieve a block of text codes that will not overlap with the highest or lowest previously cached block.

In the case where the offset received in box 300 falls within the cache limits, the step in box 320 begins an iterative loop that goes through the previously loaded cache blocks, searching for the cache block which either includes the offset or has a cache block offset greater than the offset received in box 300.

The test in box 322 determines whether the offset is in the next cache block and, if so, the step in box 324 loads the code pointer to the appropriate code within the cache block and the length of the code sequence following that code in the cache block, taking into account the excluded block if necessary. The test in box 326 then determines whether the length of the code sequence is greater than zero. If not, FALSE is returned in box 304, as above. But if so, TRUE is returned in box 328, indicating success.

If the offset is not in any of the cache blocks, but falls before the offset of a previously loaded cache block, as determined by the test in box 330, the step in box 332 sets the starting offset and length of the text codes to be retrieved, where possible making them contiguous with a previously loaded cache block.

When the offset does not point to a position in any of the previously loaded cache blocks, whether outside or within the cache limits, the step in box 334 calls getchars1 with the starting offset and length of the text codes to be retrieved. First, getchars1 sets up a cache block header for the text codes to be retrieved. By a call to tiabGetPointer, getchars1 requests the pointer to the codes and the length, loading the pointer to the codes into the appropriate cache block field. If the length is zero, getchars1 calls tiabCopyChars to obtain the text codes. Otherwise, getchars1 sets the cache block length equal to the length from tiabGetPointer and adjusts the limits of the cache block to include the block of text codes, finally returning TRUE. Then, getcharsForward branches in box 336 based on the result returned by getchars1. If the result is FALSE, getcharsForwar also returns FALSE, in box 304. If the result is TRUE, indicating retrieval of text codes, the step in box 324 loads the code pointer and length, as above, and the test in box 326 determines whether to return TRUE or FALSE.

The function getcharsBackward is similar to getcharsForward, except that it retrieves codes going backward from the offset. The function charAt uses getcharsForward to retrieve the code at a specified position.

The function charSetSearchFwd, as shown in FIG. 8, is called with two pointers, one to data indicating a position in the text data structure and the other to a bitset identifier indicating a set of text codes, in box 350. The step in box 352 calls getcharsForward, providing the position as the offset. The branch in box 354 is based on the result returned by getcharsForward, with charSetSearchFwd returning FALSE in box 356 if getcharsForward returned FALSE. If getcharsForward succeeded in retrieving a sequence of text codes, however, the step in box begins an iterative loop that goes through the codes. The test in box 362 determines whether each code is in the set indicated by the bitset identifier, calling the macro BITSET, defined in Appendix C. Upon finding a code in the set, charSetSearchFwd changes the position to the position of that code and returns TRUE to indicate that it found a code in the set. If none of the codes is in the set, charSetSearchFwd returns to the step in box 352 to retrieve another sequence of text codes.

Appendix B includes several other functions resembling charSetSearchFwd, including charSearchFwd and charSearchBkwd to search forward and backward for a specified code, and charSetSearchBkwd to search backward for a code in a specified set.

(2) Token Scanning

Figure 9:
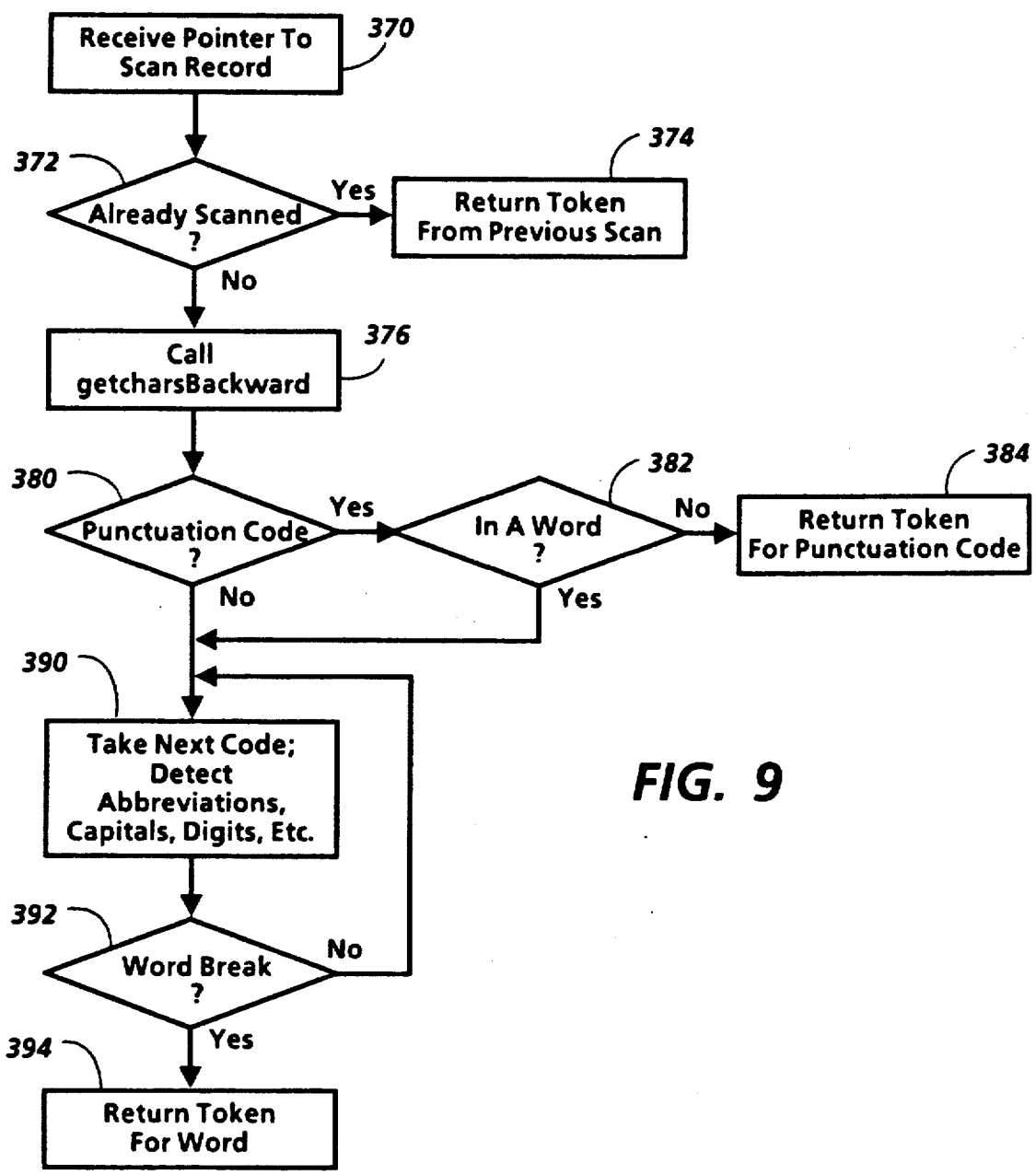
FIG. 9 is a flow chart showing steps in scanning text codes to find a token boundary.

FIG. 9 shows general steps in the function tokenScanBkwd in Appendix B. This function checks for patterns of text codes and converts recognized patterns into token codes. Numerous patterns can be recognized, so that tokenScanBkwd includes complicated pattern matching operation, but the steps in FIG. 9 do not shown the details of pattern matching.

In box 370, tokenScanBkwd begins by receiving a pointer to a scan record, a data structure defined in Appendix C that contains a record of a scan for token. The scan record includes a pointer to a boundary within the text data structure. The test in box 372 determines whether the token boundary that precedes that boundary in the text has already been scanned. If so, the step in box 374 retrieves the previous result from a token cache and returns it.

If the preceding boundary has not been previously scanned, the step in box 376 calls getcharsBackward to retrieve a sequence of text codes to be scanned, and similar calls are made elsewhere within tokenScanBkwd as necessary. If one of these calls returns FALSE, the scan fails, and a value is returned indicating a scan failure.

The test in box 380 begins a sequence of steps that scan backward through the text codes to find the next token boundary. The test in box 380 detects whether the next code is one of the punctuational codes that correspond to a token code. If so, the test in box 382 determines whether it is a punctuational code that occurs within a word. If it is not within a word, the step in box 384 returns the appropriate code for the punctuational code.

When a word has been detected, the step in box 390 begins a short iterative loop that goes through the codes in the word, obtaining any information about abbreviations, capital letters, numbers, or other characteristics of the word that have a bearing on which token code should be assigned to it. This continues until a word break is detected in box 392. Then the appropriate token code for the word is returned.

The details of tokenScanBkwd are complex because the rules for word formation that it applies are relatively complex. They are adapted to conventions of the English language, but could alternatively be adapt to conventions of another language. As implemented in Appendix B, tokenScanBwkd permits words that contain internal hyphens and apostrophes, and, under certain conditions, words that contain commas, periods, and colons. For example, the following would be treated as words:

it's
10:30
$1,000.00
real-time

The implementation in Appendix B also allows word boundaries to be detected at word-internal punctuation marks, because it is sometimes convenient to be able to select parts of words in this way.

Appendix B includes several other functions resembling tokenScanBkwd, including tokenScanFwd, which scans forward rather than backward; tokenBndryRight, which determines whether the current position is a token boundary and, if not, moves forward to the next token boundary; and tokenBndryLeft, which moves backward to the next token boundary if the current position is not a token boundary. The functions tokenBndryRight and tokenBndryLeft are useful to start a scan on a token boundary.

Table I shows the relationship between text codes and token codes that result from token scanning.

TABLE I

| | "Drive," he said. | | | | | | | |
|---|---|---|---|---|---|---|---|---|
| Text Codes | " | Drive | , | " | | he | said | . |
| Token Codes | LQ | W-Cap | C | RQ | Sp | W | Sp | W | P |

The text codes in Table I form a sentence, as indicated in the title. The token codes, on the other hand, include codes that indicate each occurrence of several types of punctuational codes, including left quotation mark (LQ), comma (C), right quotation mark (RQ), space (Sp), and period (P). In addition, the token codes include codes for types of word units, including capitalized word (W-Cap) and ordinary word (W).

The functions in Appendix A perform various operations on a stream of token codes in order to find end points and provide fix-up data. We turn now to consider some of those operations.

(3) End Points

Figure 10:
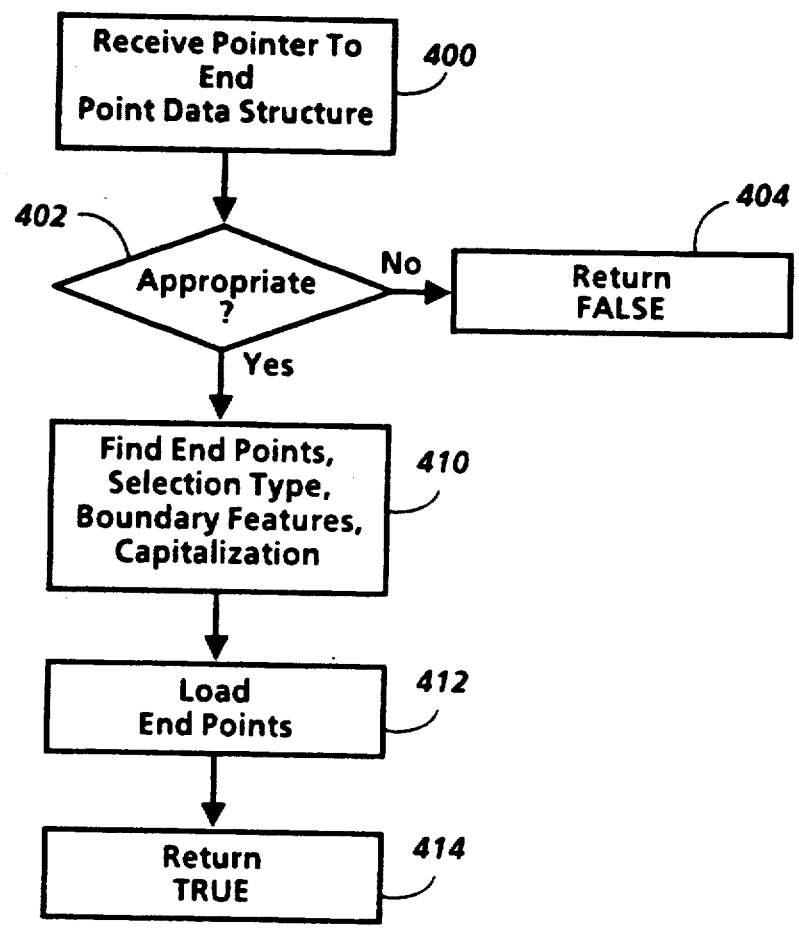
FIG. 10 is a flow chart showing general steps in a punctuator selection operation.

The functions in Appendix A that respond to host editor calls relating to modification of a selection include extendSelnKeys, extend SelnDrag, incrType, and decrType. Each of these TIAB selection functions responds by providing end points of a new selection. FIG. 10 shows general steps followed by these functions.

The sequence of FIG. 10 begins when one of the TIAB selection functions is called by the host editor. As shown in box 400, this call includes a pointer to an end point data structure. When the TIAB selection function returns, the host editor retrieves the new end points from the end point data structure and uses them to define the new selection. The call to the TIAB selection function may also include other data. For example, a call to extendSelnDrag includes a position and an anchor point within the host editor's text data structure, and a call to extendSelnKeys includes a code indicating which way the selection should be extended and from which of its old end points.

The TIAB selection function may begin in box 402 by determining whether it has been appropriately called. The functions extendSelnDrag and extendSelnKeys, for example, are not appropriate if there is no currently selected text unit. Similarly, incrType is not appropriate if the type of the currently selected text unit is the highest textual type, which is the type paragraph in Appendix A. If not appropriately called, the TIAB selection function returns the value FALSE in box 404, to which the host editor can respond with an appropriate error message or signal, such as by flashing the current selection.

If the TIAB selection function has been appropriately called, it proceeds to obtain the data for providing the end points and also for enabling subsequent functions to provide fix-up data, in box 410. In the implementation of Appendix A, this data is held in a TiabSeln data structure, defined in Appendix C. As shown there, the data can include data indicating end points of the new selection, such as an offset and length; data indicating one or more textual types relevant to the new selection, such as the type of the selection itself and, if the selection is of type bracket, the underlying type; data indicating features at the end points of the new selection, such as the token, token length, and textual type of the natural boundary at an end of the selection; and data indicating whether the selection is capitalized. Each of the TIAB selection functions obtains this data in its own way.

The simplest of the TIAB selection functions, decrType, is implemented in Appendix A so that it adjusts the right end point of the current selection to obtain the new selection, and then only if it is appropriate to adjust the right end point. For instance, if the current selection is of type bracket or dashes, decrType does not adjust the right end point, but decrements the underlying type of the selection fi the underlying type is greater than type character. But if the selection is of a type greater than type character, and if it has a natural boundary on its right of length greater than zero, decrType drops the tokens in the natural boundary, adding one back if it is one of the closing brackets before decrementing the type of the selection.

In contrast to decrType, the TIAB selection functions incrType, extendSelnKeys, and extendSelnDrag all depend on the intermediate TIAB functions boundaryAfter and boundaryBefore to find textual type boundaries as necessary. These intermediate functions are called with a pointer to a ScanRecord data structure, as defined in Appendix C, through which each function returns the positions at the ends of a textual type boundary. Each function also returns a value indicating the textual type of the boundary.

As described above, a textual type boundary always includes at least one token, and boundaryAfter and boundaryBefore each operate by matching the token stream against token patterns that are included implicitly in the operations they perform. The patterns used in the implementation of Appendix A include the following: a comma token, optionally followed by a space token, is a textual type boundary of type phrase; a semicolon, dash, or three-dot ellipsis token, optionally followed by a space token, is of type clause; a period, question mark, or exclamation mark token followed by at least two spaces tokens (or alternatively by only space token according to an option flag that is intended to be set by the host editor in response to a user request) is of type sentence. In these patterns, a comma or period token could be followed by a right single or double quote mark token, and a textual type boundary of type sentence could include any number of right quote and parenthesis tokens preceding the space tokens. These patterns are appropriate for the English language, but similar patterns could be formulated for other natural languages. Upon identifying the textual type of a textual type boundary, boundaryBefore and boundaryAfter load the data defining its ends and return its type. As a special case, the function boundaryAfter preliminarily determines whether its beginning is just after a token of type abbreviation, in which case it returns the type of the boundary immediately following the abbreviation.

Table II illustrates the relationship between an excerpt from a stream of token codes and the textual type codes returned by the function boundaryAfter.

TABLE II

| Token Codes | LQ | W | C | RQ | Sp | W | Sp | W | SC | Sp | W | P | Sp | Sp |
|---|---|---|---|---|---|---|---|---|---|---|---|---|---|---|
| Textual Type Codes | S | Ch | F | F | F | Ch | W | Ch | Cl | Cl | Ch | S | S | S |

The textual type codes in Table II include character (Ch), word (W), phrase (F), clause (Cl), and sentence (S), while the token codes include those introduced above in relation to Table I and semicolon (SC).

As can be seen from Table II, the textual type code for each token code indicates the textual type of the preceding text unit, so that where a series of punctuation token occur, each of them may have the same corresponding textual type code. The each one of the series of token codes corresponding to a comma, a quote mark, and a space, for example, has the textual type code for a phrase, while each of the series corresponding to a semicolon and a space has the code for a clause, and each of the series corresponding to a period and two spaces has the code for a sentence. A series of token codes with the same textual type can, as a result, be treated as a unit with that textual type and with specified ends and a length when appropriate.

Each of the three TIAB selection functions that rely on boundaryAfter and boundaryBefore has a distinct sequence of operations. The function extendSelnKeys calls the appropriate one of four functions, each of which in turn calls the appropriate one of boundaryAfter or boundaryBefore; the four functions are extendRightFromRight, extendRightFromLeft, extendLeftFromRight, and extendLeftFromLeft. The function extendSelnDrag determines whether to call boundaryAfter or boundaryBefore based on whether the position in the call is before or after the anchor. The function incrType, after incrementing the type of the current selection, calls both boundary After and boundary Before in a loop that repeatedly extends the selection until an appropriate bracketed selection, as determined by checkBracketIncr, or an appropriate unbracketed selection is reached; incrType thus responds to multi-clicking in which each successive click increments the active textual type and selects the minimum surrounding region of that type, from character to word, phrase, clause, sentence, and paragraph; if a selection begins within a bracket-delimited structure, such as a parenthetical or quotation, multiclicking selects that structure at an appropriate point in the sequence; but if a bracket-delimited structure is part of the surrounding text that should be selected as a result of a clock, the structure is selected in its entirety.

After obtaining the end points of the new selection, each of the TIAB selection functions also obtains other relevant data such as boundary features and capitalization. This data is stored in the TiabSeln data structure described above.

Each of the TIAB selection functions concludes by loading the end points of the new selection into the end point data structure, in box 412, and then returning TRUE in box 414. The host editor can then retrieve the end points of the new selection and use them to determine the new selection which is then displayed, as described above in relation to FIG. 3.

(4) Fix-Up Data

The functions in Appendix A that provide fix-up data include addBrackets, removeBrackets, changeCategories, cutSeln, deleteSeln, pasteSeln, and toggleCapitalization. Of these functions, cutSeln, deleteSeln, and pasteSeln are called by the host editor after performing a manipulation operation in the cut-copy-paste paradigm; as note above, the function copySeln is also called as a result of a manipulation operation, but rather than providing fix-up data, copySeln merely copies TIAB's selection data structure into another TiabSeln data structure that serves as TIAB's cut buffer data structure. The other functions, addBrackets, removeBrackets, changeCategories, and toggleCapitalization provide higher level operations by providing fix-up data defining how the higher level operations can be performed.

In general, the TIAB functions that provide fix-up data are based on the conventions of the English language, so that each function implicitly includes a set of rules that it uses to obtain appropriate fix-up data. Other natural languages with different conventions might require different rules and hence different functions to provide fix-up data, but the general approach of providing fix-up data defining a sequence of operations that leads to a correct textual type punctuational structure should be applicable to other written natural languages.

The functions addBrackets, removeBrackets, and toggleCapitalization involve relatively simple rules, and apply those rules using such functions as scanNatBndryFwd, scanNatBndryBkwd, token ScanFwd, and tokenScanBkwd. These scanning functions scan through the text data and provide appropriate information by returning textual types of natural boundaries and by loading a ScanRecord data structure as defined in Appendix C. The functions changeCategories, copySeln, deleteSeln, and pasteSeln, on the other hand, involve much more complicated rules, and rely on the intermediate function getFixupInfo to obtain data for their fix-up operations, and getFixupInfo in turn calls the scanning functions as necessary.

The scanning functions tokenScanFwd and tokenScanBkwd were discussed above in relation to FIG. 9. The scanning functions scanNatBndryFwd and scanNatBndryBkwd, as implemented in Appendix A, begin at a token boundary in the text data and identify the textual type of a natural boundary that includes the following token in the given direction, applying a set of rules most of which are implicitly included in scanNatBndryFwd. These two functions are also called by some of the TIAB selection functions discussed above, but they play a more significant role in the TIAB fix-up functions.

Although the TIAB fix-up functions differ widely among themselves, they follow a general pattern that includes several similar steps. All of them are called with at least one pointer to a fix-up data structure, and most of them are called with two pointers, either to fix-up data structures for the two ends of a selection or two alternative fix-up data structures. Before beginning to load a fix-up data structure, each fix-up function calls the function initFixup to initialize that data structure with an appropriate offset indicating where the sequence of operations is to be performed. Then, each fix-up function obtains fix-up data and loads it into the fix-up data structures, modifying the TIAB selection data structure as appropriate in the process. Finally, each fix-up function returns control to the host editor function that called it, which then retrieves the fix-up data and performs the indicated sequences of operations as described above in relation to FIG. 6.

Figure 11:
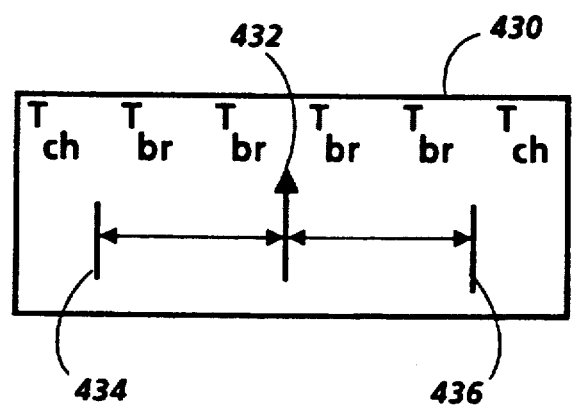
FIG. 11 is a schematic representation of a sequence of textual type codes that include a textual type boundary.

FIG. 11 shows graphically the nature of data provided by getFixupInfo when called in relation to a natural boundary, illustrating how it provides data about the natural boundary. The technique illustrated by FIG. 11 makes use of the observation that a sequence of textual type codes corresponding to token codes includes codes of type character, between each adjacent pair of which is a run of another type appropriate to a break between words, such as a run of type word, phrase, clause, sentence, or paragraph, as shown in Table II, above. Therefore, textual type frame 430 in FIG. 11 includes six textual type codes, the first and last of which are of type character, shown as $T_{ch}$, and the second through fifth of which are of another type appropriate to a break between words, shown as $T_{br}$.

Position 432 in FIG. 11 indicates a position within textual type frame 430 at which getFixupInfo starts. When starting position 432 is within a natural boundary that is a run of a type appropriate to a break between words as in FIG. 11, getFixupInfo finds the left end 434 and the right end 436 of the natural boundary. It then can obtain all the information it needs to load a fixupinfo data structure as defined in Appendix A. It loads the textual type of the codes between starting position 432 and left end 434 as pdnbL and the textual type of the codes between starting position 432 and right end 436 as pdnbR. It loads the number of token codes between starting position 432 and left end 434 as pdnbLlen and the number of token codes between starting position 432 and right end 436 as pdnbRlen. It loads the token code of the token to the left of starting position 432 as pdnbLtoken and the token code of the token to the right as pdnbRtoken. Where appropriate, it sets sentInitFlag to indicate that starting position 432 is immediately before a word and follows a natural boundary whose textual type codes are of type sentence of paragraph, indicating that the following word must begin with a capital letter.

Figure 12:
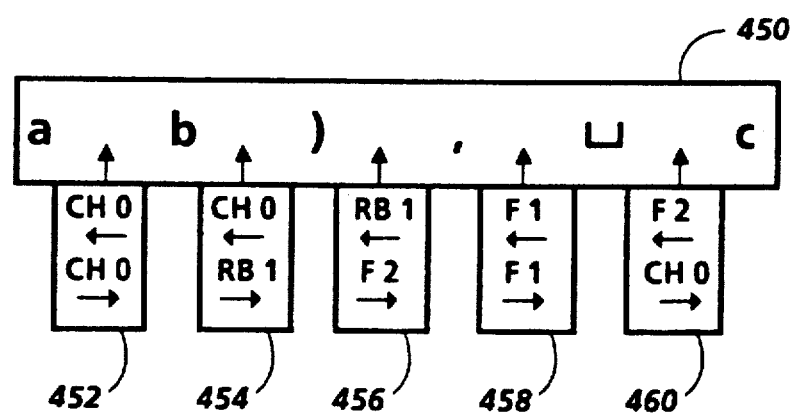
FIG. 12 is a schematic representation of a sequence of text codes, showing features of textual type boundaries as determined between adjacent text codes.

FIG. 12 shows some of the results of applying getFixupInfo at each position within text frame 450, including the values for pdnbL, pdnbLlen, pdnbR, and pdnbRlen at each position. The text codes in text frame 450 correspond to the following string:

*ab),c* a string like this could occur, for example, at the end of a parenthetical that contains a quotation and that is nested within a clause in a sentence.

Result box 452 shows the result of calling getFixInfo at a position between character codes within a word unit—the type in each direction is character (CH), and the length is zero. Similarly, in result box 454, the type to the left is character and the length is zero; to the right, however, the type is right bracket (RB), and the length is one. Result box 456 shows type right bracket to the left and length one and type phrase to the right and length two. Result box 458 shows type phrase in both directions, and length one; if the current TIAB selection were of length greater than zero, however, the type to the right would be type word, because the text code at this position is a space. Finally, result box 460 shows type phrase and length two to the left, but type character and length zero to the right.

Figure 13:
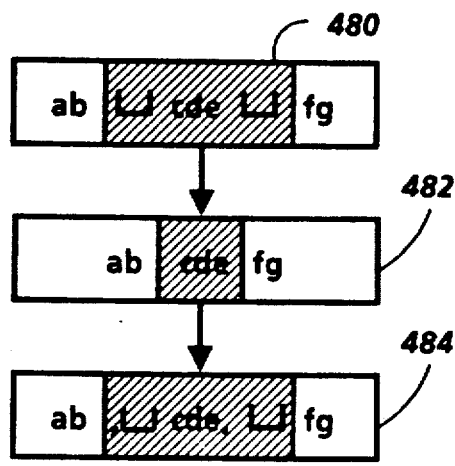
FIG. 13 is a sequence of schematic representations of text code sequences, illustrating a change in textual type of the textual type boundaries at the ends of a text unit selection.
Figure 14:
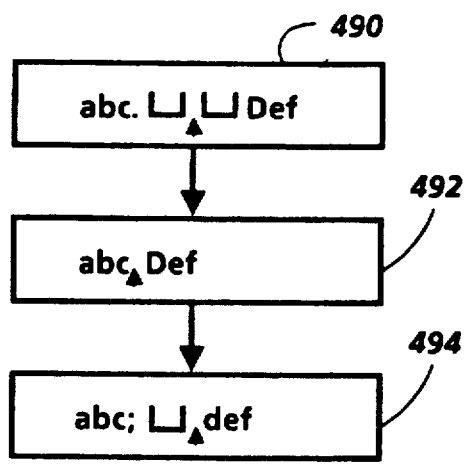
FIG. 14 is a sequence of schematic representations of text code sequences, illustrating a change in textual type of a textual type boundary that includes an insertion point.

The function changeCategories uses the data provided by getFixupInfo, as can be understood from FIGS. 13 and 14. FIG. 13 shows steps in a sequence of operations to change a text unit selection from type word to type phrase, while FIG. 14 shows steps to change an insertion point selection from type sentence to type clause.

Text frame 480 in FIG. 13 shows a shaded text unit selection of type word. In order to change it to type phrase, changeCategories calls getFixUpInfo at each end of the text unit selection to determine the length of the natural boundary of type word, and then loads data into the fix-up data structures that will lead to deletion of the text codes in the natural boundaries, as shown in text frame 482. Then, changeCategories determines what text codes should be inserted at each end of the text unit to provide natural boundaries of type phrase, and loads data into the fix-up data structures that will lead to the appropriate insertion, as shown in text frame 484. When the fix-up data structures are returned to the host editor, the operations at each end of the selection are performed separately, of course, but the same result as shown in FIG. 13 is achieved.

Text frame 490 in FIG. 14 shows an insertion point selection within a natural boundary of type sentence. In order to change to type clause, changeCategories calls getFixupInfo at the insertion point selection to determine the length to each end of the natural boundary. Then, changeCategories determines what length must be deleted to eliminate the natural boundary, as shown in box 492, and what text codes should be inserted to provide a natural boundary of type clause, in this case a semicolon and space as shown in box 494, and loads data indicating the deletion and insertion into the fix-up data structure. In addition, changeCategories includes fix-up data indicating a change of capitalization after the new natural boundary, also shown in box 494.

The other TIAB fix-up operations that call getFixupInfo perform similar steps. The function deleteSeln, which is also called by cutSeln, calls getFixupInfo for data about the natural boundaries to the left and to the right of the text unit selection being deleted; deleteSeln then applies an implicit set of rules to determine, for example whether to delete one or both of the natural boundaries, whether to insert another natural boundary in their place, and whether to change capitalization of the subsequent word.

Upon receiving a user request to perform a paste operation in the cut-copy-paste paradigm, the host editor can, if there is a current selection, delete the current selection and inset the contents of its cut buffer at the post-delete insertion point; then, the host editor calls pasteSeln which first calls getFixupInfo to obtain data about the natural boundaries adjacent to the post delete insertion point in a manner similar to delete Seln, using the excluded block described above; then pasteSeln uses this data and the natural boundary data about the ends of the cut buffer contents obtained at the time of a cut or copy operation to obtain the fix-up data, applying slightly different rules on the left and right of the insertion.

In addition to calling getFixupInfo, pasteSeln calls a number of other functions to assist in obtaining fix-up data and, where appropriate, modifying the TIAB selection data structure. In general, however, pasteSeln follows the same general steps as the other TIAB fix-up functions.

4. Miscellaneous

Various modifications, extensions, and variations of the disclosed implementations are apparent and are within the scope of the invention. A conventional host editor could be modified to accommodate TIAB by providing routines to call TIAB selection functions and TIAB fix-up functions for higher level operations, by modifying the routines that perform manipulation operations so that they call TIAB fix-up functions, and by providing routines to respond to calls from TIAB for data. Alternatively, of course, the invention could be implemented without a separate host editor, but by including these functions within TIAB.

The implementation of Appendices A-D is appropriate for the cut-copy-paste paradigm of text editing. It could easily be extended to handle the move-copy paradigm of editing or to handle other appropriate paradigms.

In general, the rules and patterns applied by the implementation of Appendices A-D are implicit in the functions, but the rules and patterns could alternatively be included in separate data structures as shown for the patterns in FIG. 2, if that would be convenient. The rules and patterns in Appendices A-D resolve all ambiguities in punctuation in a predetermined manner, but it would alternatively be possible to prompt the user to resolve certain troublesome ambiguities.

In the implementation of Appendices A-D, TIAB assumes that positions in the host editor's character buffer can be described by a 32-bit integer. This could be generalized by using a more abstract notion of buffer position, so that it would be more easily adaptable to a greater diversity of host editors.

If the host editor had access to functions like spell checking or search and find, the results of calling such functions might have implications for punctuational structure. Therefore, additional fix-up functions could be added to TIAB to handle such operations.

Although the invention has been described in relation to various implementations, together with modifications ,variations and extensions thereof, other implementations, modifications, variations and extensions are within the scope of the invention. The invention is therefore not limited by the description contained herein or by the drawings, but only by the claims.

APPENDIX A tiabintfc.c                                           11/16/88

```c
/* TIAB ("Trollope in a box") programmer's interface routines */

/* by Curtis Abbott. Copyright © Xerox Corp. 1988. All rights reserved. */ include "tiab.h"

char fineGrainedWords;      /* this global controls word bndry logic in scanners */
char prefsEmbedPeriod;
char prefsTolerateSingleSpaceSentBndries;
char mixedCaseFound;        /* set or cleared when checkMixedCaseFlag arg is on */
char allCapsFound;          /* set or cleared when checkAllCapsFlag arg is on */
TokenRecord tokencache[TKNC_SIZE];
static char *nbchars[] = {"", " ", ",", ";", ".", "\r"};

/* prototypes */
void setupCapitalize(RegionFixup *fxp, long where, int upcaseflag);
static struct bracketinfo *getBracketInfo(char c);
static struct bracketinfo *getBracketInfo2(char c);
static long getFixupInfo(struct fixupinfo *fxi, long where);

static struct fixupinfo {
        short pdnbL;
        short pdnbR;
        short pdnbLlen;
        short pdnbRlen;
        short pdnbLtoken;
        short pdnbRtoken;
        short adjRightOffset;
        short adjLeft;
        short sentInitFlag;
};

struct bracketinfo {
        char openbracket;
        char closebracket;
};

define insert1char(fxp, c) fxp->insertchars[fxp->insertlength++] = c long nbStartPosn(int cat, ScanRecord *sr);

TiabSeln curseln = {-1, 0, 0, 0, 0};
  TiabSeln cutbuffer = {-1, 0, 0, 0, 0};

CacheBlock *nextCb = cacheheaders;
long cacheBottom = -1;
long cacheTop = -1;
char flushCacheFlag = FALSE;
char freeAllExistsFlag = FALSE;

static char errmsgbuff[80];
char *tiabError;
int tiabErrno;

/* may be called by WP at init time; flag defaults to FALSE */
initTIAB(freeallexists)
{
        freeAllExistsFlag = freeallexists;
} void setIpt(n)
long n;
{
```

```
            setSeln(n, 0L, 0);
} setSeln(n, len, type)
long n, len;
{
        bzero(&curseln, (long)sizeof(curseln));
        curseln.offset = n;
    curseln.length = len;
    if(type >= 0)
        curseln.type = type;
    /* this should look at seln contents if type != pcat_Char, and even if so
    if extend to fixup on char selns. */
} getSeln(rp)
TextRegion *rp;
{
    rp->offset = curseln.offset;
    rp->length = curseln.length;
    return TRUE;
} isSelnBracketed()
{
    return curseln.type >= pcat_Brkt;
} void getCutbufferInfo(lenp, typep)
long *lenp;
int *typep;
{
    *lenp = cutbuffer.length;
    *typep = cutbuffer.type;
}

/* used to pass info about cutbuffer coming from another application. */
void setCutbufferInfo(len, type)
long len;
{
    cutbuffer.length = len;
    cutbuffer.type = type;
} toggleWordGrain()
{
    fineGrainedWords = not fineGrainedWords;
    tcacheinit();
} tiabFlushCache()
{
    flushCacheFlag = TRUE;
    tcacheinit();
    return TRUE;
}

/* helpers for extendSelnKeys */
static
extendRightFromRight(from, seln)
long *from;
TiabSeln *seln;
{
ScanRecord sr;
int ncat, efftype;
char nbtoken, nblen;

sr.from = *from;
    efftype = seln->type < pcat_Brkt ? seln->type : seln->secondaryType;
tryAgain:
    ncat = boundaryAfter(&sr, efftype, &seln->rightnbtoken, &nblen, &seln->rightnbcat, TRUE);
    if(ncat == efftype || (ncat > efftype && sr.from <= *from)) {
        if(ncat == efftype || seln->rightnbtokenlength == 0) {
            seln->rightnbtokenlength = nblen;
            sr.from += nblen;
```

```
            } else {
                sr.from = max(sr.from + nblen, *from + 1);
                seln->rightnbtokenlength = 0;
                goto tryAgain;
            }
        } else
            seln->rightnbtokenlength = 0;
        *from = sr.from;
} static
extendRightFromLeft(from, seln)
long *from;
TiabSeln *seln;
{
ScanRecord sr;
int ncat, efftype;
char nbtoken, nblen, junk;
long tmp;

sr.from = *from;
    efftype = seln->type < pcat_Brkt ? seln->type : seln->secondaryType;
    ncat = boundaryAfter(&sr, efftype, &seln->leftnbtoken,
            &seln->leftnbtokenlength, &junk, TRUE);
    if(ncat > efftype && sr.from == *from) {
        sr.from += seln->leftnbtokenlength;
        seln->leftnbtokenlength = 0;
    } else if(ncat == efftype) {
        sr.from += seln->leftnbtokenlength;
        tokenScanFwd(&sr);
        seln->leftnbtokenlength = sr.nextbndry - sr.from;
        seln->leftnbtoken = sr.class;
    }
    tmp = sr.from;
    ncat = scanNatBndryBkwd(&tmp);
    if(ncat < pcat_Sent)
        clearFlag(seln->flags, SELN_CAPITALIZED);
    else
        setFlag(seln->flags, SELN_CAPITALIZED);
    *from = sr.from;
} static
extendLeftFromRight(from, seln)
long *from;
TiabSeln *seln;
{
ScanRecord sr;
int ncat, efftype;
char nbtoken, nblen;

sr.from = *from;
    efftype = seln->type < pcat_Brkt ? seln->type : seln->secondaryType;
    ncat = boundaryBefore(&sr, efftype, &seln->rightnbtoken, &nblen, &seln->rightnbcat, TRUE);
    if(sr.from == *from && BITELT(&OpenBracketsBitset, seln->rightnbtoken)) {
        sr.from -= nblen;
        tokenScanBkwd(&sr);
        seln->rightnbtoken = sr.class;
        seln->rightnbtokenlength = sr.from - sr.nextbndry;
        *from = sr.from;
        return;
    }
    if(sr.from == *from && ncat == efftype) {
        sr.from -= nblen;
        tokenScanBkwd(&sr);
        if(BITELT(&Abbrevs, sr.class))
            sr.from = sr.nextbndry;
        ncat = boundaryBefore(&sr, efftype, &seln->rightnbtoken, &nblen,
                &seln->rightnbcat, TRUE);
    }
    if(sr.from >= *from) {
        seln->rightnbtokenlength = 0;
        sr.from -= nblen;
    } else
        seln->rightnbtokenlength = nblen;
    *from = sr.from;
}
```

```
static
extendLeftFromLeft(from, seln)
long *from;
TiabSeln *seln;
{
ScanRecord sr;
int ncat, efftype;
char nbtoken, nblen, junk;

sr.from = *from;
    efftype = seln->type < pcat_Brkt ? seln->type : seln->secondaryType;
    ncat = boundaryBefore(&sr, efftype, &seln->leftnbtoken, &nblen, TRUE);
    if(ncat == efftype && sr.from == *from
    && not BITELT(&CloseBracketsBitset, seln->leftnbtoken)) {
        sr.from -= nblen;
        tokenScanBkwd(&sr);
        if(not BITELT(&CloseBracketsBitset, sr.class)) {
            if(BITELT(&Abbrevs, sr.class))
                sr.from = sr.nextbndry;
            ncat = boundaryBefore(&sr, efftype, &seln->leftnbtoken, &nblen, &junk, TRUE);
        } else
            sr.from += nblen;
    }
    if(sr.from == *from) {
        seln->leftnbtokenlength = nblen;
        sr.from -= nblen;
    } else
        seln->leftnbtokenlength = 0;
    if(ncat < pcat_Sent)
        clearFlag(seln->flags, SELN_CAPITALIZED);
    else
        setFlag(seln->flags, SELN_CAPITALIZED);
    *from = sr.from;
}

/* extendcode is encoded as follows:
    0=fwd from left;
    1=bkwd from left;
    2=fwd from right;
    3=bkwd from right.
*/
extendSelnKeys(extendcode, rp)
TextRegion *rp;
{
long last, tmp, newleft, newright, *whichend;
int ncat;
ScanRecord sr;

if(curseln.offset < 0) {
        rp->offset = -1;
        tiabError = "can't extend selection when there isn't one";
        return FALSE;
    }
    last = lastCharPosn();
    newleft = curseln.offset;
    newright = newleft + curseln.length;
    if(curseln.type == pcat_Char) {
        switch(extendcode) {
        case 0:
            newleft = min(newleft + 1, last);
            break;
        case 1:
            newleft = max(newleft - 1, 0);
            break;
        case 2:
            newright = min(newright + 1, last);
            break;
        case 3:
            newright = max(newright - 1, 0);
            break;
        }
```

```
    } else {
        switch(extendcode) {
        case 0:
            extendRightFromLeft(&newleft, &curseln);
            break;
        case 1:
            extendLeftFromLeft(&newleft, &curseln);
            break;
        case 2:
            extendRightFromRight(&newright, &curseln);
            break;
        case 3:
            extendLeftFromRight(&newright, &curseln);
            break;
        }
    }
    if(newleft >= newright) {
        if((extendcode & 1) == 0)
            newright = newleft;
        else
            newleft = newright;
        curseln.leftnbtokenlength = 0;
        curseln.rightnbtokenlength = 0;
    } else if(newright < newleft) {
        if((extendcode & 1) == 0)
            newleft = newright;
        else
            newright = newleft;
        curseln.leftnbtokenlength = 0;
        curseln.rightnbtokenlength = 0;
    } else
        updateBracketedness(&curseln);

rp->offset = curseln.offset = newleft;
    rp->length = curseln.length = newright - newleft;
    return TRUE;
}

/* responsible for seln.type and seln.secondaryType. */
static updateBracketedness(seln)
TlabSeln *seln;
{
struct bracketinfo *bi;

if(seln->leftnbtokenlength > 0 && seln->rightnbtokenlength > 0) {
        if(BITELT(&LeftBrackets, seln->leftnbtoken)) {
            if(BITELT(&RightBrackets, seln->rightnbtoken)) {
                bi = getBracketInfo(seln->leftnbtoken);
                if(bi != NIL
                && seln->rightnbtoken == convertTokenBracket(bi->closebracket)) {
                    if(seln->type < pcat_Brkt)
                        seln->secondaryType = seln->type;
                    seln->type = pcat_Brkt;
                    return;
                }
            }
        }
    }
    if(seln->type >= pcat_LBrkt)
        seln->type = seln->secondaryType;
}

/* normally called when the mouse is dragged with button down.  N is determined from
    WP's hit table.  The TextRegion ptr is for returning the answer to host */
/* this is the anchored version, still used for mouse drags */
int extendSelnDrag(n, anchor, rp)
long n, anchor;
TextRegion *rp;
{
int ncat, efftype;
char bndrytoken, junk, nblen;
ScanRecord sr;
```

```
    if(curseln.offset < 0) {
        rp->offset = -1;
        tiabError = "can't extend selection when there isn't one";
        return FALSE;
    } curseln.leftnbtokenlength = 0;          /* defaults */
    curseln.rightnbtokenlength = 0;
    efftype = curseln.type < pcat_Brkt ? curseln.type : curseln.secondaryType;
    if(curseln.type == pcat_Char) {
        if(n < anchor) {
            curseln.offset = n;
            curseln.length = anchor - n;
        } else
            curseln.length = n - curseln.offset;
    } else if(n < anchor) {               /* extend backwards */
        initScanRecord(&sr, n);
        ncat = boundaryBefore(&sr, efftype, &bndrytoken, &nblen, &junk, TRUE);
/* special-case: treat higher cat bndries as instances of the current NB cat */
        if(ncat > efftype && sr.from == n) {
            sr.from -= nblen;
            curseln.leftnbtokenlength = nblen;
            curseln.leftnbtoken = bndrytoken;
        }
        if(ncat < pcat_Sent)
            clearFlag(curseln.flags, SELN_CAPITALIZED);
        else
            setFlag(curseln.flags, SELN_CAPITALIZED);
        curseln.offset = sr.from;
        curseln.length = anchor - curseln.offset;
    } else if(n == anchor) {
        curseln.offset = anchor;
        curseln.length = 0;
    } else {         /* extend forwards */
        initScanRecord(&sr, n);
        ncat = boundaryAfter(&sr, efftype, &bndrytoken, &nblen, &junk, TRUE);
        if(ncat == efftype || (ncat > efftype && sr.from == n)) {
            curseln.rightnbtokenlength = nblen;
            curseln.rightnbtoken = bndrytoken;
            curseln.rightnbcat = junk;
            sr.from += nblen;
        }
        curseln.offset = anchor;
        curseln.length = sr.from - anchor;
    }
    rp->offset = curseln.offset;
    rp->length = curseln.length;
    return TRUE;
}

/* normally called when the user "multiclicks." rp returns the answer, which
   is the smallest region of the newly incremented type surrounding curseln. */
incrType(rp)
TextRegion *rp;
{
ScanRecord sr;
long newoffset, newend, startfrom = curseln.offset, where;
int newcatleft, newcatright, oldtype, leftnblen, rightnblen, correctedCatLeft;
char junk;

if(curseln.type == pcat_Para) {
        rp->offset = curseln.offset;
        rp->length = curseln.length;
        return FALSE;
    }
    if(curseln.type > pcat_Para)
        curseln.type = max(pcat_Word, curseln.secondaryType);
    if(curseln.type < pcat_Para)
        curseln.type++;
    oldtype = curseln.type;
    initScanRecord(&sr, startfrom);
```

```
    curseln.leftnbtokenlength = 0;              /* defaults */
    curseln.rightnbtokenlength = 0;
/* special-case word from ipt in middle of higher NB type. */
    if(curseln.type == pcat_Word && curseln.length == 0) {
        if(natBndryHere(&sr) > 0 && sr.from != startfrom && sr.nextbndry != startfrom) {
            newoffset = sr.from;
            newend = sr.nextbndry;
            clearFlag(curseln.flags, SELN_CAPITALIZED);
            goto out;
        }
    }
    newoffset = startfrom;
    newend = curseln.offset + curseln.length;
    for(;;) {
        sr.from = newoffset;
        newcatleft = boundaryBefore(&sr, curseln.type, &curseln.leftnbtoken,
                        &curseln.leftnbtokenlength, &junk, FALSE);
        newoffset = sr.from;
        sr.from = newend;
        newcatright = boundaryAfter(&sr, curseln.type, &curseln.rightnbtoken,
            &curseln.rightnbtokenlength, &curseln.rightnbcat, FALSE);
        newend = sr.from;
        if(newcatright >= pcat_LBrkt && checkBracketIncr(newcatright, &newoffset, &newend))
            break;

if((newcatleft < pcat_LBrkt && newcatright < pcat_LBrkt)        /* neither end brktd */
        || (newcatleft >= pcat_LBrkt && newcatright >= oldtype)         /* left end brktd */
        || (newcatright >= pcat_LBrkt && newcatleft >= oldtype)) { /* right end brktd */
            if(newcatright >= pcat_RBrkt) {
                if(newcatleft == pcat_Para) {
                /* skip unbalanced bracket on R */
                skipOnRight:
                    newend += curseln.rightnbtokenlength;
                    continue;
                }
                if(newcatleft == pcat_Sent) {
                    long where = newend;
                    if(not scanBkwdBalanced(&where,
                      getBracketInfo2(curseln.rightnbtoken)->openbracket))
                        goto skipOnRight;
                }
            }
            if(newcatleft >= pcat_LBrkt) {
                if(newcatright == pcat_Para) {
                /* skip unbalanced bracket on L */
                skipOnLeft:
                    newoffset -= curseln.leftnbtokenlength;
                    continue;
                }
                if(newcatright == pcat_Sent) {
                    where = newoffset;
                    if(not scanFwdBalanced(&where,
                      getBracketInfo(curseln.leftnbtoken)->closebracket))
                        goto skipOnLeft;
                }
            }
            if((correctedCatLeft = newcatleft) >= pcat_LBrkt) {
                where = newoffset - curseln.leftnbtokenlength;
                correctedCatLeft = scanNatBndryBkwd(&where);
            }
            if(correctedCatLeft < pcat_Sent)
                clearFlag(curseln.flags, SELN_CAPITALIZED);
            else
                setFlag(curseln.flags, SELN_CAPITALIZED);
            if(newoffset == curseln.offset && newend - newoffset == curseln.length) {
                if(newcatleft < newcatright) {
                    curseln.type = newcatleft;
                    newoffset -= curseln.leftnbtokenlength;
                    curseln.rightnbtokenlength = 0;
                } else {
                    curseln.type = newcatright;
                    newend += curseln.rightnbtokenlength;
```

```
                curseln.leftnbtokenlength = 0;
            }
        } else if(newcatright == curseln.type && curseln.rightnbcat < pcat_LBrkt) {
            newend += curseln.rightnbtokenlength;
            curseln.leftnbtokenlength = 0;
        } else {
            curseln.leftnbtokenlength = 0;
            curseln.rightnbtokenlength = 0;
        }
        break;
    }
    /* else try again */
}
out:
    curseln.offset = newoffset;
    curseln.length = newend - newoffset;
    rp->offset = curseln.offset;
    rp->length = curseln.length;
    return TRUE;
} static checkBracketIncr(newcatright, newoffset, newend)
long *newoffset, *newend;
{
struct bracketinfo *bi = getBracketInfo(curseln.leftnbtoken);
int newcatleft, i = -1, xrflag;
char c, cbchar = convertTokenBracket(bi->closebracket);
long where;

if(bi == NIL) return FALSE;
    if(newcatright >= pcat_LBrkt && curseln.rightnbtoken == cbchar)
        goto maybe;
    for(i = 0; i < curseln.rightnbtokenlength; i++) {
        c = charAt(*newend + i);
        if(c == cbchar)
            goto maybe;
    }
    return FALSE;

/* here we have established that we may want to increment to a bracketed type, so further checks
to see */
maybe:
    /* special case to avoid going to bracketed seln too quickly */
    xrflag = *newend > curseln.offset + curseln.length;
    if(*newoffset < curseln.offset || xrflag || i > 0) {
        if(i > 0 && not xrflag) {
            where = *newend;
            curseln.type = scanNatBndryFwd(&where);
            *newend += i;
        } else
            curseln.type--;
        curseln.leftnbtokenlength = 0;
        curseln.rightnbtokenlength = 0;
        clearFlag(curseln.flags, SELN_CAPITALIZED);
        return TRUE;
    }
    curseln.type = pcat_Brkt;
    *newoffset -= curseln.leftnbtokenlength;
    if(i >= 0) {
        *newend += i;
        curseln.rightnbtokenlength = 1;
        curseln.rightnbtoken = cbchar;
    } else {
        where = *newend;
        newcatright = scanNatBndryBkwd(&where);
        if(newcatright == pcat_Char) {
            where = *newend;
            newcatleft = scanNatBndryFwd(&where);
            if(newcatleft == pcat_Clause)
                newcatright = pcat_Clause;
        }
        if(newcatright >= pcat_Para)
```

```
                newcatright = pcat_Word;
        }
        curseln.secondaryType = max(pcat_Word, newcatright);
        *newend += curseln.rightnbtokenlength;
        where = *newoffset;
        newcatleft = scanNatBndryBkwd(&where);
        if(newcatleft >= pcat_Sent && newcatleft < pcat_LBrkt)
            setFlag(curseln.flags, SELN_CAPITALIZED);
        else
            clearFlag(curseln.flags, SELN_CAPITALIZED);
        return TRUE;
}

/* the inverse of incrType, in some sense. it merely adjusts the right bndry if it
    makes sense to do so. note that it will remove the space in going from word to char
    star; this is a pragmatic design decision rather than a theoretically motivated one. */
decrType(rp)
TextRegion *rp;
{
    if(curseln.type >= pcat_Brkt) {
        if(curseln.secondaryType > pcat_Char)
            curseln.secondaryType--;
    } else if(curseln.type > pcat_Char) {
        if(curseln.rightnbtokenlength > 0) {
            ScanRecord sr;
            curseln.length -= curseln.rightnbtokenlength;
            curseln.rightnbtokenlength = 0;
            sr.from = curseln.offset + curseln.length;
            tokenScanFwd(&sr);
            if(BITELT(&CloseBracketsBitset, sr.class)) {
                curseln.rightnbtoken = sr.class;
                curseln.rightnbtokenlength = 1;
            }
        }
        curseln.type--;
    }
    rp->offset = curseln.offset;
    rp->length = curseln.length;
    return TRUE;
} static struct bracketinfo trueBracketsInfo[] = {
    {'"', '"'},
    {'\'', '\''},
    {'(', ')'},
    {'[', ']'},
    {'{', '}'},
    {'`', '\''},
    {'"', '"'},
    {0, 0}
};

static struct bracketinfo *
getBracketInfo(c)
char c;
{
struct bracketinfo *bi;

for(bi = trueBracketsInfo; bi->openbracket != 0 && bi->openbracket != c; bi++) ;
    return bi;
}

/* this one is keyed off close bracket char */
static struct bracketinfo *
getBracketInfo2(c)
char c;
{
struct bracketinfo *bi;

for(bi = trueBracketsInfo; bi->closebracket != 0 && bi->closebracket != c; bi++) ;
    return bi;
}
```

```
static
convertTokenBracket(c)
char c;
{
    if(BITELT(&Dashes, c))
        return tkn_MultiDash;
    else if(c == ',')
        return tkn_Comma;
    else if((c & 0xff) == '''')
        return tkn_SingleQuote;
    else
        return c;
}

/* alg: drop space from eo seln, add the brkts. */
addBrackets(c, fxl, fxr)
char c;
RegionFixup *fxl, *fxr;
{
char cbchar = getBracketInfo(c)->closebracket, cc;
long end = curseln.offset + curseln.length;
int adjust = 2;

initFixup(fxl, curseln.offset);
    if(BITELT(&OpenQuotesBitset, c)) {
        while(end > curseln.offset && ((cc = charAt(end - 1)) == ' ' || cc == ';')) {
            end--;
            adjust--;
        }
        if((cc = charAt(end)) == '.' || cc == ',') {
            end++;
            adjust++;
        }
    } else if(curseln.rightnbcat < pcat_LBrkt) {       /* must be () */
        int len = curseln.rightnbtokenlength;
        if(curseln.rightnbtokenlength > 0 && curseln.rightnbcat == pcat_Sent) {
        /* check for point inside right paren */
            long tmp = curseln.offset;
            int cat;
            if((cat = scanNatBndryBkwd(&tmp)) == pcat_Sent || cat == pcat_Para)
                len--;
        }
        end -= len;
        adjust -= len;
    }
    insert1char(fxl, c);
    initFixup(fxr, end + 1);        /* account for char added on left */
    insert1char(fxr, cbchar);
    curseln.length += adjust;
    if(curseln.type != pcat_Brkt) {
        curseln.secondaryType = curseln.type;
        curseln.type = pcat_Brkt;
    }
    curseln.leftnbtoken = c;
    curseln.rightnbtoken = cbchar;
    curseln.leftnbtokenlength = 1;
    curseln.rightnbtokenlength = 1;
    curseln.rightnbcat = BITELT(&CloseQuotesBitset, cbchar) ? pcat_RQuote : pcat_RBrkt;
}

/* seln must be bracketed, else error return */
removeBrackets(fxl, fxr)
RegionFixup *fxl, *fxr;
{
long end = curseln.offset + curseln.length, where;
int cat;
ScanRecord sr;

initFixup(fxl, curseln.offset);
    initFixup(fxr, end);
    if(curseln.type != pcat_Brkt)
```

```
        return FALSE;
    fxl->deletelength = 1;
    fxr->offset -= 2;      /* 1 for the rbrkt char, 1 for the left fixup */
    curseln.length -= 2;   /* one for each char removed */
    fxr->deletelength = 1;
    curseln.type = curseln.secondaryType;
    where = curseln.offset + 1;
    cat = scanNatBndryFwd(&where);
    if(cat == pcat_Char) {
        curseln.leftnbtokenlength = 0;
    } else {
        sr.from = curseln.offset + 1;
        tokenScanFwd(&sr);
        curseln.leftnbtokenlength = sr.nextbndry - sr.from;
        curseln.leftnbtoken = sr.class;
    }
    where = end - 1;
    cat = scanNatBndryBkwd(&where);
    if(cat == pcat_Char) {
        curseln.rightnbtokenlength = 0;
    } else {
        curseln.rightnbcat = cat;
        sr.from = end - 1;
        tokenScanBkwd(&sr);
        curseln.rightnbtokenlength = sr.from - sr.nextbndry;
        curseln.rightnbtoken = sr.class;
    }
    return TRUE;
}

/* newcat should be within the standard hierarchy */
changeCategories(newcat, fxl, fxr, sentpunct)
RegionFixup *fxl, *fxr;
char sentpunct;
{
struct fixupinfo fxi;
long end = curseln.offset + curseln.length;
int adjust = 0;

initFixup(fxl, curseln.offset);
    initFixup(fxr, end);
    getFixupInfo(&fxi, curseln.offset);
    changeCat1(newcat, fxl, &fxi, 0);
    if(curseln.length != 0) {
        getFixupInfo(&fxi, end);
        adjust = fxl->insertlength - fxl->deletelength;
        fxr->offset += adjust;
        changeCat1(newcat, fxr, &fxi, -adjust);
        curseln.offset = fxl->offset + fxl->insertlength;
        curseln.length = fxr->offset + fxr->insertlength - curseln.offset;
        if(newcat == pcat_Sent && sentpunct != '.')
            fixSentPunct(fxr, sentpunct);
    } else {
        curseln.offset = fxl->offset + fxl->insertlength;
        if(newcat == pcat_Sent && sentpunct != '.')
            fixSentPunct(fxl, sentpunct);
    }
} static
changeCat1(newcat, fxp, fxi, adjust)
RegionFixup *fxp;
struct fixupinfo *fxi;
{

/* step left out of left brkts */
    while(fxi->pdnbLlen > 0 && (fxi->pdnbL == pcat_LBrkt || fxi->pdnbL == pcat_LQuote)) {
        fxp->offset--;
        getFixupInfo(&fxi, fxp->offset);
    }
/* step right out of right brkts */
    while(fxi->pdnbLlen == 0 && fxi->pdnbRlen > 0
```

```
        && (fxi->pdnbR == pcat_RBrkt || fxi->pdnbR == pcat_RQuote)) {
            fxp->offset++;
            getFixupInfo(fxi, fxp->offset);
        }
        if(fxi->pdnbLlen > 0) {
            if(fxi->pdnbRlen > 0) {
                if(fxi->pdnbR >= pcat_LBrkt) {
                    fxp->offset -= fxi->pdnbLlen;
                    fxp->deletelength += fxi->pdnbLlen;
                    insertFixups(fxp, nbchars[newcat]);
                    if(fxi->pdnbR == pcat_RBrkt || fxi->pdnbR == pcat_RQuote)
                        fxp->insertlength = 1;      /* adjust away the spaces */
                    else
                        changeCatCapzn(newcat, fxp, fxi, adjust);
                } else if(fxi->pdnbR == newcat || fxi->pdnbR == pcat_Para) {    /* delete L */
                    fxp->offset -= fxi->pdnbLlen;
                    fxp->deletelength += fxi->pdnbLlen;
                } else if(fxi->pdnbL == newcat || fxi->pdnbL >= pcat_LBrkt) {   /* delete R */
                    fxp->deletelength += fxi->pdnbRlen;
                } else {                                                        /* change L+R */
                    fxp->offset -= fxi->pdnbLlen;
                    fxp->deletelength += fxi->pdnbLlen + fxi->pdnbRlen;
                    insertFixups(fxp, nbchars[newcat]);
                    changeCatCapzn(newcat, fxp, fxi, adjust);
                }
            } else {                                                            /* change L only */
                fxp->offset -= fxi->pdnbLlen;
                fxp->deletelength += fxi->pdnbLlen;
                insertFixups(fxp, nbchars[newcat]);
                if(newcat == pcat_Sent || fxi->pdnbL == pcat_Sent)
                    changeCatCapzn(newcat, fxp, fxi, adjust);
            }
        } else if(fxi->pdnbRlen == 0) {                                         /* insert only */
            if(fxi->pdnbL != pcat_Para) {
                insertFixups(fxp, nbchars[newcat]);
                changeCatCapzn(newcat, fxp, fxi, adjust);
            }
        } else {                                                                /* change R only */
            fxp->deletelength += fxi->pdnbRlen;
            insertFixups(fxp, nbchars[newcat]);
            if(newcat == pcat_Sent || fxi->pdnbL == pcat_Sent)
                changeCatCapzn(newcat, fxp, fxi, adjust);
        }
} changeCatCapzn(newcat, fxp, fxi, adjust)
RegionFixup *fxp;
struct fixupinfo *fxi;
{
long where = fxp->offset + fxp->deletelength + adjust;

if(newcat == pcat_Sent)
        setupCapitalize(fxp, where, TRUE);
    else if(newcat < pcat_Sent)
        setupCapitalize(fxp, where, FALSE);
} static fixSentPunct(fxp, sentpunct)
RegionFixup *fxp;
char sentpunct;
{
int i;
char *cp;

for(i = fxp->insertlength, cp = fxp->insertchars; --i >= 0; cp++)
        if(*cp == '.') {
            *cp = sentpunct;
            break;
        }
}

/* smart quotes hook. the char c passed in should be open ' or ". returns: 0 means
``` open, 1 means close. algorithm: return open if space or other open on left, else
return close. "Other open" includes left paren, etc. the c arg is used to decide
about otherness. */
```
getQuoteType(where, c)
long where;
char c;
{
char left;

if(where == 0) return 0;
    left = charAt(where - 1);
    if(BITELT(&OpenQuoteLeftBitset, left)) {
        if(left == c) return 1;
        return 0;
    } else
        return 1;
} copySeln()
{
    cutbuffer = curseln;
} cutSeln(fxpc, fxpd)
RegionFixup *fxpc, *fxpd;
{
    cutbuffer = curseln;
    deleteSeln(fxpc, fxpd);
}

/* returns lbpos */
static long
getFixupInfo(fxi, where)
struct fixupinfo *fxi;
long where;
{
ScanRecord sr;
long lbpos, leftpos;
int ncat;

initScanRecord(&sr, where);
    bzero(fxi, (long)sizeof(*fxi));
    tokenBndryLeft(&sr);
    lbpos = sr.from;
    if(lbpos == where) {
        fxi->pdnbL = scanNatBndryBkwd(&sr.from);
        sr.from = lbpos;
        tokenScanBkwd(&sr);
        fxi->pdnbLtoken = sr.class;
        tokenScanFwd(&sr);
        fxi->pdnbRtoken = sr.class;
    } else {
        fxi->pdnbL = scanNatBndryFwd(&sr.from);
        sr.from = lbpos;
        tokenScanBkwd(&sr);
        fxi->pdnbLtoken = sr.class;
        fxi->pdnbRtoken = sr.class;
    }
    if(fxi->pdnbL == pcat_Char) {
        fxi->pdnbLlen = 0;
        if(lbpos != where) {
            fxi->pdnbR = pcat_Char;
            fxi->pdnbRlen = 0;
        } else {
            sr.from = lbpos;
            fxi->pdnbR = scanNatBndryFwd(&sr.from);
            nbEndPosn(fxi->pdnbR, &sr);
            fxi->pdnbRlen = sr.from - lbpos;
        }
    } else if(fxi->pdnbL >= pcat_LBrkt) {
        fxi->pdnbLlen = 1;
        sr.from = lbpos;
```

```
            fxi->pdnbR = scanNatBndryFwd(&sr.from);
            if(fxi->pdnbR == pcat_Char)
                fxi->pdnbRlen = 0;
            else {
                nbEndPosn(fxi->pdnbR, &sr);
                fxi->pdnbRlen = sr.from - lbpos;
            }
            if(fxi->pdnbR == pcat_Char) {
                sr.from = lbpos - 1;
                ncat = scanNatBndryBkwd(&sr.from);
                if(ncat >= pcat_Sent && ncat <= pcat_Para)
                    fxi->sentInitFlag = 1;
            }
    } else {
        nbStartPosn(fxi->pdnbL, &sr);
        leftpos = sr.from;
        nbEndPosn(fxi->pdnbL, &sr);
        if(sr.from > where) {
            if(curseln.length > 0 && charAt(where) == ' ')
                fxi->pdnbR = pcat_Word;
            else
                fxi->pdnbR = fxi->pdnbL;
            fxi->pdnbRlen = sr.from - where;
            fxi->pdnbLlen = where - leftpos;
        } else if(fxi->pdnbL == pcat_Para) {
            fxi->pdnbR = pcat_Char;            /* was pcat_Sent */
            fxi->pdnbLlen = fxi->pdnbRlen = 0;
        } else {
            fxi->pdnbLlen = sr.from - leftpos;
            sr.from = lbpos;
            fxi->pdnbR = scanNatBndryFwd(&sr.from);
            if(fxi->pdnbR == pcat_Char) {
                fxi->pdnbRlen = 0;
            } else {
                if(fxi->pdnbR != pcat_Para)
                    nbEndPosn(fxi->pdnbR, &sr);
                fxi->pdnbRlen = sr.from - where;
            }
        }
        if(fxi->pdnbL >= pcat_Sent && fxi->pdnbL <= pcat_Para) {
            if(fxi->pdnbR == pcat_Char)
                fxi->sentInitFlag = 1;
        }
    }
    return lbpos;
}

/*
    deleteSeln() tells TIAB that WP is going to delete curseln. It returns fixup
    instructions for two cases, called continue and done. Continue means that
    after deleting the seln I indend to start typing text of the same category.
    Instructions for this case generally re-insert nat bndry chars of curseln.type. Done
    means that I'm just deleting, and want something reasonable to be left behind. TIAB
    can't really tell whether continue or done is right, which is why both kinds of
    instructions are returned.
    WP should call deleteSeln after performing a straight delete.
*/
deleteSeln(fxpc, fxpd)
RegionFixup *fxpc, *fxpd;
{
struct fixupinfo fxi;

initFixup(fxpc, curseln.offset);
    initFixup(fxpd, curseln.offset);
    getFixupInfo(&fxi, curseln.offset);
    if(curseln.type == pcat_Brkt) {
        curseln.type = pcat_Word;
        curseln.leftnbtokenlength = 0;
        curseln.rightnbtokenlength = 0;
        if(fxi.pdnbRlen > 0 && fxi.pdnbR == pcat_Word)
            fxpd->deletelength += fxi.pdnbRlen;
    }
```

```
    if(curseln.type == pcat_Char)        /* never a fixup for char seln */
        return;

/* possibly change curseln type to reflect its contents */
    if(curseln.rightnbtokenlength > 0 && curseln.rightnbcat > curseln.type
    && curseln.leftnbtokenlength == 0
    && (curseln.rightnbcat != pcat_Sent || isFlagOn(curseln.flags, SELN_CAPITALIZED)))
        curseln.type = curseln.rightnbcat;

if(curseln.rightnbtokenlength > 0 && curseln.rightnbcat != curseln.type) {
        fxpc->offset -= curseln.rightnbtokenlength;
        fxpc->deletelength += curseln.rightnbtokenlength;
        fxpd->offset -= curseln.rightnbtokenlength;
        fxpd->deletelength += curseln.rightnbtokenlength;
    }
    if((fxi.pdnbRlen > 0 && fxi.pdnbR <= curseln.type
        && (curseln.rightnbtokenlength == 0 || curseln.rightnbcat != curseln.type))
    || (curseln.rightnbtokenlength > 0 && curseln.type == pcat_Word
        && curseln.rightnbcat == pcat_Word)) {
        insertFixups(fxpc, nbchars[curseln.type]);
        fxpc->newoffset = fxpc->offset;
    }
    if(curseln.rightnbtokenlength > 0 && curseln.rightnbcat == curseln.type
    && fxi.pdnbRlen > 0 && fxi.pdnbR == curseln.type
    && curseln.type < pcat_Sent)
        fxpd->deletelength += fxi.pdnbRlen;
    if(fxi.pdnbLlen > 0
    && (fxi.pdnbR < pcat_Para || fxi.pdnbR == pcat_RBrkt || fxi.pdnbR == pcat_RQuote)
    && (fxi.pdnbL < curseln.type
        || fxi.pdnbL == curseln.type && fxi.pdnbRlen > 0 && fxi.pdnbR > curseln.type)) {
        fxpd->offset -= fxi.pdnbLlen;
        fxpd->deletelength += fxi.pdnbLlen;
    }
    if(fxi.pdnbLlen > 1 && fxi.pdnbL > pcat_Word && fxi.pdnbL < pcat_Para
    && fxi.pdnbRlen > 0 && (fxi.pdnbR == pcat_RBrkt || fxi.pdnbR == pcat_RQuote)) {
        fxi.pdnbLlen--;
        fxpd->offset -= fxi.pdnbLlen;
        fxpd->deletelength += fxi.pdnbLlen;
    } if(isFlagOn(curseln.flags, SELN_CAPITALIZED) && curseln.type < pcat_Sent)
        setupCapitalize(fxpd, -1, TRUE);

setSeln(fxpd->offset, 0L, 0);
}

/* paste fixups */
void pasteSeln(fxpleft, fxpright)
RegionFixup *fxpleft, *fxpright;
{
struct fixupinfo fxi;
int newtype, i;
long lbpos;
ScanRecord sr;

initFixup(fxpleft, curseln.offset);
    initFixup(fxpright, curseln.offset);/* dummy offset */
    if(curseln.offset < 0) {
        tiabError = "no seln -- paste can't analyze";
        return;
    }
    if(cutbuffer.length <= 0)        /* nothing was pasted */
        return;

/* treat char* cutbuffer specially, as usual */
    if(cutbuffer.type == pcat_Char) {
        fxpright->offset += cutbuffer.length;
        return;
    }

/* determine post-delete nat bndries and lengths to left and right */
    setXBlock(curseln.offset, cutbuffer.length);
```

```
    lbpos = getFixupInfo(&fxi, curseln.offset);

/* possibly adjust paste lpt to NB end posn. */
    if(fxi.pdnbL == fxi.pdnbR || (fxi.pdnbL == pcat_Char && fxi.pdnbR == pcat_Word)) {
        sr.from = lbpos;
        tokenScanFwd(&sr);
        if(sr.class == tkn_Space) {
            int tgtlen, curlen;
            if(fxi.pdnbL == pcat_Sent && not prefsTolerateSingleSpaceSentBndries) {
                tgtlen = 2;
            } else if(fxi.pdnbL == pcat_Para) {
                tgtlen = 0;
            } else {
                tgtlen = 1;
            }
            curlen = lbpos != curseln.offset ? curseln.offset - lbpos : 0;
            fxi.adjLeft = tgtlen - curlen;   /* can be pos or neg, for ins or del space */
            fxi.pdnbLlen += fxi.adjLeft;
            fxpright->deletelength = fxi.pdnbRlen;
            fxi.pdnbRlen = 0;
            sr.from = curseln.offset + fxpright->deletelength;
            fxi.pdnbL = fxi.pdnbR;
            fxi.pdnbR = scanNatBndryFwd(&sr.from);
        }
    }
    clearXBlock();        /* done looking at post-delete state */

/* special handling for pasting of paras... */
    if(cutbuffer.type == pcat_Para) {
        if(fxi.pdnbL != pcat_Para)
            putleftfixups(fxpleft, &cutbuffer, &fxi, pcat_Para);
        fxpright->offset = fxpleft->offset + cutbuffer.length + fxi.adjRightOffset +
                            fxpleft->insertlength - fxpleft->deletelength;
        putrightfixups(fxpright, &cutbuffer, &fxi, pcat_Para);
        return;
    }

/* possibly change cutbuffer type to reflect its contents */
    if(cutbuffer.rightnbtokenlength > 0
    && cutbuffer.rightnbcat > cutbuffer.type
    && cutbuffer.leftnbtokenlength == 0
    && (cutbuffer.rightnbcat != pcat_Sent || isFlagOn(cutbuffer.flags, SELN_CAPITALIZED)))
        cutbuffer.type = cutbuffer.rightnbcat;

/* standard fixups on left... */
    newtype = cutbuffer.type == pcat_Brkt ? cutbuffer.secondaryType : cutbuffer.type;
    if(fxi.pdnbL < newtype)
        putleftfixups(fxpleft, &cutbuffer, &fxi, newtype);
    else {
        if(cutbuffer.type != pcat_Brkt & not BITELT(&LeftBrackets, cutbuffer.leftnbtoken))
            fxpleft->deletelength += cutbuffer.leftnbtokenlength;
        if(fxi.pdnbL < pcat_Para || fxi.pdnbL == pcat_RBrkt || fxi.pdnbL == pcat_RQuote) {
            int tmp = strlen(nbchars[fxi.pdnbL]) - fxi.pdnbLlen;
            if(fxi.pdnbL == pcat_Sent && fxi.pdnbLtoken == tkn_Space)        /* sent-final abbrev */
                tmp--;
            if(fxi.pdnbLtoken == tkn_MultiDash)
                tmp = 0;
            if(tmp > 0)
                insertFixups(fxpleft, &" "[2 - tmp]);
        }
    }
    if(fxi.adjLeft < 0)
        fxpleft->deletelength += fxi.adjLeft;
    else if(fxi.adjLeft > 0)
        insertFixups(fxpleft, &" "[2 - fxi.adjLeft]);
/* capitalization fixups on left. */
    newtype = cutbuffer.type == pcat_Brkt ? cutbuffer.secondaryType : cutbuffer.type;
    if((isFlagOn(curseln.flags, SELN_CAPITALIZED) || fxi.sentInitFlag)
    && not isFlagOn(cutbuffer.flags, SELN_CAPITALIZED))
        setupCapitalize(fxpleft, -1, TRUE);
    else if(isFlagOn(cutbuffer.flags, SELN_CAPITALIZED)
```

```
        && not (isFlagOn(curseln.flags, SELN_CAPITALIZED) || fxi.sentInitFlag)
        && newtype < pcat_Sent
        && not (fxi.pdnbL == pcat_Sent || fxi.pdnbL == pcat_Para))
            setupCapitalize(fxpleft, -1, FALSE);

/* standard fixups on right */
    fxpright->offset = fxpleft->offset + cutbuffer.length + fxi.adjRightOffset +
                        fxpleft->insertlength - fxpleft->deletelength;
    if(cutbuffer.type == pcat_Brkt) {
        newtype = fxi.pdnbR == pcat_Char ? cutbuffer.secondaryType : 0;
    } else if((not (fxi.pdnbR == pcat_Para || fxi.pdnbR == pcat_RBrkt))
        && ((fxi.pdnbR < pcat_Para && fxi.pdnbR <= cutbuffer.type)
            || fxi.pdnbR == pcat_LBrkt || fxi.pdnbR == pcat_LQuote))
        newtype = cutbuffer.type;
    else
        newtype = 0;
    if(newtype > 0)
        putrightfixups(fxpright, &cutbuffer, &fxi, newtype);
    else if(cutbuffer.rightnbtokenlength > 0 && cutbuffer.rightnbcat == cutbuffer.type
        && fxi.pdnbR != pcat_Para) {
            i = cutbuffer.rightnbtokenlength;
            if(fxi.pdnbR >= pcat_LBrkt && cutbuffer.rightnbcat != pcat_Word)
                i--;            /* leave the punctuation mark; delete the spaces */
            fxpright->offset -= i;
            fxpright->deletelength += i;
    }
/* capitalization fixups on right. */
    lbpos = fxpright->offset + fxpright->deletelength
            - (fxpleft->insertlength - fxpleft->deletelength);
    newtype = cutbuffer.type == pcat_Brkt ? cutbuffer.secondaryType : cutbuffer.type;
    if(newtype >= pcat_Sent && newtype <= pcat_Para)
        setupCapitalize(fxpright, lbpos, TRUE);
    else if(fxi.sentInitFlag)
        setupCapitalize(fxpright, lbpos, FALSE);

setSeln(fxpright->offset + fxpright->insertlength, 0L, 0);
} static putleftfixups(fxp, seln, fxi, newtype)
RegionFixup *fxp;
TiabSeln *seln;
struct fixupinfo *fxi;
{
int tmp;

tmp = fxi->pdnbLlen - fxi->adjLeft;
    if(tmp > 0) {
        fxp->offset -= tmp;
        fxi->adjRightOffset = tmp;
        fxp->deletelength = tmp;
    }
    fxi->adjLeft = 0;
    /* do something about dirt at seln start */
    if(seln->leftnbtokenlength > 0 && not BITELT(&AllBracketsBitset, seln->leftnbtoken))
        fxp->deletelength += seln->leftnbtokenlength;
    insertFixups(fxp, nbchars[newtype]);
} static putrightfixups(fxp, seln, fxi, newtype)
RegionFixup *fxp;
TiabSeln *seln;
struct fixupinfo *fxi;
{
int nbcount = 0, tmp;
char *inschars;

if(fxi->pdnbRlen > 0 && fxi->pdnbR != newtype && fxi->pdnbR < pcat_Para)
        fxp->deletelength += fxi->pdnbRlen;
    else if(fxi->pdnbRlen > 0 && fxi->pdnbR < pcat_LBrkt
        && not BITELT(&RightBrackets, fxi->pdnbRtoken))
        nbcount++;
    if(seln->type != pcat_Brkt) {
```

```
        if(seln->rightnbtokenlength > 0 && (nbcount > 0 || seln->rightnbcat != newtype)) {
            fxp->offset -= seln->rightnbtokenlength;
            fxp->deletelength += seln->rightnbtokenlength;
        } else if(seln->rightnbtokenlength > 0) {
            tmp = strlen(nbchars[seln->type]) - seln->rightnbtokenlength;
            if(seln->type == pcat_Sent && seln->rightnbtoken == tkn_Space) /* sent-final abbrev
*/
                tmp--;
            if(seln->rightnbtoken == tkn_MultiDash)
                tmp = 0;
            if(tmp > 0 && not BITELT(&RightBrackets, fxi->pdnbRtoken))
                insertFixups(fxp, &"  "[2 - tmp]);
            nbcount++;
        }
    }
    if(nbcount == 0) {
        inschars = nbchars[newtype];
        if(seln->type == pcat_Brkt && newtype > pcat_Word)
            inschars++;        /* insert only spaces */
        insertFixups(fxp, inschars);
    }
} initFixup(fxp, where)
RegionFixup *fxp;
long where;
{
    bzero(fxp, (long)(sizeof(*fxp)));
    fxp->offset = where;
    fxp->newoffset = -1;
} static insertFixups(fxp, strg)
RegionFixup *fxp;
char *strg;
{
long len = strlen(strg);

blkmove(&fxp->insertchars[fxp->insertlength], strg, len);
    fxp->insertlength += len;
}

/* helpers for pasteSeln() */ static void
setupCapitalize(fxp, where, upcaseflag)
RegionFixup *fxp;
long where;
int upcaseflag;
{
char c;
long where1, end;
ScanRecord sr;

end = lastCharPosn();
    if(where < 0)
        where = fxp->offset + fxp->deletelength;
    where1 = where;
    for(; where < end; where++) {
        c = charAt(where);
        if(c == PARA_MARK)
            return;
        if(inrange(c, 'A', 'Z') || inrange(c, 'a', 'z')) {
            if(upcaseflag) {
                if(inrange(c, 'a', 'z')) {
                    fxp->capchar = c - ('a' - 'A');
                    fxp->capoffset = fxp->offset + fxp->insertlength + (where - where1);
                }
            } else {
                if(inrange(c, 'a', 'z')) break;
                sr.from = where;
                sr.flags = scnrec_checkAllCapsFlag;
```

```
            tokenScanFwd(&sr);
            if((not allCapsFound) || sr.nextbndry - sr.from == 1) {
                if(c == 'I' && (sr.nextbndry - sr.from == 1
                            || BITELT(&WordBreakChars, charAt(where + 1))))
                    break;
                fxp->capchar = c + ('a' - 'A');
                fxp->capoffset = fxp->offset + fxp->insertlength + (where - where1);
            }
        }
        break;
    }
  }
}

/* this is a related, but externally callable, routine dealing with capitalization. */
void toggleCapitalization(where, fxp)
long where;
RegionFixup *fxp;
{
char c;
ScanRecord sr;
long where1, end;

initFixup(fxp, 0L);
    end = lastCharPosn();
    sr.from = where;
    tokenBndryLeft(&sr);
    for(;;) {
        tokenScanFwd(&sr);
        if(BITELT(&WordTokens, sr.class))
            break;
        if(sr.nextbndry >= end)
            return;
        sr.from = sr.nextbndry;
    }
    c = charAt(sr.from);
    if(not (inrange(c, 'A', 'Z') || inrange(c, 'a', 'z')))
        return;
    fxp->capoffset = sr.from;
    fxp->capchar = inrange(c, 'A', 'Z') ? c + ('a' - 'A') : c - ('a' - 'A');
    fxp->newoffset = sr.from;
} static checkNBQuotesBrkts(class)
short class;
{
    if(BITELT(&OpenQuotesBitset, class))
        return pcat_LQuote;
    else if(BITELT(&CloseQuotesBitset, class))
        return pcat_RQuote;
    else if(BITELT(&LeftBrackets, class))
        return pcat_LBrkt;
    else if(BITELT(&RightBrackets, class))
        return pcat_RBrkt;
    return -1;
}

/* this assumes we're at a token bndry & returns the nbcat thereat, leaving where at
    the next token bndry. meanwhile, it will have propagated the category
    forward if necessary. */
/* this code conveniently assumes that after scanning fwd (e.g., for sentence
    matching), the tr a/w initial sr will still be valid. this will be true as long as
    the matched sequence is shorter than the tokencache. */
scanNatBndryFwd(where)
long *where;
{
TokenRecord *tr, *tr1;
int nbcat, tmp;
ScanRecord sr;
long place;

if((tr = tokenRecordAt(*where)) == NIL) {
```

```
    initScanRecord(&sr, *where);
    tokenScanFwd(&sr);
    sr.from = sr.nextbndry;
    tokenScanBkwd(&sr);
    if((tr = tokenRecordAt(*where)) == NIL)
        ASSERT(FALSE, "scanNatBndryFwd called with non-token-bndry");
}
trl = tokenRecordNext(tr);
*where = trl->bndry;    /* default */
if(tr->nbcat >= 0)
    return tr->nbcat;
if((tr->nbcat = checkNBQuotesBrkts(tr->class)) >= 0)
    return tr->nbcat;
switch(tr->class & 0xff) {
default:
    ASSERT(FALSE, "unhandled case in scanNatBndryFwd");
    break;
case 0:             /* happens at end of text */
case PARA_MARK:
    return tr->nbcat = pcat_Para;
case tkn_WordInternal:
    return tr->nbcat = pcat_Word;
case tkn_Space:     /* scan back to "anchor" */
    trl = tokenRecordPrev(tr);
    if(trl->nbcat < 0) {
        place = trl->bndry;
        scanNatBndryFwd(&place);
        if(trl->nbcat >= pcat_RBrkt) {
            trl = tokenRecordPrev(trl);
            if(trl->nbcat < 0) {
                place = trl->bndry;
                scanNatBndryFwd(&place);
            }
        }
    }
    if(tr->nbcat >= 0)
        return tr->nbcat;
    if(trl->nbcat <= 0 || trl->nbcat >= pcat_LBrkt)
        return tr->nbcat = pcat_Word;
    else
        return tr->nbcat = trl->nbcat;
case tkn_Word:
case tkn_CapWord:
    return tr->nbcat = pcat_Char;
case tkn_MultiDots:
    if(trl->bndry - tr->bndry <= 3)
        goto propagateClause;
    /* else fall through */
case tkn_Abbrev:
case tkn_CapAbbrev:
case tkn_Period:
case '?':
case '!':           /* check for sent bndry, else clause or other */
    for(initScanRecord(&sr, *where);;) {
        tokenScanFwd(&sr);
        if(not BITELT(&RightBrackets, sr.class))
            break;
        sr.from = sr.nextbndry;
    }
    if(sr.class == PARA_MARK)
        goto isSentence;
    if(sr.class != tkn_Space
    || (sr.nextbndry - sr.from < 2 && not prefsTolerateSingleSpaceSentBndries)) {
        if(sr.class == tkn_Space && charAt(sr.nextbndry) == PARA_MARK)
            goto isSentence;
    notSentence:
        switch(tr->class) {
        case tkn_Abbrev:
        case tkn_CapAbbrev:
        case tkn_Period:
            tr->nbcat = nbcat = pcat_Char;
            break;
```

```
            default:
                goto propagateClause;
            }
            break;              /* from outer switch */
        }
        if(sr.nextbndry - sr.from == 1) {
            sr.from = sr.nextbndry;
            tokenScanFwd(&sr);
            if(not BITELT(&Capwords, sr.class))
                goto notSentence;
        }
        /* alright, it's a sentence! */
    isSentence:
        if(BITELT(&Abbrevs, tr->class)) {
            tr->nbcat = nbcat = pcat_Char;
            tr = tokenRecordNext(tr);
        } else
            nbcat = pcat_Sent;
        if(tr->class != PARA_MARK)
            tr->nbcat = pcat_Sent;
        for(;;) {
            tr = tokenRecordNext(tr);
            if((tmp = checkNBQuotesBrkts(tr->class)) >= 0)
                tr->nbcat = tmp;
            if(not BITELT(&RightBrackets, tr->class))
                break;
        }
        if(tr->class == tkn_Space)
            tr->nbcat = pcat_Sent;
        break;
    case ';':
    case '-':
    case tkn_Colon:
    case tkn_MultiDash:
    propagateClause:
        propagateNatBndry(tr, nbcat = pcat_Clause);
        break;
    case tkn_Comma:
        propagateNatBndry(tr, nbcat = pcat_Phrase);
        break;
    }                   /* end of main switch */
    return nbcat;
} propagateNatBndry(tr, nbcat, bs)
TokenRecord *tr;
{
    tr->nbcat = nbcat;
    for(;;) {
        tr = tokenRecordNext(tr);
        if(not BITELT(&PropagateBitset, tr->class))
            break;
        else if((tr->nbcat = checkNBQuotesBrkts(tr->class)) < 0)
            tr->nbcat = nbcat;
    }
}

/* assume *where is at a token bndry.  Return the nbcat of the previous token,
   leaving its init bndry in *where.  meanwhile, it may have propagated nb's bkwds.
   Like scan nb fwd, assumes its tokenrecord ptrs won't change out from under it,
   which will be true if the token cache is large enough. */
scanNatBndryBkwd(where)
long *where;
{
TokenRecord *tr;
ScanRecord sr;
long oldwhere;

if(*where == 0)
        return pcat_Para;
    if((tr = tokenRecordAt(*where)) == NIL) {
        initScanRecord(&sr, *where);
```

```
        tokenScanFwd(&sr);
        sr.from = sr.nextbndry;
        tokenScanBkwd(&sr);
        if((tr = tokenRecordAt(*where)) == NIL)
            ASSERT(FALSE, "scanNatBndryBkwd called with non-token-bndry");
    }
    tr = tokenRecordPrev(tr);
    oldwhere = *where;
    *where = tr->bndry;
    if(tr->nbcat < 0) {
        initScanRecord(&sr, *where);
        sr.class = tr->class;
        for(;;) {
            if(BITELT(&WordTokens, sr.class) || sr.from == 0)
                break;
            tokenScanBkwd(&sr);
            sr.from = sr.nextbndry;
        }
        for(; sr.from <= tr->bndry;)
            scanNatBndryFwd(&sr.from);
    }
    return tr->nbcat;
}

/* sr comes in initialized to somewhere within a nat bndry of unknown cat.  return with
sr from & nextbndry bracketing the NB and return the cat. */
natBndryHere(sr)
ScanRecord *sr;
{
int nbl, nbr;
long start0, start1;

start0 = sr->from;
    tokenBndryLeft(sr);
    start1 = sr->from;
    nbr = scanNatBndryFwd(&sr->from);
    if((start0 != start1 && nbr == 0) || nbr >= pcat_LBrkt) {
        sr->nextbndry = sr->from;
        sr->from = start1;
        return nbr;
    }
    sr->from = start1;
    nbl = scanNatBndryBkwd(&sr->from);
    if(nbl > nbr && nbl < pcat_LBrkt && start0 == start1) {
        nbStartPosn(nbl, sr);
        sr->nextbndry = start1;
        return nbl;
    } else if(nbl == nbr) {
        sr->from = start1;
        nbStartPosn(nbr, sr);
        start1 = sr->from;
    } else
        sr->from = start1;
    nbEndPosn(nbr, sr);
    sr->nextbndry = sr->from;
    sr->from = start1;
    return nbr;
}

/* adjust sr.from to left bndry of cat.  do a fancy song-and-dance to recognize breaks caused by
right brkts and quotes, but only if the initial point of the cat's nbchars comes in front of them.
*/
long nbStartPosn(cat, sr)
ScanRecord *sr;
{
long prevfrom, savefrom = -1;
int ncat;

if(cat == pcat_Char)
        return;
    for(tokenBndryLeft(sr);;) {
        if(sr->from <= 0)
```

```
            return;
        prevfrom = sr->from;
        ncat = scanNatBndryBkwd(&sr->from);
        if(cat > pcat_Word && ncat == pcat_RQuote) {
            if(savefrom == -1) savefrom = prevfrom;
            continue;
        }
        if(savefrom != -1) {
            prevfrom = ncat != cat ? savefrom : sr->from;
            break;
        }
        if(ncat != cat)
            break;
    }
    sr->from = prevfrom;
}

/* adjust sr.from to least larger posn where nat bndry becomes -cat */
nbEndPosn(cat, sr)
ScanRecord *sr;
{
long prevfrom = sr->from, lastpos, savefrom = -1;
int ncat;

if(cat >= pcat_LBrkt)
        return;
    tokenBndryRight(sr);
    lastpos = lastCharPosn();
    for(;;) {
        if(sr->from >= lastpos)
            break;
        prevfrom = sr->from;
        ncat = scanNatBndryFwd(&sr->from);
        if(cat > pcat_Word && ncat == pcat_RQuote) {
            if(savefrom == -1) savefrom = prevfrom;
            continue;
        }
        if(savefrom != -1) {
            prevfrom = ncat != cat ? savefrom : sr->from;
            break;
        }
        if(ncat != cat)
            break;
    }
    sr->from = prevfrom;
} static Bitset *stopsets[] =
    {&WordStopBitset, &PhraseStopBitset, &ClauseStopBitset, &SentStopBitset, &ParaStopBitset};

/* return the nbcat of first position >= cat, leaving the position in sr.  scan
   forwards starting from position initially given in sr.from, which is assumed to
   be on a token bndry. */
boundaryAfter(sr, cat, tknp, lenp, bndrycatp, maybeBreakBracketsFlag)
ScanRecord *sr;
char *tknp, *lenp, *bndrycatp;
{
int ncat;
long where, last;
char newchar;

where = sr->from;
    last = lastCharPosn();
    while(where > 0) {
        newchar = charAt(where - 1);
        if(newchar == '.') {
            tokenScanBkwd(sr);
            if(BITELT(&Abbrevs, sr->class)) {
                sr->from = where;
                ncat = natBndryHere(sr);
                if(ncat >= cat) {
                    *bndrycatp = ncat;
```

```
                    *lenp = sr->nextbndry - sr->from;
                    tokenScanFwd(sr);
                    *tknp = sr->class;
                    return ncat;
                }
            }
            break;
        }
        if(not BITELT(&RightBrackets, newchar))
            break;
        where--;
    }
    where = sr->from;
    for(;;) {
        if(not charSetSearchFwd(&where, stopsets[cat - 1])) {
            sr->from = last;
            *tknp = PARA_MARK;
            *lenp = 0;
            *bndrycatp = 0xff;
            return pcat_Para;
        }
        newchar = charAt(where);
        if(BITELT(&BndryComplexBitset, newchar) && newchar != ' ' && not tokenBndryAt(where)) {
            where++;
            continue;
        }
        if(newchar == '.') {
            sr->from = where;
            tokenBndryLeft(sr);
            if(sr->from != where) {
                tokenScanFwd(sr);
                if(not BITELT(&Abbrevs, sr->class)) {
                    where++;
                    continue;
                } else
                    where++;        /* skip past . to look for spaces following */
            }
        }
        if(BITELT(&LeftBrackets, newchar)) {
            if(cat == pcat_Word) {
                sr->from = where;
                *lenp = 1;
                *tknp = newchar;
                *bndrycatp = checkNBQuotesBrkts(newchar);
                return cat;
            }
            sr->from = ++where;
            if(not scanFwdBalanced(&where, getBracketInfo(newchar)->closebracket))
                where = sr->from;
            else if(maybeBreakBracketsFlag) {
                long tmp = where - 1;
                ncat = scanNatBndryBkwd(&tmp);
                if(ncat == pcat_Char || ncat >= pcat_LBrkt)
                    ncat = pcat_Word;
                if(cat <= ncat) {
                    sr->from--;
                    *lenp = 1;
                    *tknp = newchar;
                    *bndrycatp = ncat;
                    return cat;
                }
            }
        } else {
            sr->from = where;
            ncat = natBndryHere(sr);
            if(ncat >= cat) {
                *bndrycatp = ncat;
                *lenp = sr->nextbndry - sr->from;
                tokenScanFwd(sr);
                *tknp = sr->class;
                return ncat;
            }
```

```
            if(newchar == '.')
                where++;
        }
    }
} scanFwdBalanced(where, what)
long *where;
{
long svwhere;
char newchar;

for(;;) {
        if(not charSetSearchFwd(where, &ParaStopBitset))
            return FALSE;
        newchar = charAt(*where);
        if(newchar == PARA_MARK)
            return FALSE;
        if(BITELT(&LeftBrackets, newchar)) {
            (*where)++;
            svwhere = *where;
            if(not scanFwdBalanced(where, getBracketInfo(newchar)->closebracket))
                *where = svwhere;
        } else if(newchar == what) {
            (*where)++;
            if(BITELT(&Apostrophes, newchar)) { /* mid-token apostrophe or close quote? */
                if(tokenBndryAt(*where))
                    return TRUE;
            } else
                return TRUE;
        } else
            (*where)++;
    }
}

/* return the nbcat of first position <= cat, leaving the position in sr. scan
   backwards starting from position initially given in sr.from */
boundaryBefore(sr, cat, tknp, lenp, bndrycatp, maybeBreakBracketsFlag)
ScanRecord *sr;
char *tknp, *lenp, *bndrycatp;
{
int ncat;
long where, wherebefore = -1, firstwhere;
char newchar, newchar2;

for(firstwhere = where = sr->from;;) {
        if(not charSetSearchBkwd(&where, stopsets[cat - 1])) {
        notFoundExit:
            sr->from = 0L;
            *tknp = PARA_MARK;
            *lenp = 0;
            *bndrycatp = 0xff;
            return pcat_Para;
        }
        newchar = charAt(where);
        if(BITELT(&BndryComplexBitset, newchar) && newchar != ' ' && not tokenBndryAt(where))
            continue;
        if(newchar == '.') {
            sr->from = where;
            tokenBndryLeft(sr);
            if(sr->from != where) {
                tokenScanFwd(sr);
                if(not BITELT(&Abbrevs, sr->class))
                    continue;
                else if(sr->nextbndry >= firstwhere) {
                    where = sr->from;
                    continue;
                } else {
                    wherebefore = sr->from;
                    where++;
                }
            }
```

```
            }
            if(BITELT(&RightBrackets, newchar)) {
                if(where == 0)
                    goto notFoundExit;
                newchar2 = charAt(where - 1);
                if(BITELT(stopsets[cat - 1], newchar2) && not BITELT(&RightBrackets, newchar2)) {
                    sr->from = where - 1;
                    goto tryExit;
                }
                if(cat == pcat_Word) {
                    sr->from = where + 1;
                    *lenp = 1;
                    *tknp = newchar;
                    *bndrycatp = checkNBQuotesBrkts(newchar);
                    return cat;
                }
                sr->from = where;
                if(not scanBkwdBalanced(&where, getBracketInfo2(newchar)->openbracket))
                    where = sr->from;
                else if(maybeBreakBracketsFlag) {
                    long tmp = sr->from;
                    ncat = scanNatBndryBkwd(&tmp);
                    if(ncat == pcat_Char || ncat >= pcat_LBrkt)
                        ncat = pcat_Word;
                    if(cat <= ncat) {
                        sr->from++;
                        *lenp = 1;
                        *tknp = newchar;
                        *bndrycatp = ncat;
                        return cat;
                    }
                }
            } else {
                sr->from = where;
            tryExit:
                ncat = natBndryHere(sr);
                if(ncat >= cat) {
                    *lenp = sr->nextbndry - sr->from;
                    tokenScanFwd(sr);
                    *tknp = sr->class;
                    sr->from += *lenp;      /* don't include nb chars */
                    *bndrycatp = ncat;
                    return ncat;
                }
            }
            if(wherebefore >= 0) {           /* prevent infinite loops skipping over abbrevs */
                where = wherebefore;
                wherebefore = -1;
            }
        }
    }
} scanBkwdBalanced(where, what)
long *where;
{
long svwhere;
char newchar;

for(;;) {
        if(not charSetSearchBkwd(where, &ParaStopBitset))
            return FALSE;
        newchar = charAt(*where);
        if(newchar == PARA_MARK)
            return FALSE;
        if(BITELT(&RightBrackets, newchar)) {
            if(BITELT(&Apostrophes, newchar) && not tokenBndryAt(*where))
                continue;
            svwhere = *where;
            if(not scanBkwdBalanced(where, getBracketInfo2(newchar)->openbracket))
                *where = svwhere;
        } else if(newchar == what)
            return TRUE;
    }
}
```

APPENDIX B tiabguts.c 11/16/88

```c
/* internal routines for TIAB */

/* by Curtis Abbott.  Copyright © Xerox Corp. 1988. All rights reserved. */ include "tiab.h"

CacheBlock cacheheaders[NCACHEHEADERS];
long tcachemin, tcachemax;    /* WP char positions */
static int tcachefirst, tcachelast;    /* front and back indices */
int tcachefull;

/* cache block stuff first */ static flushBlockCache()
{
CacheBlock *cb;

if(freeAllExistsFlag)
                tiabFreeAllBlocks();
        else for(cb = cacheheaders; cb < nextCb; cb++)
                if(UNSHARED_TEXT(cb))
                        tiabFreeTextBlock(cb->chars);
        nextCb = cacheheaders;
        flushCacheFlag = FALSE;
        cacheBottom = -1;
        cacheTop = -1;
}

/* getcharsForward and getcharsBackward form the intfc between the cacheblock
    abstraction and its clients within TIAB.  I've added the idea of an excluded block
    somewhat later in the game to support paste.  The excluded block is a text region
    that getchars pretends isn't there.  It's used to analyze what things were like
    after the delete (in case of paste over seln) but before the insert. */ static TextRegion xblock = {-1, -1};

setXBlock(start, length)
long start, length;
{
        xblock.offset = start;
        xblock.length = length;
        flushBlockCache();
        tcacheinit();
} clearXBlock()
{
        if(xblock.offset >= 0) {
                if(tcachemax >= xblock.offset)
                        tcacheinit();
                xblock.offset = -1;
                xblock.length = -1;
                flushBlockCache();
        }
} long lastCharPosn()
{
long where;

where = tiabLastCharPosn();
        if(xblock.offset >= 0) where -= xblock.length;
        return where;
}

/* a helper for both fwd and bkwd after lengths and offsets have been determined */
static getcharsl(cb, newoffset, newlength)
CacheBlock *cb;
long newoffset, newlength;
{
register long tmp;
```

```
long xlen;

/* first, set up the new cache header */
    if(nextCb == CBLIMIT) {     /* no more; flush one to make room */
        if(cb == nextCb) {      /* flush from bottom */
            if(UNSHARED_TEXT(&cacheheaders[0]))
                tiabFreeTextBlock(cacheheaders[0].chars);
            tmp = sizeof(*cb) * (NCACHEHEADERS - 1);
            blkmove(&cacheheaders[1], cacheheaders, tmp);
            cacheBottom = cacheheaders[0].offset;
            cb--;
        } else                  /* flush from top */
            if(UNSHARED_TEXT(&cacheheaders[NCACHEHEADERS - 1]))
                tiabFreeTextBlock(cacheheaders[NCACHEHEADERS - 1].chars);
        nextCb--;
    }
    /* make room */
    blkmove(cb, cb + 1, (long)sizeof(CacheBlock) * (nextCb - cb));
    nextCb++;
    /* get the data */
    tmp = tiabGetPointer(newoffset, &cb->chars, &xlen);
    if(xlen == 0) {             /* alloc text space and copy the chars */
        tiabGetTextBlock(&cb->chars);
        cb->offset = newoffset;
        if((cb->length = tiabCopyChars(newoffset, newlength, cb->chars)) < newlength) {
            if(cb->length == 0) {
                flushCacheFlag = TRUE; /* slash & burn as we retreat */
                return FALSE;
            }
        }
    } else {                    /* pointer hack worked; now adjust as needed */
        cb->offset = tmp;
        cb->length = xlen;
        if(cacheBottom < 0 || tmp < cacheBottom)
            cacheBottom = tmp;
        if(tmp + xlen > cacheTop)
            cacheTop = tmp + xlen;
    }
    return TRUE;
} getcharsForward(offset, cpp, lenp)
long offset;
char **cpp;             /* return value for char ptr */
int *lenp;              /* return value for # valid chars at that position */
{
register CacheBlock *cb;
register tmp;
long newoffset, newlength;

*lenp = 0;              /* redundancy, in case we return FALSE */
    if(offset < 0)
        return FALSE;
    if(xblock.offset >= 0 && xblock.offset <= offset)
        offset += xblock.length;

/* check for flush cache, and requested offset above or below current cache limits */
    if(flushCacheFlag) {
        flushBlockCache();
        cb = cacheheaders;
        newoffset = offset;
        newlength = CBPREFSIZE;
    } else if(offset < cacheBottom) {
        cb = cacheheaders;
        newoffset = min(offset, cacheBottom - CBPREFSIZE);
        newlength = CBPREFSIZE;
        if(newoffset < 0) {
            newlength += newoffset;
            newoffset = 0;
            if(newlength <= 0)
                return FALSE;
        }
```

```
        } else if(offset >= cacheTop) {
            if(offset >= tiabLastCharPosn())
                return FALSE;
            cb = nextCb;
            newoffset = min(cacheTop, offset);
            newlength = CBPREFSIZE;
        } else {
            /* requested offset is within current cache limits.  See if the data is there. */
            for(cb = cacheheaders; cb < nextCb; cb++) {
                if(cb->offset <= offset && cb->offset + cb->length > offset)
                    goto out;
                if(cb->offset > offset) {
                    /* data isn't there, so figure out how much to get */
                    cb--;
                    tmp = cb->offset + cb->length + CBPREFSIZE;
                    cb++;
                    if(offset < tmp) {/* can make contiguous with prev entry? */
                        newoffset = tmp - CBPREFSIZE;
                        newlength = CBPREFSIZE;
                    } else {
                        tmp = cb->offset - CBPREFSIZE;
                        if(offset >= tmp) {    /* can make contiguous with next entry? */
                            newoffset = tmp;
                            newlength = CBPREFSIZE;
                        } else {
                            newoffset = offset;
                            newlength = CBPREFSIZE;
                        }
                    }
                    break;
                }
            }
        }
        if(not getchars1(cb, newoffset, newlength))
            return FALSE;
out:
        *cpp = &cb->chars[tmp = offset - cb->offset];
        *lenp = cb->length - tmp;
        if(offset < xblock.offset && offset + *lenp > xblock.offset)
            *lenp = xblock.offset - offset;
        if(*lenp < 0) *lenp = 0;
        return *lenp > 0;
} getcharsBackward(offset, cpp, lenp)
long offset;
char **cpp;           /* return value for char ptr */
int *lenp;            /* return value for # valid chars at that position */
{
register CacheBlock *cb;
register tmp;
long newoffset, newlength;

*lenp = 0;            /* redundancy, in case we return FALSE */
        if(offset <= 0)
            return FALSE;
        if(xblock.offset >= 0 && xblock.offset < offset)
            offset += xblock.length;

/* check for flush cache, and requested offset above or below current cache limits */
        if(flushCacheFlag) {
            flushBlockCache();
            cb = cacheheaders;
            newoffset = max(offset - CBPREFSIZE, 0);
            newlength = CBPREFSIZE;
        } else if(offset <= cacheBottom) {
            cb = cacheheaders;
            newoffset = max(offset - CBPREFSIZE, 0);
            newlength = min(CBPREFSIZE, cacheBottom);
        } else if(offset > cacheTop) {
            cb = nextCb;
            newoffset = max(offset - CBPREFSIZE, cacheTop);
```

```
            newlength = CBPREFSIZE;
    } else {
        /* requested offset is within current cache limits.  See if the data is there. */
        for(cb = cacheheaders; cb < nextCb; cb++) {
            if(cb->offset < offset && cb->offset + cb->length >= offset)
                goto out;
            if(cb->offset > offset) {
                /* data isn't there, so figure out how much to get */
                cb--;
                tmp = cb->offset + cb->length + CBPREFSIZE;
                cb++;
                if(offset < tmp) {/* can make contiguous with prev entry? */
                    newoffset = tmp - CBPREFSIZE;
                    newlength = CBPREFSIZE;
                } else {
                    tmp = cb->offset - CBPREFSIZE;
                    if(offset >= tmp) {    /* can make contiguous with next entry? */
                        newoffset = tmp;
                        newlength = CBPREFSIZE;
                    } else {
                        newoffset = tmp;
                        newlength = CBPREFSIZE;
                    }
                }
                break;
            }
        }
    }
    if(not getchars1(cb, newoffset, newlength))
        return FALSE;
out:
    *cpp = &cb->chars[tmp = offset - cb->offset];
    *lenp = tmp;
    if(xblock.offset >= 0 && offset > xblock.offset
        && offset - *lenp < xblock.offset + xblock.length)
            *lenp = offset - (xblock.offset + xblock.length);
    if(*lenp < 0) *lenp = 0;
    return *lenp > 0;
}

/* return the character at position.  Use the standard getchar machinery. */
charAt(position)
long position;
{
char *cp;
int len;

if(position >= lastCharPosn() || (not getcharsForward(position, &cp, &len)) || len <= 0)
        return 0;
    return *cp;
}

/**************************************************
  SEARCH
**************************************************/

/* in char search both directions, lim is the max # of chars to look through. */
charSearchFwd(where, what)
long *where;
char what;
{
char *curcp;
register char *cp;
int nvalid;
long wherenow = *where;
register long searchcount = 0;

for(;;) {
        if(not getcharsForward(wherenow, &curcp, &nvalid))
            return FALSE;
        wherenow += nvalid;
```

```
            for(cp = curcp; --nvalid >= 0; cp++, searchcount++) {
                if(*cp == what) {
                    *where += searchcount;
                    return TRUE;
                }
            }
        }
    } charSetSearchFwd(where, what)
long *where;
Bitset *what;
{
char *curcp;
register char *cp;
int nvalid;
long wherenow = *where;
register long searchcount = 0;

for(;;) {
        if(not getcharsForward(wherenow, &curcp, &nvalid))
            return FALSE;
        wherenow += nvalid;
        for(cp = curcp; --nvalid >= 0; cp++, searchcount++) {
            if(BITELT(what, *cp)) {
                *where += searchcount;
                return TRUE;
            }
        }
    }
} charSearchBkwd(where, what)
long *where;
char what;
{
char *curcp;
register char *cp;
int nvalid;
long wherenow = *where;
register long searchcount = 1;

for(;;) {
        if(not getcharsBackward(wherenow, &curcp, &nvalid))
            return FALSE;
        wherenow -= nvalid;
        for(cp = curcp; --nvalid >= 0; searchcount++) {
            if(*--cp == what) {
                *where -= searchcount;
                return TRUE;
            }
        }
    }
} charSetSearchBkwd(where, what)
long *where;
Bitset *what;
{
char *curcp;
register char *cp;
int nvalid;
long wherenow = *where;
register long searchcount = 1;

for(;;) {
        if(not getcharsBackward(wherenow, &curcp, &nvalid))
            return FALSE;
        wherenow -= nvalid;
        for(cp = curcp; --nvalid >= 0; searchcount++) {
            if(BITELT(what, *--cp)) {
                *where -= searchcount;
```

```
                return TRUE;
            }
        }
    }
}

/*****************************************/
/*         stuff about tokens            */
/*****************************************/ tcacheinit()
{
    tcachemin = tcachemax = -1;
    tcachefirst = tcachelast = 0;
    tcachefull = 0;
}

/* the next three can probably be static */
static TokenRecord *
tcachenext(tcp)
TokenRecord *tcp;
{
    tcp++;
    if(tcp >= &tokencache[TKNC_SIZE])
        tcp = tokencache;
    return tcp;
} static TokenRecord *
tcacheprev(tcp)
TokenRecord *tcp;
{
    tcp--;
    if(tcp < tokencache)
        tcp = &tokencache[TKNC_SIZE - 1];
    return tcp;
}

TokenRecord *
tokenRecordAt(posn)
long posn;
{
    TokenRecord *tcp;

if(tcachemin <= posn && posn <= tcachemax) {
        tcp = &tokencache[tcachefirst];
        for(;;) {
            if(tcp->bndry == posn)
                return tcp;
            tcp = tcachenext(tcp);
            if(tcp->bndry > posn || tcp == &tokencache[tcachelast])
                break;
        }
    }
    return NIL;
}

TokenRecord *
tokenRecordNext(tr)
TokenRecord *tr;
{
    ScanRecord sr;
    TokenRecord *tr1 = tcachenext(tr);

if(tr1 == &tokencache[tcachelast] || tr->class == 0) {
        initScanRecord(&sr, tr->bndry);
        tokenScanFwd(&sr);
        if((tr = tokenRecordAt(sr.nextbndry)) == NIL)
            ASSERT(FALSE, "can't find tr in tokenRecordNext");
    } else
```

```
            tr = tr1;
        if(tr->class == 0 && tr->bndry < lastCharPosn()) {
            initScanRecord(&sr, tr->bndry);
            tokenScanFwd(&sr);
        }
        return tr;
}

TokenRecord *
tokenRecordPrev(tr)
TokenRecord *tr;
{
    ASSERT(tr >= tokencache && tr < &tokencache[TKNC_SIZE], "tokenRecordPrev");
    if(tr == &tokencache[tcachefirst]) {
        ScanRecord sr;
        initScanRecord(&sr, tr->bndry);
        tokenScanBkwd(&sr);
        if((tr = tokenRecordAt(sr.nextbndry)) == NIL)
            ASSERT(FALSE, "can't find tr in tokenRecordPrev");
        return tr;
    }
    else
        return tcacheprev(tr);
} tcacheput(bndry, class, backwards)
long bndry;
{
TokenRecord *tcp;

if(backwards) {
        if(tcachefull) {
            if(--tcachelast < 0)
                tcachelast = TKNC_SIZE - 1;
            tcachemax = tcacheprev(&tokencache[tcachelast])->bndry;
        }
        if(--tcachefirst < 0)
            tcachefirst = TKNC_SIZE - 1;
        tcp = &tokencache[tcachefirst];
    } else {
        if(tcachefull) {
            if(++tcachefirst > TKNC_SIZE - 1)
                tcachefirst = 0;
            tcachemin = tcachenext(&tokencache[tcachefirst])->bndry;
        }
        tcp = &tokencache[tcachelast];
        if(++tcachelast > TKNC_SIZE - 1)
            tcachelast = 0;
    }
    tcp->bndry = bndry;
    tcp->class = class;
    tcp->nbcat = -1;
    tcachefull = tcachefirst == tcachelast;
}

/* helper for token bndry finders: if it's in the cache, fix and return TRUE */
checkTokenCache(sr, moveleft)
ScanRecord *sr;
{
    TokenRecord *tcp;

if(not inrange(sr->from, tcachemin, tcachemax))
        return FALSE;
    for(tcp = &tokencache[tcachefirst];;) {
        if(tcp->bndry == sr->from)
            return TRUE;
        if(tcp->bndry > sr->from) {
            sr->from = moveleft ? tcacheprev(tcp)->bndry : tcp->bndry;
            return TRUE;
        }
        tcp = tcachenext(tcp);
        ASSERT(tcp != &tokencache[tcachelast], "checkTokenCache");
    }
```

```
}

/* if sr->from isn't at a token bndry, move it to the first one to its right */
tokenBndryRight(sr)
ScanRecord *sr;
{
    long origfrom;

if(tokenBndryAt(sr->from) && checkTokenCache(sr, FALSE))
        return;
    origfrom = sr->from;
    tokenBndryLeft1(sr, FALSE);
    if(sr->from < origfrom) {
        tokenScanFwd(sr);
        sr->from = sr->nextbndry;
    }
}

/* if sr->from isn't at a token bndry, move it to the first one to its left */
tokenBndryLeft(sr)
ScanRecord *sr;
{
    tokenBndryLeft1(sr, TRUE);
} tokenBndryLeft1(sr, checkAt)
ScanRecord *sr;
{
    long origfrom;
    TokenRecord *tr;

if((checkAt && tokenBndryAt(sr->from))
        || checkTokenCache(sr, TRUE))
        return;
    /* to get the correct token category */
    origfrom = sr->from;
    tokenScanBkwd(sr);
    sr->from = sr->nextbndry;
    if((tr = tokenRecordAt(sr->from)) != NIL)
        tr->class = 0;        /* we don't really know */
    for(; sr->nextbndry < origfrom; sr->from = sr->nextbndry)
        tokenScanFwd(sr);
    if(sr->from > origfrom) {
        tokenScanBkwd(sr);
        sr->from = sr->nextbndry;
    }
}

/* helper for tokenBndryLeft and tokenBndryRight. Return whether we're at a
   token bndry that's "easy to recognize." Note that FALSE doesn't mean we're not
   at a token bndry; it means we can't recognize that we're not at a bndry without
   scanning bkwds and fwds as in tokenBndryLeft() */
tokenBndryAt(where)
long where;
{
register prevchar, curchar, nextchar;
char *cp;
int nvalid = 0;

if(tokenRecordAt(where))
        return TRUE;

if(getcharsForward(where - 1, &cp, &nvalid) == FALSE || nvalid < 1)
        return TRUE;       /* end of text is token bndry */
    prevchar = *cp++;
    nvalid--;
    if(nvalid == 0 && (getcharsForward(where, &cp, &nvalid) == FALSE || nvalid < 1))
        return TRUE;       /* end of text is token bndry */
    curchar = *cp++;
    nvalid--;
    if(nvalid == 0 && (getcharsForward(where + 1, &cp, &nvalid) == FALSE || nvalid < 1))
        nextchar = 0;
```

```
        else
            nextchar = *cp;

if(BITELT(&BndrySimpleBitset, curchar) || BITELT(&BndrySimpleBitset, prevchar))
            return TRUE;
        if(BITELT(&BndryComplexBitset, curchar)) {
            switch(curchar & 0xff) {
            case '-':
                if(prevchar == '-')
                    return FALSE;
                else if(fineGrainedWords || BITELT(&WordBreakChars, prevchar) || nextchar == '-')
                    return TRUE;
                else
                    return FALSE;
            case '\'': case '`':
                return (BITELT(&WordBreakChars, prevchar) || BITELT(&WordBreakChars, nextchar));
            case ' ': return prevchar != ' ';
            case ',':
            case ':':
                return not(BITELT(&Digits, prevchar) && BITELT(&Digits, nextchar));
            case '$': return BITELT(&WordBreakChars, prevchar);
            }
        }
        if(BITELT(&BndryComplexBitset, prevchar)) {
            switch(prevchar & 0xff) {
            case ' ': return curchar != ' ';
            case '\'': case '`':
                return BITELT(&WordBreakChars, curchar);
            }
        }
        return FALSE;
} initScanRecord(sr, from)
ScanRecord *sr;
long from;
{
    bzero(sr, (long)sizeof(ScanRecord));
    sr->from = from;
}

/*
 * Scan from from to next token bndry; return token class or -1 if at end of input.
 * No synching to token boundary is done here.
 */
tokenScanFwd(sr)
register ScanRecord *sr;
{
int retval, wlen, capscount, alphacount, abbrevpattern, abbrevpatternstarted;
char prevchar, curchar, nextchar, firstletter, apostseen, alldigit;
char wordbuff[21];
char *cp;
int nvalid = 0;
long from = sr->from;

/* see if the next token is already cached */
    if(tcachemin <= sr->from) {
        if(sr->from < tcachemax) {
            TokenRecord *tcp, *tcp2;
            tcp = &tokencache[tcachefirst];
            tcp2 = tcachenext(tcp);
            for(;;) {
                if(tcp->bndry <= sr->from && tcp2->bndry > sr->from) {
                    if(tcp->class != 0) {
                        sr->nextbndry = tcp2->bndry;
                        return sr->class = tcp->class;
                    }
                }
                tcp = tcp2;
                tcp2 = tcachenext(tcp2);
                if(tcp2 == &tokencache[tcachelast])
                    break;
```

```
            }
        } else if(sr->from == tcachemax && sr->from == lastCharPosn()) {
            sr->nextbndry = sr->from;
            return sr->class = 0;
        }
    }
} prevchar = from == 0 ? 0 : charAt(from - 1);
if(getcharsForward(from, &cp, &nvalid) == FALSE) {
    sr->nextbndry = from;
    retval = 0;                /* an invalid token code */
    goto cacheAndReturn;
}
nextchar = nvalid > 1 ? *(cp + 1) : charAt(from + 1);
from += nvalid;           /* pre-incr for next call to getchars. */

/* check for the simplest case first */
if(BITELT(&SingleEmbeddableTokenBitset, *cp)) {
    if(*cp == ',' || *cp == ':') {
        if(BITELT(&Digits, prevchar) && BITELT(&Digits, nextchar)) {
            if(fineGrainedWords) retval = tkn_WordInternal;
            else goto getword;
        } else
            retval = *cp == ',' ? tkn_Comma: tkn_Colon;
    } else if(BITELT(&Apostrophes, *cp)) {
        if(BITELT(&Alphas, prevchar) && BITELT(&Alphas, nextchar)) {
            if(fineGrainedWords) retval = tkn_WordInternal;
            else goto getword;
        } else
            retval = tkn_SingleQuote;
    } else if(*cp == '-')
        retval = tkn_MultiDash;
    else
        retval = *cp;
    sr->nextbndry = sr->from + 1;
    cp++;
    nvalid--;
    goto cacheAndReturn;
}

/* now scan over simple multichar tokens like -- and ... */
if(BITELT(&SimpleMulticharTokenBitset, *cp)) {
    retval = *cp++;
    for(;;) {
        if(--nvalid <= 0) {
            if(getcharsForward(from, &cp, &nvalid) == FALSE)
                break;
            else
                from += nvalid;
        }
        if(BITELT(&SpacesBitset, retval)) {
            if(not BITELT(&SpacesBitset, *cp++))
                break;
        } else if(*cp++ != retval)
            break;
    }
    if(BITELT(&SpacesBitset, retval)) retval = tkn_Space;
    else if(retval == '-') {
        retval = tkn_MultiDash;
        if(((from - nvalid) - sr->from) == 1    /* length is 1 */
        && prevchar != '-') {                   /* careful about mid-token calls */
            if(fineGrainedWords) {
                if(not (BITELT(&WordBreakChars, prevchar) |
                        | BITELT(&WordBreakChars, nextchar)))
                    retval = tkn_WordInternal;
            } else if(not BITELT(&WordBreakChars, nextchar)) {
                cp--;
                nvalid++;
                goto getword;
            }
        }
    } else if(retval == '.') {
```

```
        if(((from - nvalid) - sr->from) < 3) {
            sr->nextbndry = sr->from + 1;
            retval = tkn_Period;
            if(fineGrainedWords && (from - nvalid) - sr->from == 1
                && not (BITELT(&WordBreakChars, prevchar) |
                    | BITELT(&WordBreakChars, nextchar)))
                retval = tkn_WordInternal;
            goto cacheAndReturn;
        } else
            retval = tkn_MultiDots;
    }
    sr->nextbndry = from - nvalid;
    goto cacheAndReturn;
}

/* if we arrive here, we must be looking at a word variant (== complex multichar). */
getword:
    curchar = *cp++;
    nvalid--;
    prevchar = 0;
    retval = tkn_Word;
    wlen = 0;
    capscount = 0;
    alphacount = 0;
    abbrevpattern = 0;
    abbrevpatternstarted = 0;
    apostseen = FALSE;
    alldigit = firstletter = TRUE;
    for(;; prevchar = curchar, curchar = nextchar, firstletter = FALSE) {
        if(curchar == 0) {    /* we're out of chars */
            nvalid--;
            break;
        }
        if(nvalid == 0) {
            if(getcharsForward(from, &cp, &nvalid) == FALSE)
                nextchar = 0;
            else {
                from += nvalid;
                nextchar = *cp++;
                nvalid--;
            }
        } else {
            nextchar = *cp++;
            nvalid--;
        }

/* the next two stmts interp the (L.)+ FSM. */
        if(BITELT(&Alphas, curchar)) {
            alphacount++;
            abbrevpattern++;
        }
        /* this one handles "backtracking" in cases like "a.bcd" */
        if(prefsEmbedPeriod == 0 && abbrevpatternstarted && abbrevpattern > 1) {
            sr->nextbndry = sr->from + 1;
            goto cacheAndReturn;
        }

/* prepare for lookup in abbrev dictionary */
        if(wlen < 20) {
            wordbuff[wlen++] =
                BITELT(&DowncaseAlphas, curchar) ? curchar - ('a' - 'A') : curchar;
        }
        if(firstletter && BITELT(&UpcaseAlphas, curchar))
            retval = tkn_CapWord;
        if(not BITELT(&DigitDollarDotComma, curchar))
            alldigit = FALSE;
        if(BITELT(&UpcaseAlphas, curchar))
            capscount++;
        if(BITELT(&WordBreakChars, curchar)) {
            if(fineGrainedWords)    /* definitely break now */
                goto checkabbrev;
```

```
            /* this first test interps the little FSM that treats (L.)+ as a dotted abbrev */
            if(curchar == '.' && abbrevpattern == 1) {
                if(BITELT(&WordBreakChars, nextchar))
                    goto dottedabbrev;/* if at end of pattern, merge to common code */
                abbrevpattern = 0;/* else enable next round */
                /* abbrevpatternstarted is used to recover from "a.bcd" when prefsEmbedPeriod == 0
*/
                abbrevpatternstarted = 1;
                continue;
            }
            /* now for the main group of tests */
            if((curchar == '-' && not BITELT(&Dashes, nextchar))
               || (BITELT(&DotComma, curchar) && alldigit && BITELT(&Digits, nextchar))
               || (prefsEmbedPeriod && curchar == '.' && BITELT(&Alphas, prevchar)
                   && BITELT(&Alphas, nextchar))
               || (BITELT(&Apostrophes, curchar) && BITELT(&Alphas, prevchar) && (not apostseen)
                   && BITELT(&Alphas, nextchar))
               || (curchar == ':' && BITELT(&Digits, prevchar) && BITELT(&Digits, nextchar))) {
                if(BITELT(&Apostrophes, curchar)) apostseen = TRUE;
                continue;
            }
            /* if these all fail, we're going to break, but should we include the dot? */
        checkabbrev:
            if(curchar == '.') {
                wordbuff[wlen - 1] = 0;
                if(abbrev(wordbuff)) {
                dottedabbrev:
                    nvalid--;
                    cp++;
                    retval = (retval == tkn_Word) ? tkn_Abbrev : tkn_CapAbbrev;
                }
            }
            break;
        }
    }
    /* at this point, we've found a word bndry; set up the return. */
    if(nextchar != 0) {
        nvalid += 2;        /* throw away curchar & nextchar */
        cp -= 2;
        sr->nextbndry = from - nvalid;
    } else {
        sr->nextbndry = from - (nvalid + 1);
        nvalid = -1;
    } if(sr->flags & scnrec_checkMixedCaseFlag) {
        mixedCaseFound = not(capscount == 0
                             || (capscount == 1
                                 && (retval == tkn_CapWord || retval == tkn_CapAbbrev))
                             || capscount == alphacount);
    }
    if(sr->flags & scnrec_checkAllCapsFlag)
        allCapsFound = capscount == alphacount;

cacheAndReturn:
    if(sr->from != tcachemax) {
        tcacheinit();
        tcachemin = sr->nextbndry;
    } else {
        TokenRecord *tcp = tcacheprev(&tokencache[tcachelast]);
        if(tcp->class == 0) tcp->class = retval;
    }
    tcachemax = sr->nextbndry;
    if(tcachemax > lastCharPosn())
        fatal("tcachemax over");
    tcacheput(sr->nextbndry, 0, FALSE);
    return sr->class = retval;
}

/*
 * Scan backwards from from to previous token bndry; return token class or -1 if at
 * start of buffer. This is very like tokenScanFwd, but there are a number of
```

```
 * important, and occasionally subtle, differences.
 * In particular, the state machine for recognizing dotted abbrevs is different.
 * The relevant states are 0, 1 and 2, coded as values of the vbl abbrevpattern.
 * 0 means it isn't a dotted abbrev. At 1 & 2, we're alive; 1 means we've just
 * seen a dot and 2 means we've just seen an alpha. A word break char from 2 takes
 * us to the success state. As in fwd scanning, a fair amount of the code has to
 * do with backing out when the pattern fails.
 */
tokenScanBkwd(sr)
register ScanRecord *sr;
{
int retval, wlen, capscount, alphacount, abbrevpattern, abbrevpatternstarted, tmp;
char prevchar, curchar, nextchar, dotfirst, apostseen, alldigit;
char wordbuff[21];
char *cp;
int nvalid = 0;
long from = sr->from;

/* see if the previous token is already cached */
    if(tcachemin < from && from <= tcachemax) {
        TokenRecord *tcp = tcacheprev(&tokencache[tcachelast]);
        for(;; tcp = tcacheprev(tcp)) {
            if(tcp->bndry < sr->from) {
                sr->nextbndry = tcp->bndry;
                return sr->class = tcp->class;
            }
            if(tcp == &tokencache[tcachefirst])
                break;
        }
    } prevchar = charAt(from);
    if(getcharsBackward(from, &cp, &nvalid) == FALSE) {
        sr->nextbndry = from;
        retval = 0;             /* an invalid token code */
        goto cacheAndReturn;
    }
    nextchar = nvalid > 1 ? *(cp - 2) : charAt(from - 2);
    from -= nvalid;    /* pre-decr for next call to getchars. */

/* check for the simplest case first */
    curchar = *--cp;
    nvalid--;
    if(BITELT(&SingleEmbeddableTokenBitset, curchar)) {
        if(*cp == ',' || *cp == ':') {
            if(BITELT(&Digits, prevchar) && BITELT(&Digits, nextchar)) {
                if(fineGrainedWords) retval = tkn_WordInternal;
                else goto getword;
            } else
                retval = *cp == ',' ? tkn_Comma: tkn_Colon;
        } else if(BITELT(&Apostrophes, curchar)) {
            if(BITELT(&Alphas, nextchar) && BITELT(&Alphas, prevchar)) {
                if(fineGrainedWords) retval = tkn_WordInternal;
                else goto getword;
            } else
                retval = tkn_SingleQuote;
        } else retval = curchar;
        sr->nextbndry = sr->from - 1;
        goto cacheAndReturn;
    }

/* now scan over simple multichar tokens like -- and ... */
    if(BITELT(&SimpleMulticharTokenBitset, curchar)) {
        retval = curchar;
        for(;;) {
            if(--nvalid < 0) {
                if(getcharsBackward(from, &cp, &nvalid) == FALSE) {
                    nvalid = 0;
                    goto end;
                } else {
                    from -= nvalid;
                    nvalid--;
```

```
            }
        if(BITELT(&SpacesBitset, retval)) {
            if(not BITELT(&SpacesBitset, *--cp))
                break;
        } else if(*--cp != retval)
            break;
    }
ret1:
    if(BITELT(&SpacesBitset, retval)) retval = tkn_Space;
    else if(retval == '-') {
        retval = tkn_MultiDash;
        if((sr->from - (from + nvalid)) == 2) { /* length is 1 */
            if(fineGrainedWords) {
                if(not (BITELT(&WordBreakChars, prevchar)
                   || BITELT(&WordBreakChars, nextchar)))
                    retval = tkn_WordInternal;
            } else if(not BITELT(&WordBreakChars, nextchar)) {
                cp++;
                nvalid++;
                goto getword;
            }
        }
    } else if(retval == '.') {
        if((tmp = sr->from - (from + nvalid + 1)) < 3) {
            if(tmp == 1 && (not BITELT(&WordBreakChars, nextchar))) {
                dotfirst = TRUE;
                curchar = nextchar;
                abbrevpattern = 1;
                goto checkword;
            } else {
                sr->nextbndry = sr->from - tmp;
                retval = tmp == 1 ? tkn_Period : tkn_MultiDots;
                goto cacheAndReturn;
            }
        } else
            retval = tkn_MultiDots;
    }
    sr->nextbndry = from + nvalid + 1;
    goto cacheAndReturn;
}

/* if we arrive here, we must be looking at a word variant (== complex multichar). */
getword:
    abbrevpattern = 0;
    dotfirst = FALSE;
checkword:
    apostseen = FALSE;
    prevchar = 0;
    retval = tkn_Word;
    wlen = 21;
    wordbuff[--wlen] = 0;
    capscount = 0;
    alphacount = 0;
    abbrevpatternstarted = FALSE;
    alldigit = TRUE;
    for(;; prevchar = curchar, curchar = nextchar) {
        if(curchar == 0) {      /* we're out of chars */
            goto prepexit;
        }
        if(nvalid == 0) {
            if(getcharsBackward(from, &cp, &nvalid) == FALSE) {
                nvalid--;       /* decr anyway, to foil later adjustment */
                nextchar = 0;
            } else {
                from -= nvalid;
                nextchar = *--cp;
                nvalid--;
            }
        } else {
            nextchar = *--cp;
            nvalid--;
```

```
        }
        if(BITELT(&Alphas, curchar)) {
            alphacount++;
            switch(abbrevpattern) {
            case 1: abbrevpattern++; break;
            case 2:
                abbrevpattern = 0;
                if(abbrevpatternstarted) {
                    if(prefsEmbedPeriod) {
                        /* assume nothing with embedded dots will be an abbrev */
                        sr->nextbndry = sr->from - 1;
                        retval = tkn_Period;
                        goto cacheAndReturn;
                    } else {
                        nvalid++;/* it will be incr'd further at backupAndExit */
                        goto backupAndExit;
                    }
                }
                break;
            }
        } else if(curchar == '.') {
            switch(abbrevpattern) {
            case 1: goto backupAndExit;
            case 2: abbrevpattern--;
                abbrevpatternstarted = TRUE;
                break;
            }
        } else {
            switch(abbrevpattern) {
            case 1: goto backupAndExit;
            case 2:
                if(curchar == '-' && not BITELT(&Dashes, nextchar)) {
                    abbrevpattern = 0;    /* not an abbrev */
                    break;
                }
                if(BITELT(&Apostrophes, curchar) && BITELT(&Alphas, nextchar)) {
                    sr->nextbndry = sr->from - 1;
                    retval = tkn_Period;
                    goto cacheAndReturn;
                }
                goto exitWithAbbrev;
            }
        }
        if(wlen >= 0)
curchar;    wordbuff[--wlen] = BITELT(&DowncaseAlphas, curchar)? curchar - ('a' - 'A') :

if(not BITELT(&DigitDollarDotComma, curchar))
            alldigit = FALSE;
        if(BITELT(&UpcaseAlphas, curchar))
            capscount++;
        if(BITELT(&WordBreakChars, curchar)) {
            /* if word-parts, we'll always break now */
            if(fineGrainedWords)
                goto prepexit;

if((curchar == '-' && not BITELT(&Dashes, nextchar))
             || (BITELT(&DotComma, curchar) && alldigit && BITELT(&Digits, nextchar))
             || (curchar == '.' &&
                    (abbrevpattern == 1
                     || (prefsEmbedPeriod && BITELT(&Alphas, prevchar) && BITELT(&Alphas,
nextchar))))
             || (BITELT(&Apostrophes, curchar) && BITELT(&Alphas, nextchar) && (not apostseen)
                    && BITELT(&Alphas, nextchar))
             || (curchar == ':' && BITELT(&Digits, prevchar) && BITELT(&Digits, nextchar))) {
                if(BITELT(&Apostrophes, curchar)) apostseen = TRUE;
                continue;
            }
            /* we're going to break.  set capitalization and check for dotted abbrev */
    prepexit:
            if(BITELT(&UpcaseAlphas, prevchar))
                retval = tkn_CapWord;
```

```
                if(dotfirst) {
                    if(abbrev(&wordbuff[wlen + 1])) {
                    exitWithAbbrev:
                        retval = (retval == tkn_Word) ? tkn_Abbrev : tkn_CapAbbrev;
                    } else {
                        sr->nextbndry = sr->from - 1;
                        nvalid = 0;  /* don't try to preserve scanrecord's view of chars */
                        retval = tkn_Period;
                        goto caseAndReturn;
                    }
                }
            }
            break;
        backupAndExit:
            nvalid += 2;
            curchar = *(cp += 2);
            if(BITELT(&UpcaseAlphas, curchar))
                retval = tkn_CapWord;
            goto exitWithAbbrev;
        }
    }
    /* at this point, we've found a word bndry; set up the return. */
    nvalid += 2;     /* take back curchar & nextchar */
    sr->nextbndry = from + (nvalid - 1);
    /* not sure about next stmt */
    if(nextchar != 0)
        sr->nextbndry += 1;
caseAndReturn:
    if(sr->flags & scnrec_checkMixedCaseFlag) {
        mixedCaseFound = not(capscount == 0
                    || (capscount == 1
                    && (retval == tkn_CapWord || retval == tkn_CapAbbrev))
                    || capscount == alphacount);
    }
    if(sr->flags & scnrec_checkAllCapsFlag)
        allCapsFound = capscount == alphacount;

cacheAndReturn:
    if(sr->from != tcachemin) {
        tcacheinit();
        tcachemax = sr->nextbndry;
    }
    tcachemin = sr->nextbndry;
    tcacheput(tcachemin, retval, TRUE);
    return sr->class = retval;
}

/* this is just a fake dictionary. */
abbrev(s)
char *s;
{
    register char **ds;
    static char *dictionary[] =
        {"MR", "MRS", "MS", "DR", "ETC", "VS", "EG", "IE", "INC", "LTD", NIL};

for(ds = dictionary; *ds != NIL; ds++)
        if(strcmp(s, *ds) == 0)
            return TRUE;
    return FALSE;
}
```

```c
/* TIAB defines */

/* by Curtis Abbott. Copyright © Xerox Corp. 1988. All rights reserved. */ define NIL 0L define TRUE 1
define FALSE 0 define not !
define min(x, y) (x < y) ? x : y
#define max(x, y) (x > y) ? x : y
#define inrange(x, lo, hi) (lo <= x && x <= hi)

#define isFlagOn(x, f) ((x & (f)) != 0)
#define setFlag(x, f) x |= (f)
#define clearFlag(x, f) x &= ~(f)

extern char *alloc();
#define ALLOC(n, t) (t *)alloc((long)(n * sizeof(t)))
#define ASSERT(test, msg) if(not (test)) fatal(msg)

#define LLFRONTPUT(hd, elt) elt->next = hd, hd = elt
#define LLSTEP(elt) elt = elt->next
#define LLtraverse(hd, elt) for(elt = hd; elt != NIL; LLSTEP(elt))
#define LLptraverse(hd, elt, t) for(elt = (t *)&hd; elt->next != NIL; LLSTEP(elt))

extern char *tiabError;
extern tiabErrno;

typedef struct cacheblock {
        long offset;                    /* the cacheblock array is sorted by offset */
        short length;
        short flags;                    /* CharsFromWP, etc. */
        char *chars;
} CacheBlock;
/* for now, the cache is statically allocated. It would be simple to make it be
   heap allocated at init time. */
#define NCACHEHEADERS      33
#define CBPREFSIZE                      30
extern CacheBlock cacheheaders[NCACHEHEADERS];
extern CacheBlock *nextCb;      /* pts to next avail slot */
#define CBLIMIT &cacheheaders[NCACHEHEADERS]
extern long cacheBottom, cacheTop;
extern char flushCacheFlag, freeAllExistsFlag;
/* flag values for cache blocks */
define CharsFromWP             1 define UNSHARED_TEXT(cbp) (((cbp)->flags & CharsFromWP) == 0)

typedef struct textregion {
        long offset;
        long length;
} TextRegion;

typedef struct tiabseln {
        long offset;
        long length;
        char type;
        char secondaryType;             /* when type is brkt, tells underlying type
*/
        char leftnbtoken;
        char leftnbtokenlength;
        char rightnbtoken;
        char rightnbcat;
        char rightnbtokenlength;
        char flags;
/* the flags are as follows:    */
#define SELN_CAPITALIZED   2    /* left bndry capitalized */
} TiabSeln;
```

```
#define MAX_FIXUP_CHARS      10
#define MAX_REDO_CHARS 20
typedef struct regionfixup {
        long offset;                    /* where the ipt is when fixups start */
        long newoffset;         /* where the ipt goes after fixups are done; 0 means end of
insert */
        long capoffset;
        char capchar;           /* > 0 for up, < 0 for down, ==0 for nothing */
        char deletelength;      /* from offset */
        char insertlength;
        char junk;                      /* superstition */
        char insertchars[MAX_FIXUP_CHARS];
        char redochars[MAX_REDO_CHARS];
        short nRedochars;
} RegionFixup;

/* Define the punctuation category names. The first 6 are both scanNB patterns and legit
pcats. */
#define pcat_Char        0
#define pcat_Word        1
#define pcat_Phrase      2
#define pcat_Clause      3
#define pcat_Sent        4
#define pcat_Para        5
/* These are scanNB patterns. Discontinuity is to emphasize they aren't ordered w.r.t.
the 6 above */
#define pcat_LBrkt       10
#define pcat_LQuote      11
#define pcat_RBrkt       12
#define pcat_RQuote      13
/* These are bracket pcats. Discontinuity is for same reason */
#define pcat_Brkt        20
define pcat_Dashes      21 define PARA_MARK        '\r' typedef struct bitsetAccessor {
        char *bits;
        short select;           /* should be 1 << offset, except when */
                                /* asgn target */
} Bitset;
#define BITELT(bsp, c) (((bsp)->bits[c & 0xff] & (bsp)->select) != 0)

extern char fineGrainedWords;   /* this global controls word bndry logic in scanners
*/
extern char prefsEmbedPeriod;
extern char prefsTolerateSingleSpaceSentBndries;
extern char mixedCaseFound;     /* set or cleared when checkMixedCaseFlag arg is on
*/
extern char allCapsFound;       /* set or cleared when checkAllCapsFlag arg is on */

/* These are used as the argument to forward and backward scanners and related code. */
typedef struct scanrecord {
        long from;
        long nextbndry;
        short class;
        int flags;
} ScanRecord;
/* flags for ScanRecords */
#define scnrec_checkMixedCaseFlag       1
define scnrec_checkAllCapsFlag         2 typedef struct tokenrecord {
        long bndry;
        short class;
        short nbcat;            /* natural boundary, a pcat_ rather than a tkn_. */
} TokenRecord;
/* I need to think more about reasons for making token cache large vs small. */
/* One consideration is that NB scanning may use several tokens on either side.
Also, there's practically no time cost for making it large (just a little extra
search time). */
#define TKNC_SIZE        25
```

```c
extern TokenRecord tokencache[TKNC_SIZE];

/* defines for token codes.  taken from unused char codes. */
#define tkn_Comma          16
#define tkn_SingleQuote    17
#define tkn_Colon          18
#define tkn_Space          19
#define tkn_Period         20
#define tkn_MultiDash      21
define tkn_MultiDots      22 define tkn_Word           23
define tkn_CapWord        24
#define tkn_Abbrev         25
#define tkn_CapAbbrev      26
#define tkn_WordInternal   27

/* prototypes, callbacks: */
extern long tiabLastCharPosn(), lastCharPosn();
long lastCharPosn(void);
char *blkmove();

/* the following externs for TIAB use: */
extern TokenRecord *tokenRecordAt(), *tokenRecordNext(), *tokenRecordPrev();

extern Bitset
  BndrySimpleBitset, BndryComplexBitset, Digits, WordBreakChars,
  SingleEmbeddableTokenBitset, SimpleMulticharTokenBitset, Alphas, DowncaseAlphas,
  UpcaseAlphas, DigitDollarDotComma, DotComma, Dashes, EndSent,
  Abbrevs, Capwords, LeftBrackets, RightBrackets, WordTokens, OpenBracketsBitset,
  CloseBracketsBitset, AllBracketsBitset, TrueBracketsBitset, OpenQuotesBitset,
CloseQuotesBitset,
  SemiCommaBitset, OpenQuoteLeftBitset, SpacesBitset, PropagateBitset, Apostrophes,
  WordStopBitset, PhraseStopBitset, ClauseStopBitset, SentStopBitset, ParaStopBitset;
```

APPENDIX D

```
/* by Curtis Abbott.  Copyright © Xerox Corp. 1988.  All rights reserved. */

/*
 * These tables were generated by packbits from the following input:
BndryComplexBitset              ,:'"$\s\-
BndrySimpleBitset               -;[{(]}) ""''!?\r
Digits                          0-9
WordBreakChars                  .;[{(]})'"""''!?,:\s\t-\-\r\n
SingleEmbeddableTokenBitset     ,:;[{(]})'"""''!?\r\n-
SimpleMulticharTokenBitset      .\-\s\t
Alphas                          a-zA-Z
DowncaseAlphas                  a-z
UpcaseAlphas                    A-Z
DigitDollarDotComma             $0-9.,
DotComma                        .,
Dashes                          \-
EndSent                         !?\14\16\19\1a
Abbrevs                         \19\1a
Capwords                        \18\1a
LeftBrackets                    [{(' ""'
RightBrackets                   ]})'""''\11
WordTokens                      \17-\1a
OpenBracketsBitset              "'""([{\10\15;
CloseBracketsBitset             '")]}\11
AllBracketsBitset               (){}[]""''
TrueBracketsBitset              "'""([{
OpenQuotesBitset                '""'
CloseQuotesBitset               "''"\11
SemiCommaBitset                 ,;
OpenQuoteLeftBitset             \r\s\t([{'"'"
SpacesBitset                    \s\t
PropagateBitset                 \13\16'"\11
Apostrophes                     ''
WordStopBitset                  (){}[]""''"''\r.?!;:\—,\s\t
PhraseStopBitset                (){}[]""''"''\r.?!;:\—,
ClauseStopBitset                        (){}[]""''"''\r.?!;:\—
SentStopBitset                  (){}[]""''"''\r.?!
ParaStopBitset                  (){}[]""''"''\r
SpecialKeycodesBitset           \33\46-\49\4d\60-\7f*/ char searchbits0[256] = {
      0x0,  0x0,  0x0,  0x0,  0x0,  0x0,  0x0,  0x0,
      0x0,  0x28, 0x18, 0x0,  0x0,  0x1A, 0x0,  0x0,
      0x0,  0x0,  0x0,  0x0,  0x0,  0x0,  0x0,  0x0,
      0x0,  0x0,  0x0,  0x0,  0x0,  0x0,  0x0,  0x0,
      0x29, 0x1A, 0x1A, 0x0,  0x1,  0x0,  0x0,  0x19,
      0x1A, 0x1A, 0x0,  0x0,  0x19, 0x29, 0x28, 0x0,
      0x4,  0x4,  0x4,  0x4,  0x4,  0x4,  0x4,  0x4,
      0x4,  0x4,  0x19, 0x1A, 0x0,  0x0,  0x0,  0x1A,
      0x0,  0x40, 0x40, 0x40, 0x40, 0x40, 0x40, 0x40,
      0x40, 0x40, 0x40, 0x40, 0x40, 0x40, 0x40, 0x40,
      0x40, 0x40, 0x40, 0x40, 0x40, 0x40, 0x40, 0x40,
      0x40, 0x40, 0x40, 0x1A, 0x0,  0x1A, 0x0,  0x0,
      0x0,  0xC0, 0xC0, 0xC0, 0xC0, 0xC0, 0xC0, 0xC0,
      0xC0, 0xC0, 0xC0, 0xC0, 0xC0, 0xC0, 0xC0, 0xC0,
      0xC0, 0xC0, 0xC0, 0xC0, 0xC0, 0xC0, 0xC0, 0xC0,
      0xC0, 0xC0, 0xC0, 0x1A, 0x0,  0x1A, 0x0,  0x0,
      0x0,  0x0,  0x0,  0x0,  0x0,  0x0,  0x0,  0x0,
      0x0,  0x0,  0x0,  0x0,  0x0,  0x0,  0x0,  0x0,
      0x0,  0x0,  0x0,  0x0,  0x0,  0x0,  0x0,  0x0,
      0x0,  0x0,  0x0,  0x0,  0x0,  0x0,  0x0,  0x0,
      0x0,  0x0,  0x0,  0x0,  0x0,  0x0,  0x0,  0x0,
      0x0,  0x0,  0x0,  0x0,  0x0,  0x0,  0x0,  0x0,
      0x0,  0x0,  0x0,  0x0,  0x0,  0x0,  0x0,  0x0,
      0x0,  0x0,  0x0,  0x0,  0x0,  0x0,  0x0,  0x0,
      0x0,  0x1A, 0x1A, 0x1A, 0x1A, 0x19, 0x0,  0x0,
      0x0,  0x0,  0x0,  0x0,  0x0,  0x0,  0x0,  0x0,
      0x0,  0x0,  0x0,  0x0,  0x0,  0x0,  0x0,  0x0,
      0x0,  0x0,  0x0,  0x0,  0x0,  0x0,  0x0,  0x0,
      0x0,  0x0,  0x0,  0x0,  0x0,  0x0,  0x0,  0x0,
```

```
        0x0, 0x0, 0x0, 0x0, 0x0, 0x0, 0x0, 0x0,
};

char searchbits1[256] = {
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x10, 0x0, 0x10, 0x0,
        0x40, 0x30, 0x70, 0x0, 0x0, 0x0, 0x0, 0x0,
        0x0, 0x10, 0x80, 0x0, 0x2, 0x0, 0x0, 0x80,
        0x80, 0x0, 0x0, 0x0, 0x6, 0x8, 0x6, 0x0,
        0x2, 0x2, 0x2, 0x2, 0x2, 0x2, 0x2, 0x2,
        0x2, 0x2, 0x0, 0x0, 0x0, 0x0, 0x0, 0x10,
        0x0, 0x1, 0x1, 0x1, 0x1, 0x1, 0x1, 0x1,
        0x1, 0x1, 0x1, 0x1, 0x1, 0x1, 0x1, 0x1,
        0x1, 0x1, 0x1, 0x1, 0x1, 0x1, 0x1, 0x1,
        0x1, 0x1, 0x1, 0x80, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x80, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x80, 0x0, 0x80, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
};

char searchbits2[256] = {
        0x0, 0x0, 0x0, 0x0, 0x0, 0x0, 0x0, 0x0,
        0x0, 0x0, 0x0, 0x0, 0x0, 0x0, 0x0, 0x0,
        0x4, 0x89, 0x0, 0x0, 0x0, 0x4, 0x0, 0x2,
        0x2, 0x2, 0x2, 0x2, 0x0, 0x0, 0x0, 0x0, 0x0,
        0x0, 0x0, 0xE5, 0x0, 0x0, 0x0, 0x0, 0xE5,
        0x34, 0x19, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x4, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x34, 0x0, 0x19, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x34, 0x0, 0x19, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x74, 0x99, 0x74, 0x99, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
};
```

```c
char searchbits3[256] = {
        0x0, 0x0, 0x0, 0x0, 0x0, 0x0, 0x0, 0x0,
        0x0, 0x26, 0x0, 0x0, 0x0, 0xE2, 0x0, 0x0,
        0x0, 0x8, 0x0, 0x8, 0x0, 0x0, 0x8, 0x0,
        0x0, 0x0, 0x0, 0x0, 0x0, 0x0, 0x0, 0x0,
        0x26, 0xE0, 0xE2, 0x0, 0x0, 0x0, 0x0, 0xF2,
        0xE2, 0xE0, 0x0, 0x0, 0x61, 0xE0, 0xE0, 0x0,
        0x0, 0x0, 0x0, 0x0, 0x0, 0x0, 0x0, 0x0,
        0x0, 0x0, 0xE0, 0xE1, 0x0, 0x0, 0x0, 0xE0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0xE2, 0x0, 0xE0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0xE2, 0x0, 0xE0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0xE0, 0xE2, 0xE8, 0xE2, 0xF8, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
};

char searchbits4[256] = {
        0x0, 0x0, 0x0, 0x0, 0x0, 0x0, 0x0, 0x0,
        0x0, 0x0, 0x0, 0x0, 0x0, 0x3, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x1, 0x3, 0x0, 0x0, 0x0, 0x0, 0x3,
        0x3, 0x3, 0x0, 0x0, 0x0, 0x0, 0x1, 0x0,
        0x0, 0x0, 0x0, 0x4, 0x0, 0x0, 0x0, 0x0,
        0x0, 0x0, 0x0, 0x0, 0x0, 0x0, 0x0, 0x1,
        0x0, 0x0, 0x0, 0x0, 0x0, 0x0, 0x4, 0x4,
        0x4, 0x4, 0x0, 0x0, 0x0, 0x4, 0x0, 0x0,
        0x0, 0x0, 0x0, 0x0, 0x0, 0x0, 0x0, 0x0,
        0x0, 0x0, 0x0, 0x3, 0x0, 0x3, 0x0, 0x0,
        0x4, 0x4, 0x4, 0x4, 0x4, 0x4, 0x4, 0x4,
        0x4, 0x4, 0x4, 0x4, 0x4, 0x4, 0x4, 0x4,
        0x4, 0x4, 0x4, 0x4, 0x4, 0x4, 0x4, 0x4,
        0x4, 0x4, 0x4, 0x7, 0x4, 0x7, 0x4, 0x4,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x3, 0x3, 0x3, 0x3, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
        0x0, 0x0, 0x0, 0x0, 0x0, 0x0, 0x0, 0x0,
};

typedef struct bitsetAccessor {
```

```
    char *bits;
    short select;
} Bitset;

Bitset BndryComplexBitset = {searchbits0, (1 << 0)};
Bitset BndrySimpleBitset = {searchbits0, (1 << 1)};
Bitset Digits = {searchbits0, (1 << 2)};
Bitset WordBreakChars = {searchbits0, (1 << 3)};
Bitset SingleEmbeddableTokenBitset = {searchbits0, (1 << 4)};
Bitset SimpleMulticharTokenBitset = {searchbits0, (1 << 5)};
Bitset Alphas = {searchbits0, (1 << 6)};
Bitset DowncaseAlphas = {searchbits0, (1 << 7)};
Bitset UpcaseAlphas = {searchbits1, (1 << 0)};
Bitset DigitDollarDotComma = {searchbits1, (1 << 1)};
Bitset DotComma = {searchbits1, (1 << 2)};
Bitset Dashes = {searchbits1, (1 << 3)};
Bitset EndSent = {searchbits1, (1 << 4)};
Bitset Abbrevs = {searchbits1, (1 << 5)};
Bitset Capwords = {searchbits1, (1 << 6)};
Bitset LeftBrackets = {searchbits1, (1 << 7)};
Bitset RightBrackets = {searchbits2, (1 << 0)};
Bitset WordTokens = {searchbits2, (1 << 1)};
Bitset OpenBracketsBitset = {searchbits2, (1 << 2)};
Bitset CloseBracketsBitset = {searchbits2, (1 << 3)};
Bitset AllBracketsBitset = {searchbits2, (1 << 4)};
Bitset TrueBracketsBitset = {searchbits2, (1 << 5)};
Bitset OpenQuotesBitset = {searchbits2, (1 << 6)};
Bitset CloseQuotesBitset = {searchbits2, (1 << 7)};
Bitset SemiCommaBitset = {searchbits3, (1 << 0)};
Bitset OpenQuoteLeftBitset = {searchbits3, (1 << 1)};
Bitset SpacesBitset = {searchbits3, (1 << 2)};
Bitset PropagateBitset = {searchbits3, (1 << 3)};
Bitset Apostrophes = {searchbits3, (1 << 4)};
Bitset WordStopBitset = {searchbits3, (1 << 5)};
Bitset PhraseStopBitset = {searchbits3, (1 << 6)};
Bitset ClauseStopBitset = {searchbits3, (1 << 7)};
Bitset SentStopBitset = {searchbits4, (1 << 0)};
Bitset ParaStopBitset = {searchbits4, (1 << 1)};
Bitset SpecialKeycodesBitset = {searchbits4, (1 << 2)};
```

What is claimed:

1. A method of operating a system that includes a processor; the method comprising:
   a first step of operating the processor to obtain text data defining a text, the text including a first word and a first set of at least one punctuational feature in a region at a first end of the first word; the first step comprising substeps of:
   receiving a request for a manipulation operation on a selection within the text to produce the text; and
   in response to the request, operating the processor to perform the manipulation operation and to obtain manipulation operation data indicating the manipulation operation; the manipulation operation producing the text data; and
   a second step of automatically operating the processor to use the text data and the manipulation operation data to obtain operation-defining data, the operation-defining data defining a sequence of at least one operation of the processor that would modify the text data to produce modified text data, the modified text data defining a modified text including the first word and a second set of at least one punctuational feature in the region at the first end of the first word, the second set of at least one punctuational feature being different than the first set of at least one punctuational feature.

2. The method of claim 1, further comprising a third step of operating the processor to perform the sequence of at least one operation defined by the operation-defining data.

3. The method of claim 2 in which the operation-defining data includes data defining a starting point within the text data, a number of text codes within the text data to delete, and a list of text codes to be inserted, the third step comprising substeps of:
   deleting the number of text codes beginning at the starting point; and inserting the list of text codes at the starting point.

4. The method of claim 1 in which the text defined by the text data has an incorrect textual type punctuational structure.

5. The method of claim 4 in which the manipulation operation affects the first word, the operation-defining data defining a sequence to correct a punctuational feature at the first end of the first word.

6. The method of claim 5 in which the second step further comprises a substep of determining whether a region that includes the first end of the first word includes a textual type boundary for a textual type and, if so, determining the textual type of the textual type boundary.

7. The method of claim 5 in which the first word has a second end in addition to the first end, the operation-defining data further defining a sequence of at least one operation of the processor to correct a punctuational feature at the second end of the first word.

8. The method of claim 4 in which the first step further comprises a substep of operating the processor to perform a selection operation relating to a selected part of the text prior to the substep of operating the processor to perform the manipulation operation, the substep of operating the processor to perform a selection operation comprising a substep of finding an end point of the selected part of the text.

9. The method of claim 8 in which the substep of finding an end point of the selected part comprises a substep of identifying a textual type boundary.

10. The method of claim 9 in which the substep of identifying a textual type boundary further comprises a substep of performing pattern matching on a set of text codes in the text data.

11. The method of claim 1 in which the requested manipulation operation relates to a position in the text, the second step further comprising a substep of identifying a textual type boundary that includes the position in the text.

12. The method of claim 11 in which the requested manipulation operation relates to a text unit in the text, the position being an end of the text unit, the second step obtaining the operation-defining data based on the textual type boundary's textual type.

13. The method of claim 12 in which the requested manipulation operation changes the text unit to a new textual type, the second step further obtaining the operation-defining data based on the new textual type.

14. The method of claim 11 in which the requested manipulation operation changes the textual type boundary to a new textual type, the second step obtaining the operation-defining data based on the new textual type.

15. The method of operating a system that includes a processor and text data defining a text, the text including a first word having a first end; the method comprising steps of:

operating the processor to perform a selection operation relating to a selection within the text;

operating the processor to perform a manipulation operation on the text data to produce manipulated text data and manipulation operation data indicating the manipulation operation performed, the manipulated text data defining a manipulated text, the manipulated text including the first word and a first set of at least one punctuational feature in a region at the first end of the first word; the first set of at least one punctuational feature being incorrect;

automatically operating the processor to use the manipulated text data and the manipulation operation data to obtain operation-defining data defining a sequence of at least one operation on the manipulated text data that would modify the manipulated text data to correct the first set of at least one punctuational feature; and in response to the operation-defining data, automatically operating the processor to perform a sequence of at least one operation defined by the operation-defining data on the manipulated text data, the sequence modifying the manipulated text data to produce modified text data defining a modified text, the modified text including the first word and a second set of at least one punctuational feature in a region at the first end of the first word, the second set of at least one punctuational feature being different than the first set of at least one punctuational feature; the second set of at least one punctuational feature being correct.

16. The method of claim 15 in which the step of operating the processor to perform a selection operation comprises a substep of obtaining and storing data related to the selected part of the text; the step of automatically operating the processor to perform a sequence of at least one operation on the manipulated text data further comprising a substep of performing the sequence based on the data related to the selected part of the text.

17. The method of claim 15 in which the manipulated text data includes a first set of at least one text code defining the first set of at least one punctuational feature and the modified text data includes a second set of at least one text code defining the second set of at least one punctuational feature, the step of operating the processor to perform a sequence of at least one operation comprising a substep of replacing one of the first set of at least one text code to produce the second set of at least one text code.

18. The method of claim 15 in which the manipulated text data includes a first set of at least one text code defining the first set of at least one punctuational feature and the modified text data includes a second set of at least one text code defining the second set of at least one punctuational feature, the step of operating the processor to perform a sequence of at least one operation comprising a substep of deleting one of the first set of at least one text code to produce the second set of at least one text code.

19. The method of claim 15 in which the manipulated text data includes a first set of at least one text code defining the first set of at least one punctuational feature and the modified text data includes a second set of at least one text code defining the second set of at least one punctuational feature, the step of operating the processor to perform a sequence of at least one operation comprising a substep of inserting an additional text code into the first set of at least one text code to produce the second set of at least one text code.

20. The method of claim 15 in which the manipulated text data includes a first set of at least one text code defining the first set of at least one punctuational feature and the modified text data includes a second set of at least one text code defining the second set of at least one punctuational feature, the step of operating the processor to perform a sequence of at least one operation comprising a substep of changing one of the text codes in the first set of at least one text code by changing capitalization to produce the second set of at least one text code.

21. A method of operating a system that includes a processor; the method comprising:

a first step of operating the processor to obtain text data defining a text, the text including a first word and a first set of at least one punctuational feature in a region at a first end of the first word; the first step comprising substeps of:

receiving a request for a selection operation on a selection within the text; and in response to the request, operating the processor to perform the selection operation and to obtain selection operation data indicating the selection operation; and a second step of automatically operating the processor to use the text data and the selection operation data to obtain operation-defining data, the operation-defining data defining a sequence of at least one operation of the processor that would modify the text data to produce modified text data, the modified text data defining a modified text including the first word and a second set of at least one punctuational feature in the region at the first end of the first word, the second set of at least one punctuational feature being different than the first set of at least one punctuational feature.

22. The method of claim 21 in which the substep of operating the processor to perform the selection operation and to obtain selection operation data comprises a substep of determining a textual type relating to the selected part of the text; the second step obtaining the operation-defining data based on the textual type.

23. The method of claim 22 in which the substep of determining the textual type comprises a substep of identifying a textual type boundary.

24. The method of claim 23 in which the substep of identifying a textual type boundary further comprises a substep of performing pattern matching on a set of text codes in the text data.

25. The method of claim 22 in which the selected part is a text unit, the substep of determining the textual type comprising substeps of:
identifying a textual type boundary at an end of the text unit; and
determining the textual type boundary's textual type.

26. The method of claim 25 in which the text data includes a text code corresponding to a punctuational feature at the text unit's end, the substep of identifying the textual type boundary comprising a substep of identifying the textual type boundary based on the text code.

27. The method of claim 26 in which the textual type boundary includes a plurality of text codes at the text unit'end, the plurality of text codes including the above-mentioned text code, the substep of operating the processor to perform the selection operation and to obtain selection operation data further comprising a substep of obtaining a length of the plurality of text codes, the second step obtaining the operation-defining data based on the length.

28. The method of claim 22 in which the selected part is a position within a textual type boundary, the substep of determining the textual type comprising a substep of determining the textual type boundary's textual type.

29. The method of claim 21 in which the substep of operating the processor to perform the selection operation and to obtain selection operation comprises substeps of:
obtaining data related to the selected part of the text; and
operating the processor to store the data related to the selected part of the text;
the second step obtaining the operation-defining data based on the data related to the selected part of the text.

30. The method of claim 29 in which the selected part of the text is a text unit, the substep of obtaining data related to the selected part comprising a substep of identifying a textual type boundary at an end of the text unit.

31. The method of claim 30 in which the substep of obtaining data related to the selected part further comprises a substep of determining the textual type boundary's textual type.

32. The method of claim 30 in which the text data includes a text code corresponding to a punctuational feature at the text unit's end, the substep of identifying the textual type boundary comprising a substep of identifying the textual type boundary based on the text code.

33. The method of claim 32 in which the textual type boundary includes a plurality of text codes at the text unit's end, the plurality of text codes including the above-mentioned text code, the substep of obtaining data related to the selected part further comprising a substep of obtaining a length of the plurality of text codes.

34. The method of claim 29 in which the selected part is a position within a textual type boundary, the substep of obtaining data related to the selected part comprising a substep of identifying the textual type boundary's textual type.

35. The method of claim 1, further comprising a third step of operating the processor to perform the sequence of at least one operation defined by the operation-defining data.

36. The method of claim 35 in which the operation-defining data includes data defining a starting point within the text data, a number of text codes within the text data to delete, and a list of text codes to be inserted, the third step comprising substeps of:
deleting the number of text codes beginning at the starting point; and
inserting the list of text codes at the starting point.

37. The method of claim 21 in which the requested selection operation relates to a position in the text, the second step further comprising a substep of identifying a textual type boundary that includes the position in the text.

38. The method of claim 37 in which the requested selection operation relates to a text unit in the text, the position being an end of the text unit, the second step obtaining the operation-defining data based on the textual type boundary's textual type.

39. The method of claim 38 in which the requested selection operation changes the text unit to a new textual type, the second step further obtaining the operation-defining data based on the new textual type.

40. The method of claim 37 in which the requested operation changes the textual type boundary to a new textual type, the second step obtaining the operation-defining data based on the new textual type.

41. A system comprising:
memory, the memory storing first and second sets of instructions; and
a processor, the processor comprising:
means for executing from the first set of instructions to perform an operation on text data defining a text and to obtain performed operation data indicating the operation performed; the text including a first word and a first set of at least one punctuational feature in a region at a first end of the first word; and
means for automatically executing from the second set of instructions to use the text data and the performed operation data to obtain operation-defining data defining a sequence of at least one operation of the processor that would modify the text data to produce modified text data, the modified text data defining a modified text including the first word and a second set of at least one punctuational feature in the region at the first end of the first word, the second set of at least one punctuational feature being different than the first set of at least one punctuational feature.

42. The system of claim 41 in which the means for executing from the first set of instructions comprises means responsive to the operation-defining data for performing the sequence defined by the operation-defining data.

43. The system of claim 42, further comprising a display, the means for executing from the first set of instructions comprising means responsive to the modified text data for presenting the modified text on the display.

44. The system of the claim 42, in which the means for executing from the first set of instructions further comprises means for providing a pointer to a fix-up data structure, the means for executing from the second set of instructions comprising mean for loading the operation-defining data into the fix-up data structure.

45. The system of claim 42 in which the operation-defining data includes data defining a starting point within the text data, a number of text codes within the text data to delete, a number of text codes to insert, a list of text codes to be inserted, a position within the text data to change capitalization, and how to change capitalization at the position.

46. The system of claim 41, further comprising means for receiving a selection signal relating to a selected text unit within the text, the means for executing from the first set of instructions comprising means for calling the second set of instructions with data relating to the selection signal, the means for executing from the second set of instructions comprising means responsive to the data relating to the selection signal for determining an end point of the selected text unit.

47. The system of claim 46 in which the means for executing from the second set of instructions further comprises means for returning data indicating the end point of the selected text unit, the means for executing from the first set of instructions further comprising means for providing a selection data structure including data defining the selected text unit based on the data indicating the end point.

* * * * *

UNITED STATES PATENT AND TRADEMARK OFFICE
CERTIFICATE OF CORRECTION

PATENT NO. : 5,070,478
DATED : December 3, 1991
INVENTOR(S) : Curtis Abbott

It is certified that error appears in the above-indentified patent and that said Letters Patent is hereby corrected as shown below:

On title page, item [54], col. 1, lines 1-2, change "MODIFYING TEXT DATA TO CHANGE FEATURES IN A REGION OF TEXT" to --MODIFYING TEXT DATA TO CHANGE PUNCTUATIONAL FEATURES IN A REGION OF TEXT--;

Col. 130, line 14: Change "claim 1" to --claim 21--.

Signed and Sealed this

Fifth Day of October, 1993

*Attest:*

BRUCE LEHMAN

*Attesting Officer*　　　　*Commissioner of Patents and Trademarks*